US008667463B2

(12) United States Patent
Lin et al.

(10) Patent No.: US 8,667,463 B2
(45) Date of Patent: Mar. 4, 2014

(54) TRACEABILITY IN A MODELING ENVIRONMENT

(75) Inventors: Xiaocang Lin, Wayland, MA (US); Aravind Pillarisetti, Natick, MA (US); William J Aldrich, Natick, MA (US); Kai Tuschner, Leinfelden-Echterdingen (DE)

(73) Assignee: The Mathworks, Inc., Natick, MA (US)

( * ) Notice: Subject to any disclaimer, the term of this patent is extended or adjusted under 35 U.S.C. 154(b) by 97 days.

(21) Appl. No.: 13/335,556

(22) Filed: Dec. 22, 2011

(65) Prior Publication Data

US 2012/0096439 A1 Apr. 19, 2012

Related U.S. Application Data

(60) Division of application No. 11/605,747, filed on Nov. 29, 2006, now Pat. No. 8,104,017, which is a continuation-in-part of application No. 10/637,433, filed on Aug. 7, 2003, now Pat. No. 8,046,708, which is a continuation-in-part of application No. 10/057,126, filed on Oct. 25, 2001, now Pat. No. 7,849,394.

(51) Int. Cl.
    *G06F 9/44* (2006.01)
(52) U.S. Cl.
    USPC .......... 717/109; 717/100; 717/107; 717/113; 715/700
(58) Field of Classification Search
    None
    See application file for complete search history.

(56) References Cited

U.S. PATENT DOCUMENTS

| 4,901,221 | A |   | 2/1990  | Kodosky et al. |
|-----------|---|---|---------|----------------|
| 5,544,358 | A |   | 8/1996  | Capps et al.   |
| 5,627,979 | A |   | 5/1997  | Chang et al.   |
| 6,023,273 | A | * | 2/2000  | Cox et al. ...................... 715/764 |
| 6,049,835 | A |   | 4/2000  | Gagnon         |
| 6,053,951 | A |   | 4/2000  | McDonald et al. |
| 6,061,515 | A |   | 5/2000  | Chang et al.   |
| 6,134,559 | A |   | 10/2000 | Brumme et al.  |
| 6,243,857 | B1 |  | 6/2001  | Logan, III et al. |
| 6,269,475 | B1 |  | 7/2001  | Farrell et al. |
| 6,272,672 | B1 | * | 8/2001 | Conway ....................... 717/107 |
| 6,438,615 | B1 |  | 8/2002  | Faustini        |
| 6,493,740 | B1 |  | 12/2002 | Lomax           |
| 6,574,737 | B1 |  | 6/2003  | Kingsford et al. |

(Continued)

FOREIGN PATENT DOCUMENTS

| WO | WO 01/25911 | 4/2001  |
|----|-------------|---------|
| WO | WO 01/25912 | 4/2001  |
| WO | WO 01/82232 | 11/2001 |
| WO | WO 03/107180 | 12/2003 |

OTHER PUBLICATIONS

Muenchaisri et al., "Entity-Relationship Software Development Environment", IEEE Computer Science, Aug. 1, 1999, 10 pages.

(Continued)

*Primary Examiner* — Chameli Das
(74) *Attorney, Agent, or Firm* — Harrity & Harrity, LLP

(57) ABSTRACT

Exemplary embodiments employ a mapping among entities that are related to each other. The entities may include a graphical model, generated code, a generated report, a requirements document and/or an intermediate representation. The mapping may facilitate graphical identifications between parts of one entity that maps to part of another entity. The graphical identification may occur based on a selection of a part in one of the entities.

20 Claims, 36 Drawing Sheets

(56) References Cited

U.S. PATENT DOCUMENTS

| | | | |
|---|---|---|---|
| 6,792,418 B1 | 9/2004 | Binnig et al. | |
| 6,850,252 B1 | 2/2005 | Hoffberg | |
| 6,993,723 B1 | 1/2006 | Danielsen et al. | |
| 7,030,890 B1 * | 4/2006 | Jouet et al. | 345/619 |
| 7,055,131 B2 | 5/2006 | Charisius et al. | |
| 7,114,149 B2 | 9/2006 | Aptus et al. | |
| 7,165,005 B2 | 1/2007 | Steger et al. | |
| 7,171,448 B1 | 1/2007 | Danielsen et al. | |
| 7,171,646 B2 | 1/2007 | Charisius et al. | |
| 7,188,332 B2 | 3/2007 | Charisius et al. | |
| 7,219,328 B2 | 5/2007 | Schloegel et al. | |
| 7,290,244 B2 | 10/2007 | Peck et al. | |
| 7,386,833 B2 * | 6/2008 | Granny et al. | 717/109 |
| 7,389,490 B2 | 6/2008 | Roesner et al. | |
| 7,496,895 B1 | 2/2009 | Mosterman et al. | |
| 7,526,535 B2 | 4/2009 | Peck et al. | |
| 7,657,557 B2 | 2/2010 | Super et al. | |
| 7,681,176 B2 | 3/2010 | Wills et al. | |
| 7,698,346 B2 | 4/2010 | Henderson | |
| 7,721,283 B2 | 5/2010 | Kovachka-Dimitrova et al. | |
| 7,735,060 B2 | 6/2010 | Harvey et al. | |
| 7,814,470 B2 | 10/2010 | Mamou et al. | |
| 8,041,760 B2 | 10/2011 | Mamou et al. | |
| 8,104,017 B2 | 1/2012 | Lin et al. | |
| 2002/0016206 A1 | 2/2002 | Yoshimi et al. | |
| 2002/0054138 A1 | 5/2002 | Hennum | |
| 2002/0055891 A1 | 5/2002 | Yang | |
| 2002/0072049 A1 | 6/2002 | Prahalad | |
| 2002/0078010 A1 | 6/2002 | Ehrman et al. | |
| 2002/0104068 A1 | 8/2002 | Barrett et al. | |
| 2002/0129058 A1 | 9/2002 | Story et al. | |
| 2002/0156792 A1 | 10/2002 | Gombocz et al. | |
| 2002/0188928 A1 | 12/2002 | Szpak et al. | |
| 2003/0009253 A1 | 1/2003 | McIntyre et al. | |
| 2003/0016206 A1 | 1/2003 | Taitel | |
| 2003/0018953 A1 | 1/2003 | Aberg | |
| 2003/0038842 A1 | 2/2003 | Peck et al. | |
| 2003/0046380 A1 | 3/2003 | Steger et al. | |
| 2003/0069908 A1 | 4/2003 | Anthony et al. | |
| 2003/0074489 A1 | 4/2003 | Steger et al. | |
| 2003/0107595 A1 | 6/2003 | Ciolfi | |
| 2003/0120549 A1 | 6/2003 | Lindner | |
| 2003/0137522 A1 | 7/2003 | Kaasila et al. | |
| 2003/0145305 A1 | 7/2003 | Ruggier | |
| 2003/0163298 A1 | 8/2003 | Odom et al. | |
| 2003/0192032 A1 | 10/2003 | Andrade et al. | |
| 2003/0195732 A1 | 10/2003 | Kodosky et al. | |
| 2004/0015783 A1 * | 1/2004 | Lennon et al. | 715/523 |
| 2004/0030715 A1 | 2/2004 | White et al. | |
| 2004/0031015 A1 | 2/2004 | Ben-Romdhane et al. | |
| 2004/0034846 A1 | 2/2004 | Ortal et al. | |
| 2004/0181543 A1 * | 9/2004 | Wu et al. | 707/102 |
| 2004/0205507 A1 | 10/2004 | Tuschner et al. | |
| 2005/0137840 A1 | 6/2005 | Peck et al. | |
| 2006/0143570 A1 * | 6/2006 | Washington et al. | 715/763 |
| 2007/0046649 A1 | 3/2007 | Reiner | |
| 2007/0209031 A1 | 9/2007 | Ortal et al. | |
| 2007/0211079 A1 * | 9/2007 | Nixon et al. | 345/619 |
| 2008/0098349 A1 | 4/2008 | Lin et al. | |
| 2009/0006990 A1 * | 1/2009 | Ossesia | 715/763 |
| 2009/0177373 A1 * | 7/2009 | Groenhuijzen et al. | 701/117 |
| 2009/0217187 A1 * | 8/2009 | Kendall et al. | 715/765 |
| 2012/0096430 A1 | 4/2012 | Lin et al. | |
| 2012/0124552 A1 | 5/2012 | Lin et al. | |

OTHER PUBLICATIONS

Gery et al., "Rhapsody: A Complete Life-Cycle Model-Based Development System", Jan. 1, 2002, 10 pages, XP009111242.

Cohn et al., "Java Developer's Reference", 1996, 30 pages, XP007906921.

Notification of Transmittal of the International Search Report and the Written Opinion of the International Searching Authority, or the Declaration corresponding to PCT/US2007/024718, Feb. 17, 2009, 19 pages.

International Search Report and Written Opinion corresponding to PCT/US2007/024718 dated Jun. 6, 2008, 9 pages.

Co-pending U.S. Appl. No. 11/880,620, filed Jul. 23, 2007 entitled "Traceability in a modeling Environment", Lin et al., 98 pages.

Co-pending U.S. Appl. No. 12/061,333, filed Apr. 2, 2008 entitled "Traceability in a modeling Environment", Jesung et al., 136 pages.

Austin et al., "An Entity-Relationship Modeling Approach to IDEF$_0$ Syntax", IEEE, 1990, 5 pages.

* cited by examiner

```
19
20   typedef struct {                                1520
21      real_T In1;
22   } ExternalInputs_example;
23
24   typedef struct {
25      real_T Out1;
26   } ExternalOutputs_example;
27
28   struct Parameters_example {
29      real_T Gain_Gain;
30   };
31
32   struct RT_MODEL_example {
33      const char_T * volatile errorStatus;
34   };
```

```
 7   RT_MODEL_exampl *example_M = &example_M_;    1540
 8   void example_step(void)
 9   {
10      example_Y.Out1 = example_U.In1 * example_P.Gain_Gain;
11   }
12
```

TRACEABILITY IN A MODELING ENVIRONMENT

RELATED APPLICATIONS

This application is a divisional of U.S. patent application Ser. No. 11/605,747, filed Nov. 29, 2006, which is a continuation-in-part of U.S. patent application Ser. No. 10/057,126, filed Oct. 25, 2001, now U.S. Pat. No. 8,046,708, and is a continuation-in-part of U.S. application Ser. No. 10/637,433, filed Aug. 7, 2003, now U.S. Pat. No. 7,849,394. The disclosures of which are hereby incorporated by reference in their entirety.

BACKGROUND

Graphical modeling environments, such as Simulink® software from The MathWorks, Inc. of Natick, Mass., cater to various aspects of dynamic system simulation, analysis and design. Such products allow users to perform numerous types of tasks including constructing system block diagram models. These graphical modeling environments may also be used to augment a predefined set of blocks with custom user-specified blocks, to compute and trace the temporal evolution of the dynamic system ("executing" the block diagram), to produce deployable software systems, or to produce descriptions of hardware systems that can mimic the behavior of either the entire model or portions of the model (referred to herein as "code generation").

A code generation process may be complicated. While it may not be important for users of graphical modeling environments to understand the details of how the code generation process works, it can be important for users to understand the mapping between parts of the graphical model and parts of the generated code. Conventional systems and/or techniques may not provide users with the ability to readily understand mappings between parts of a graphical model and parts of generated code.

SUMMARY

In one aspect a computer-implemented method is disclosed. The method includes identifying entities having relationships therebetween. The entities include at least one of a graphical model, generated code, a generated report, a requirements document or an intermediate representation. The method also includes accessing a first entity from the entities and accessing a second entity from the entities. The method further includes mapping the first entity to the second entity to facilitate graphical identification of a first part of the first entity that is bi-directionally mappable to a second part of the second entity.

In another aspect, a computing system is disclosed. The computing system includes a code generator and an integrated environment. The code generator produces generated code that corresponds to at least part of a graphical model. The generated code includes one or more segments. The integrated environment bi-directionally maps content related to the graphical model to the one or more segments. The integrated environment further allows identification of the content mapped to the one or more segments or allows identification of the one or more segments mapped to the content.

In yet another aspect, a medium that holds instructions executable using a computing device is disclosed. The instructions enable identifying entities having relationships therebetween. The entities include at least one of a graphical model, generated code, a generated report, a requirements document or an intermediate representation. The instructions also enable accessing a first entity from the entities and accessing a second entity from the entities. The instructions further enable mapping the first entity to the second entity to facilitate graphical identification of a first part of the first entity that is bi-directionally mappable to a second part of the second entity.

In still another aspect, a computer-implemented method is disclosed that includes accessing generated code corresponding to at least portion of a graphical model. The method also includes identifying a first graphical affordance in the graphical model that corresponds to a first segment of the generated code, the identifying performed graphically.

In an additional aspect, a medium that holds instructions executable using a computing device, where the instructions enable interacting with code generated on behalf of at least part of a graphical model. The generated code includes at least a first segment. The instructions further enable identifying a first graphical affordance in the graphical model that corresponds to the first segment, the identifying performed graphically.

In a further aspect, a computer-implemented method is disclosed that includes accessing code generated corresponding to at least a portion of a graphical model and identifying a first segment in the generated code, the first segment corresponding to a first graphical affordance in the graphical model, the identifying performed graphically.

In yet a further aspect, a medium that holds instructions executable using a computing device, where the instructions enable accessing code generated corresponding to at least part of a graphical model and identifying a first segment in the generated code corresponding to a first graphical affordance, the identifying performed graphically.

BRIEF DESCRIPTION OF THE DRAWINGS

The accompanying drawings, which are incorporated in and constitute a part of this specification, illustrate one or more exemplary embodiments and, together with the description, explain the invention. In the drawings.

FIG. 5A depicts an exemplary graphical model, exemplary generated code and an exemplary generated report in accordance with exemplary embodiments;

FIG. 5D depicts unique graphical identifiers for identifying segments of the exemplary generated code and sections of the exemplary generated report of FIG. 5A that correspond to various aspects of a graphical affordance in the exemplary graphical model of FIG. 5A;

FIG. 15B depicts exemplary code files that may be generated from the graphical model of FIG. 15A;

DETAILED DESCRIPTION

Figure 1:
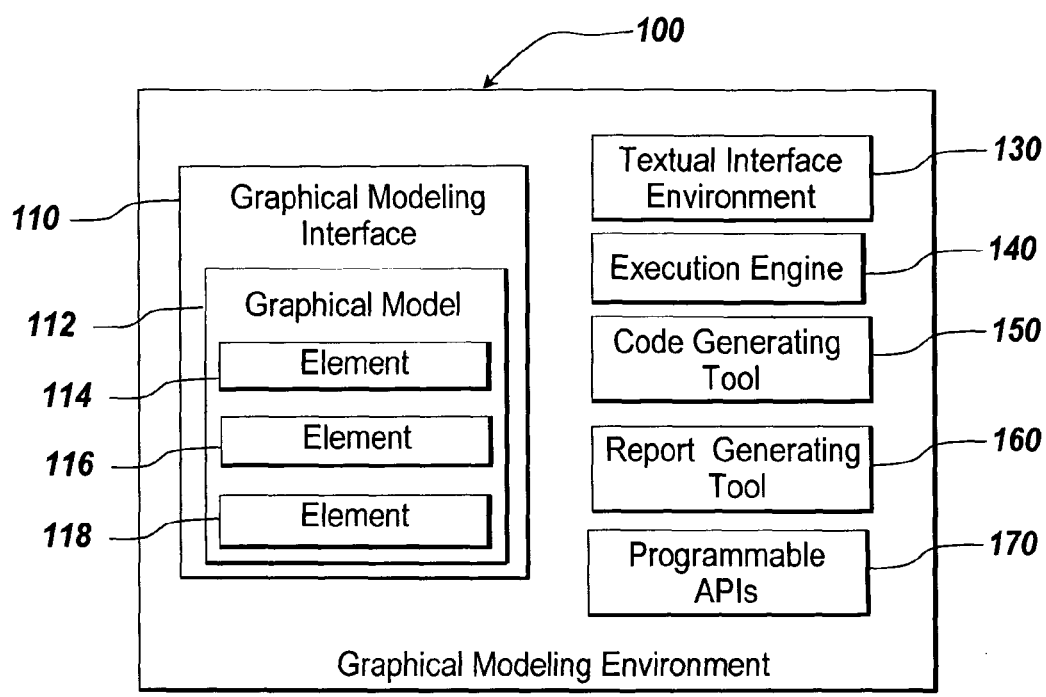
FIG. 1 depicts a high-level block diagram of an exemplary graphical modeling environment that may be used for implementing various exemplary embodiments.

Exemplary embodiments described herein provide a graphical modeling environment to allow a user to generate a graphical model that maps to multiple entities. The entities may include a requirements document, generated code, an intermediate representation, a generated report, etc. These entities may also be mapped to one another.

The mapping between the entities may be bi-directional. For example, a graphical model can be mapped to generated code and vice versa. The bi-directional mapping may facilitate graphical identification of portions of the graphical model that correspond to selected segments of the generated code. The bi-directional mapping may also facilitate graphical identification of segments of generated code that correspond to selected portions of a graphical model. The parts of the entities that map to one another may use a one-to-one mapping, a one-to-many mapping, a many-to-one mapping, a many-to-many mapping, etc. The bi-directional mapping may be injective, surjective, bijective, etc. In an injective mapping, for example, each part of a first entity is mapped to a corresponding part of a second entity in a one-to-one fashion, but the second entity may have parts, for which the first entity does not map to. In a surjective mapping, for example, each part of a first entity is mapped to a corresponding part on a second entity. A surjective mapping allows more than one part of the first entity to map to a single part of the second entity. In subjective mapping all parts of the first and second entity have corresponding parts. A bijective mapping is both injective and surjective. A bijective mapping allows for each part of a first entity to map to a corresponding part of a second entity in an one-to-one fashion, such that each part of the first and second entities is mapped to single corresponding part and there are no parts of the first and second entities that are not mapped to one another.

The graphical model may represent a system, such as a dynamic system, and may be executable in the graphical modeling environment. A graphical model may be represented as, for example, a block diagram model, data flow model, state-diagram model, etc. Some possible examples of suitable graphical modeling environments that may be used to develop a graphical model in accordance with exemplary embodiments are, but are not limited to, Simulink® software and/or Stateflow® software from the MathWorks Inc. of Natick Mass., LabVIEW® or MATRIXx from National Instruments, Inc., Mathematica® from Wolfram Research, Inc., Mathcad of Mathsoft Engineering & Education Inc., Maple™ from Maplesoft, a division of Waterloo Maple Inc., Dymola from Dynasim AB of Lund, Sweden, Extend from Imagine That, Inc. of San Jose, Calif., Scilab™ and Scicos from The French National Institution for Research in Computer Science and Control (INRIA), Le Chesnay Cedex, France, MSC.Adams® from MSC.Software Corporation of Santa Ana, Calif., modeling software from dSPACE of Paderborn, Germany, electronic design automation (EDA) software front Cadence™ of San Jose, Calif. or Synopsis® of Mountain View, Calif., the BEACON software family from Applied Dynamics International of Ann Arbor, Mich., etc. In addition, modeling environments, such as those that support modeling physics-based domains, Unified Modeling Language (UML) like Rhapsody® from iLogix, Inc. of Toronto, Canada or Rational® from International Business Machines Corporation of Armonk, N.Y., or SysML like ARTiSAN Studio from ARTiSAN Software Tools, Inc of Beaverton, Oreg. or Rhapsody® from iLogix, Inc., etc., may be suitable for implementing a graphical model in accordance with the exemplary embodiments.

Exemplary graphical models may be developed based on a set of requirements that may be contained in one or more machine-readable structures, such as a text file, a spreadsheet, a word processing file, a presentation application file, database, repository, etc., which will generally be referred to herein as a "requirement documents". The requirements may be subject to version control by a version control system to enable tracking of versions when the requirements change. In some instances, the requirements may be included in the graphical model such that the requirements and the design (i.e., the graphical model) are in the same location. The requirements may be mapped to the graphical model and/or generated code to facilitate graphical identification of requirements that map to graphical affordances in a graphical model and/or segments in generated code. The graphical affordances or segments may also be graphically identified based on a selection of a requirement.

Generated code may be generated in a programming language, such as C, C++, JAVA®, Javascript, an assembly language, etc.; a hardware description language, such as Verilog, VHDL (very high speed integrated circuit hardware description language), etc.; a register transfer language (RTL); etc. Implementations may further generate information about a graphical model using a programming language, alone or in combination with the generated code discussed above. In one example, an XML representation may be used to include meta-information about the model, such as, which functions should be called and in what order; which task should be called and at what rate; what types input arguments have; etc.

Exemplary embodiments may further enable graphically identifying segments in generated code that correspond to selected graphical affordances in the graphical model. In this manner, a user may view segments of generated code that map to selected graphical affordances. Graphical affordances, as used herein, refer to aspects of a graphical model that are displayed in the graphical model and may include, for example, elements, signals, annotations, etc.

The term signal discussed herein refers to data that is passed to or from elements in a graphical model. A signal may be composed of data values calculated based on the execution of an element in a graphical model. A signal may be associated with a unit of measurement such as time, velocity, acceleration, voltage, current, etc., or may be a unitless data value. A signal may be represented by various data types including unsigned bytes or words, signed bytes or words, double, integers, floating point notations, etc. Signals may use frame based transmission formats for passing data to and from elements in a graphical model and/or may use non-frame based transmission formats.

A frame, as used herein, refers to a temporal collection of data samples. For example, a frame may include a fixed number of data samples that are transmitted as a unit from one element to another element in a model during a given period. The samples in a frame may, for example, represent a serial stream of data that is transmitted during a specified time period. For example, a user or system may determine a time interval for a stream of data that is assembled into one or more frames. When an assembled frame is transmitted, all samples in the frame may be sent at substantially the same time.

A graphical affordance may be used to map segments of generated code in exemplary implementations. Further, portions of a graphical affordance may be selected and graphically identified in generated code. For example, a user may select an input of a graphical affordance that represents an element in a graphical model and a segment in generated code that corresponds to the selected input may be graphically identified to the user. Likewise, a user may select a graphical affordance and various parts of the graphical affordance may be uniquely identified in the generated code by a graphical identifier. Examples of parts of a graphical affordance may include, but are not limited to, signal names, input variables, element parameters, output variables, etc.

Exemplary embodiments may enable the graphical identification of graphical affordances. For example, a user may select a segment of generated code, and the selected segment may map to a graphical affordance in a graphical model. Upon selecting the segment, the graphical affordance that corresponds to the selected segment may be graphically identified. In one example, the graphical identification is achieved by highlighting the graphical affordance. In this manner, a user may view portions of the graphical model that map to selected segments of generated code. Exemplary embodiments may allow a segment of generated code to map to a graphical affordance, various graphical affordances, portions of a graphical affordance, etc.

When code is generated, one or more intermediate representations (IRs) may be generated. An IR, as used herein, refers to a representation, such as a data structure that is stored in memory, a file, a database, or any other acceptable storage medium. The IR can be constructed from input data contained within a source language (i.e., a language used by a graphical model) and from which part or all of the target language information (i.e., generated code) is constructed. One example of an intermediate representation that can be used with exemplary embodiments is a control flow graph (CFG). An IR may have meta tags to identify where the content of the IR is derived from. A meta tag associates the content of the IR with content that is used to generate the IR. The content of an IR may be derived from, for example, elements in a graphical model, optimization rules, model configuration options, etc.

Exemplary embodiments may also enable round-trip editing between a graphical model and generated code related to the graphical model. Round-trip editing allows a user to modify segments of generated code or portion of a graphical model without requiring a complete regeneration of generated code and/or the graphical model. The round-trip editing may enable, for example, regeneration of only the generated code that is affected by the modifications. For example, a user may generate code from a graphical model and may subsequently modify a portion of the graphical model. A segment of generated code that corresponds to the modified portion of the graphical model may be updated, while the remaining segments of generated code are unaffected. Subsequently, the user may modify a segment in generated code. After modifying the segment, a portion of the graphical model that corresponds to the segment may be updated, while the remaining portions of the graphical model are unaffected.

A user may implement a search operation to search for recurring graphical affordances or segments of generated code. Segments of generated code that correspond to the recurring graphical affordance detected by the search may be graphically identified. Likewise, graphical affordances of a graphical model that correspond to recurring generated code segments detected by the search may be graphically identified. The recurring graphical affordances or recurring segments may be replaced with another graphical affordance and/or segment, respectively, by the user. When the recurring graphical affordance is replaced, generated code may be updated so that segments in generated code that correspond to the recurring graphical affordance are replaced to reflect the replacement of the recurring graphical affordance. Similarly, when the recurring segment is replaced, the graphical model may be updated so that graphical affordances that correspond to the recurring segment are replaced to reflect the replacement of the recurring segment.

Tracing information that associates graphical affordances with segments in generated code may be generated. The tracing information may provide a complete mapping between the graphical model and generated code and may be an independent representation stored in, for example, an independent file, database, repository, etc. A programmable application program interface (API) may be provided that allows interaction with the independent representation of tracing information. The programmable API may allow a user to develop and/or use an external debugger for debugging generated code or a graphical model. In this manner, the user may create a debugging application that is independent from the graphical modeling environment. Exemplary implementations of the debugging application may interact with the graphical modeling environment through the programmable API. The programmable API may allow for programmatic and/or graphical identification of segments of generated code or graphical affordances of the graphical model based on the tracing information in the independent representation.

Exemplary embodiments may further provide generated reports that may be generated from a graphical model and/or generated code. The generated reports may be mapped to the graphical model and/or generated code to allow for graphically identifying sections in the generated report. The mapping may also allow graphically identifying portion of the graphical model or segments of generated code based on a selection of one or more sections in the generated reports. Generated reports may include a listing of generated code, information regarding how the generated code was generated, information regarding an execution of a graphical model, generated code, etc.

FIG. 1 is an exemplary high-level block diagram of the graphical modeling environment 100 (hereinafter environment 100) for modeling, simulating, analyzing, etc., systems, such as dynamic systems. The environment 100 may include a graphical modeling interface 110 (hereinafter interface 110), a textual interface 130, an execution engine 140, a code generating tool 150, a report generating tool 160, and one or more programmable application program interfaces (APIs) 170. The environment 100 may be an integrated environment and may allow a user to simultaneously view a graphical model and generated code. To enable simultaneous viewing, the environment 100 may be implemented as a Multiple Document Interface (MDI) application.

The environment 100 allows a user to develop graphical models using the interface 110. The interface 110 can be a graphical user interface that may include a canvas that is represented by a graphical area on the interface 110. The canvas may allow a user to develop and/or view graphical models. For example, a user can place elements 114, 116 and/or 118 on the canvas to create the graphical model 112. The interface 110 may also provide options to allow the user to generate code and/or a report from the graphical model 112. Interface 110 may also allow a user or the environment 100 to add elements, delete elements, replace elements, etc., in the graphical model 112. For example, a user may create the graphical model 112 via the interface 110. The created graphical model 112 may represent a model of a system, such as a dynamic system and/or another type of system. The user may use predefined elements (e.g., system defined, environment defined, etc.) or user-defined elements to develop graphical model 112.

Elements 114, 116 and/or 118 may represent, but are not limited to continuous and/or discrete dynamics elements, such as integration elements, unit delay elements, etc.; algorithmic elements, such as sum, product, lookup tables, etc.; and/or structural elements, such as multiplexers, switches, signal or bus selectors, etc. Elements 114, 116 and/or 118 may also represent states, where the graphical model 112 may include a state diagram model. Elements 114, 116 and/or 118 may be used in the graphical model 112 to develop a model of a system, such as a dynamic system. Elements 114, 116 and/or 118 may be supplied by the environment 100. The environment 100 may allow a user to alter environment supplied elements 114, 116 and/or 118 or create customized elements. In another implementation, a user may supply one or more of elements 114, 116 and 118. For example, a user may create elements 114, 116 and/or 118, thereby implementing user specified elements 114, 116 and/or 118. The user supplied elements 114, 116 and/or 118 that may contain programming language statements or instructions in a technical computing language.

Elements 114, 116 and 118 may have parameters. Parameters may affect the functionality or execution of the graphical model 112. Parameters that affect the functionality or execution of the graphical model may be referred to as functional parameters. Some examples of functional parameters include, for example, a sample time parameter that determines when the elements 114, 116 and/or 118 execute, scaling parameters that may affect the magnitude of an output of the element 114, 116 or 118, data type that determines the format in which data is passed from one element to another, etc. Parameters may also be nonfunctional in that they do not affect the functionality or execution of the graphical model. Some examples of nonfunctional parameters include, for example, an element name, an elements appearance, annotated text that is associated with the element, etc. Nonfunctional parameters may also be associated with characteristics such as power consumption, execution time, and weight.

Elements 114, 116 and/or 118 may be connected to each other to pass signals in the graphical model 112. Signals may be passed to and/or from elements in the graphical model 112. The signals can be represented by various types, such as integer, floating point, double, unsigned, signed bytes or words, etc. The signals may be contained in a bus format and/or may use frames. A bus format, as referred to herein, provides a format for transmitting a collection of signals to and from elements in a graphical model. A bus format may have a bus width that indicates how many signals the bus contains. When signals are in a bus format the signals may be transmitted to the same element or may be transmitted to different elements that are connected to the bus. Frames, as referred to herein, are a temporal collection of data samples. For example, a frame can include fixed number of data samples that are transmitted as unit from one element to another element in a model. The samples in a frame may, for example, represent a serial stream of data that is transmitted during a specified time period. For example, a user or system can determine a time interval for a stream of data that is assembled into one or more frames. When an assembled frame is transmitted, all samples in the frame may be sent at substantially the same time.

The textual interface environment 130 allows a user to develop a user-specified element (e.g., element 114) with code in a textual language. Code developed using the textual interface 130 may be included as, for example, the element 114 in the graphical model 112. The textual interface 130 may also facilitate debugging and profiling of graphical model 112 or the environment 100 may include a separate graphical debugger and profiler (not shown in FIG. 1).

The execution engine 140 may communicate with the interface 110. The execution engine 140 can receive the graphical model 112, which may represent, for example, a block diagram, state diagram, data flow diagram, etc., that is generated using the interface 110. The execution engine 140 may simulate the graphical model 112 in one implementation. The execution engine 140 may generate data from the execution of the graphical model 112. The data may be displayed to a user in a textual or graphical form. For example, the data may be presented to the user in table form or in graph form. The environment 100 may use a centralized data viewer to view the data generated by the execution engine 140.

The execution engine 140 may use numerical integration methods to compute behavior for differential equation as well as difference equation models. These numerical integration methods may be explicit and implicit as well as fixed step or variable step. A zero-crossing detection and location mechanism may be used by the execution engine 140 to identify and locate times at which events occur, such as a modeled collision between two rigid bodies. The execution engine 140 may handle difference equations by precomputing a static schedule of times when values change. This static schedule may employ a base rate that is the greatest common denominator of all sample times that are scheduled for execution by the execution engine 140. The execution engine 140 may handle discrete event systems based on a base rate or by using a dynamical scheduling mechanism, such as an event calendar. The execution engine 140 may employ any combination and/ or permutation these features. Part or all of the functionality of the execution engine 140 can be included in generated code and it may be optimized in a similar manner as generated code.

The code generating tool 150 may generate code, such as source code, object code, a compiled executable, a library, etc., for forming an executable representation of the graphical model 112 provided by the interface 110. The code generating tool 150 may also be used to generate a hardware description language (HDL) or a register transfer language (RTL) representation of the graphical model 112. The generated code may be stored in multiple files. For example, part of the generated code may be stored in a header file, while another part of generated code may be stored in a source file. In an exemplary implementation, code generating tool 150 may include a code generating tool such as Real-Time Workshop® from The MathWorks, Inc. of Natick, Mass., or any software tool that may be capable of generating executable code, instructions, etc., in a programming language such as JAVA®, Javascript, Python™, C, C++, an assembly language, etc.; a hardware description language such as Verilog, VHDL, etc.; RTL; etc. To generate code the code generating tool 150 may convert a source model language representation of the graphical model 112 to a target language representation.

During the code generation process, the code generating tool 150 may generate one or more IRs prior to generating code from the graphical model 112. For example, the code building tool 150 may generate an IR and may subsequently generate code from the IR. The IR may be a CFG that captures the semantics of the graphical model 112. An IR represented by a CFG may include nodes that represent algorithmic aspects of the graphical model 112 and edges that indicate the flow of the algorithms.

The code generating tool 150 may generate code for the execution of the graphical model 112 that is provided by the interface 110. The code generating tool 150 may also compile generated code into object code and build an executable program, library or any other form of executable instructions. The generated code may be designed to run on any processor, microprocessor, dual-core processor, multi-core processor, cluster of processors, digital signal processor (DSP), system on chip (SOC), reconfigurable signal conditioning hardware, operating system, computational hardware device, component of a computational hardware device, etc. In one embodiment, generated code may include embedded code targeted to run on any type of embedded system. For example, generated code may be implemented as firmware in an electronic system that uses a microprocessor or a microcontroller. Additionally, generated code can be customized to run on a specific target hardware platform. For example, generated code may include fixed-point code to run a fixed-point processor or generated code may emulate fixed-point behavior on a floating-point processor.

The graphical model 112 may include directives as how generated code should be generated. For example, the element 114 in the graphical model 112 may be directed to have a corresponding function, method, procedure, etc., to be generated in generated code with an argument list and name as directed by the code generating tool 150. A function, method, procedure, etc., as used herein refers to a segment of code that has a defined interface for passing arguments. For clarity, the terms function, method, procedure, etc., will be referred to hereinafter simply as a function. A function performs an operation that is defined by the content in the function. The function may or may not return a value when the operation is complete. The function may be reused by other graphical model elements (e.g., elements 116, 118, etc.) with the same, or similar, functionality. Generated code may be that of a programming language, such as JAVA®, Javascript, C, C#, C++, an assembly programming language, etc.; a hardware description language, such as Verilog, VHDL, etc.; RTL; etc.

Further, optimizations such as expression folding, function inlining, function outlining, constant propagation, etc., may be applied to generated code. Expression folding refers to reducing multiple expressions to a single expression in generated code. Function inlining refers to placing the contents of a function inline so that when a function is called the function does not have to go to a call site that is external to the body of generated code to perform its operation. Function outlining refers to outlining an inlined function such that when the function is called the function has to go to a call site that is not part of the body of generated code. Constant propagation refers to replacing variables that reference a constant with the constant.

In one embodiment, the environment 100 may read code and may create corresponding elements in the graphical model 112. For example, an include file that contains code, such as, a struct definition, may be read by the environment 100 and a corresponding element (e.g., element 114) may be created in the graphical model 112. Alternatively, the code may include variables that are associated to memory locations and a location or reference that corresponds to the memory locations (e.g., pointer) may be provided in the graphical model 112.

The report generating tool 160 generates a report. The generated report may be, for example, a document structured with sections corresponding to different elements of the graphical model 112 representation, a coverage report, a model checking report, a code generation report incorporating syntax highlighted code, a profiling report that documents relative execution times of each of the elements, etc. Coverage reports, such as a code coverage report, a model coverage report, decision coverage report, condition coverage report, a condition/decision coverage report, a structural coverage report, etc., are reports that provide the user with information for determining how well the graphical model 112 and/or generated code cover a desired characteristic. For example, a user can develop the graphical model 112 based on requirements and can generate code from the graphical model 112. The user can generate a model and/or code coverage report that provides information on whether the graphical model 112 and/or generated code meet the requirements. When generating a coverage report, a series of tests may be performed on the graphical model 112 and/or generated code to determine whether the requirements are met. The tests may serve to execute the graphical model 112 and/or generated code to exercise the functionality of the graphical model 112 and/or generated code. A model checking report provides an assessment of whether a certain condition can be satisfied, given a number of assumptions. For example, a model checking report may provide an assessment whether a signal may become 0 when another signal is always between 0 and 1. The generated report can include a document that may use navigable links, such as a mark up language document and may contain information relating to the graphical model 112, settings of the code generating tool 150 and/or the generated software (code).

The programmable APIs 170 can allow a user to interface the environment 100 with an external browser and/or debugger. The programmable API 170 can allow the user to browse or debug generated code and/or the graphical model 112 and to programmatically identify a code segment in generated code that corresponds to a graphical affordance in the graphical model 112 or to programmatically identify a graphical affordance in the graphical model 112 that corresponds to a segment in generated code using the external browser and/or debugger. For example, an identified graphical affordance may include an element, a signal, an annotation, etc. The programmable API 170 can allow the external browsing or debugging to graphically identify segments of generated code or portions of the graphical model 112. An external code browser and/or debugger can use tracing information and the programmable API 170 to browse and/or debug the graphical model 112 and/or generated code.

When generating an IR, code, a report, etc., the environment 100 may use transformation rules. Transformation rules, for example, may determine how an element is represented in the IR or generated code. For example, there may be a transformation rule relating to the element 114 for transforming the element 114 into a section of the IR and there may be another transformation rule for transforming the section of the IR into generated code. The transformation rules may exist in a computer readable medium and may be contained in a file, database, repository, etc. In some embodiments a graph rewriting system may be used to implement a transformation rule. Graph rewriting systems may also be referred to as using a "graph grammar". Graph grammar may use pattern matching for replacing one graph structure with another. There are numerous ways to implement pattern matching. One common implementation is guided by heuristics to manage the computational complexity. Graph grammar may employ any number of rewriting rules (transformation rules) that can be extended by textual transformation information. Some embodiments may implement triple graph grammar or a higher order of graph grammar when generating an IR, code, a report, etc. Transformation rules, such as those implemented using triple graph grammar, may allow, for example, mapping between a first entity (e.g., an IR, generated code, a generated report, etc.), a second entity that is generated from the first entity, and the information (e.g., transformation rules) used to generate the second entity.

The programmable APIs 170 may also enable graphically identifying graphical affordances or segments of generated code that correspond to a graphical interface of a user-specified element (e.g., element 114). For example, a user may define a function in a programming language, such as MATLAB®, C, C++, JAVA®, Javascript, etc., and the user may incorporate the function into the graphical model 112. The code for the user-specified element may be developed using the textual interface 130 or any other application that allows a user to develop textual code, such as a word processing application, a code browser, etc. The function can be represented by a graphical affordance that has a graphical interface. The graphical interface can represent, for example, inputs, outputs, triggers, etc., and may enable other elements in the graphical model 112 to connect to the element that represents the function.

One of ordinary skill in the art will also appreciate that the components of the environment 100 may be provided on a single computing device, as described below with reference to FIG. 2, on multiple computing devices (e.g., in a distributed configuration), and/or in other configurations (e.g., a multi-core implementation operating on one or more platforms).

Figure 2:
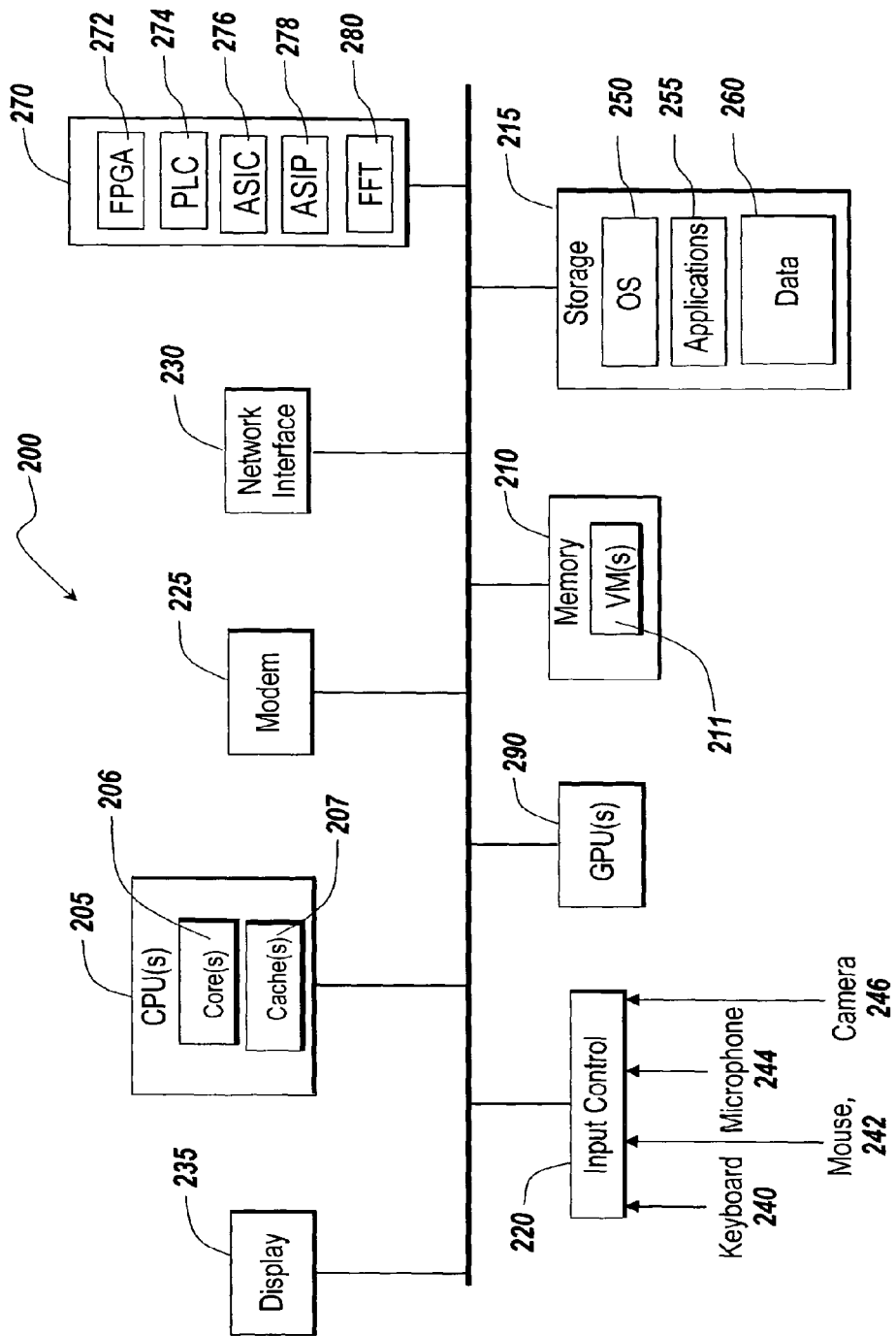
FIG. 2 depicts an exemplary computing device suitable for practicing an illustrative embodiment.

FIG. 2 is an exemplary computing device 200 suitable for practicing the exemplary embodiments. The implementation of FIG. 2 is illustrative and not limiting. The computing device 200 may take many forms, including but not limited to a personal computer, workstation, server, network computer, quantum computer, optical computer, bio computer, Internet appliance, mobile device, a pager, a tablet computer, a smart sensor, application specific processing device, etc.

The computing device 200 may be electronic and may include a Central Processing Unit (CPU) 205, memory 210, storage 215, an input control 220, a modem 225, a network interface 230, a display 235, processor 270 and a graphical processing unit (GPU) 290. The CPU 205 may control components of the computing device 200 to provide the interface 110, the textual interface 130, the execution engine 140, the code generating tool 150, the report generating tool 160, and/or one or more programmable APIs 170. The memory 210 may store instructions and data, and may provide the instructions and data to the CPU 205. CPU 205 may operate the computing device 200 and may run the interface 110, the textual interface 130, the execution engine 140, the code generating tool 150, the report generating tool 160, and/or one or more programmable APIs 170 based on the stored instructions.

Optionally, the computing device 200 may include multiple CPUs 205 for executing software loaded in the memory 210, and other programs for controlling system hardware. Each of the CPUs 205 can be a single or a multiple core processor 206. The code loaded in the memory 210 may run in a virtualized environment, such as in a Virtual Machine (VM) 211. Multiple VMs 211 may be resident on a single processor. Also, part of the application may run in processor 270, which may include, for example, a field programmable gate array (FPGA) 272, programmable logic controller (PLC) 274, an application specific integrated circuit (ASIC) 276, an application specific instruction set processor (ASIP) 278, a Fast Fourier Transform (FFT) processing device 280, etc. Further, part of the applications may be run on analog electronic devices that may be included in the computing device 200. Other resources, such as, for example, GPU 290, may also be used to run part of the applications.

The storage 215 may contain software tools for applications. The storage 215 may include code 250 for the operating system (OS) of the device 200, code 255 for applications running on the operation system including the applications for the interface 110, the textual interface 130, the execution engine 140, the code generating tool 150, the report generating tool 160, and/or one or more programmable APIs 170 and data 260 generated from the interface 110, the textual interface 130, the execution engine 140, the code generating tool 150, the report generating tool 160, one or more programmable APIs 170, and/or other code. Portions of applications may be stored in the CPU cache 207, memory 210, and/or elsewhere, such as on a remote storage device connected to computing device 200 via a network, a bus, a dedicated link, etc.

The input control 220 may interface with a data entry device, such as a keyboard 240, a pointing/indexing device, such as a mouse 242, a microphone 244, a camera 246, such as a web camera, and/or other input devices. The computing device 200 may receive, through the input control 220, input data, such as the input data for developing graphical model 112. The computing device 200 may display on the display 235 user interfaces for displaying the data generated from the interface 110, the textual interface 130, the execution engine 140, the code generating tool 150, the report generating tool 160, and/or one or more programmable APIs 170.

Figure 3:
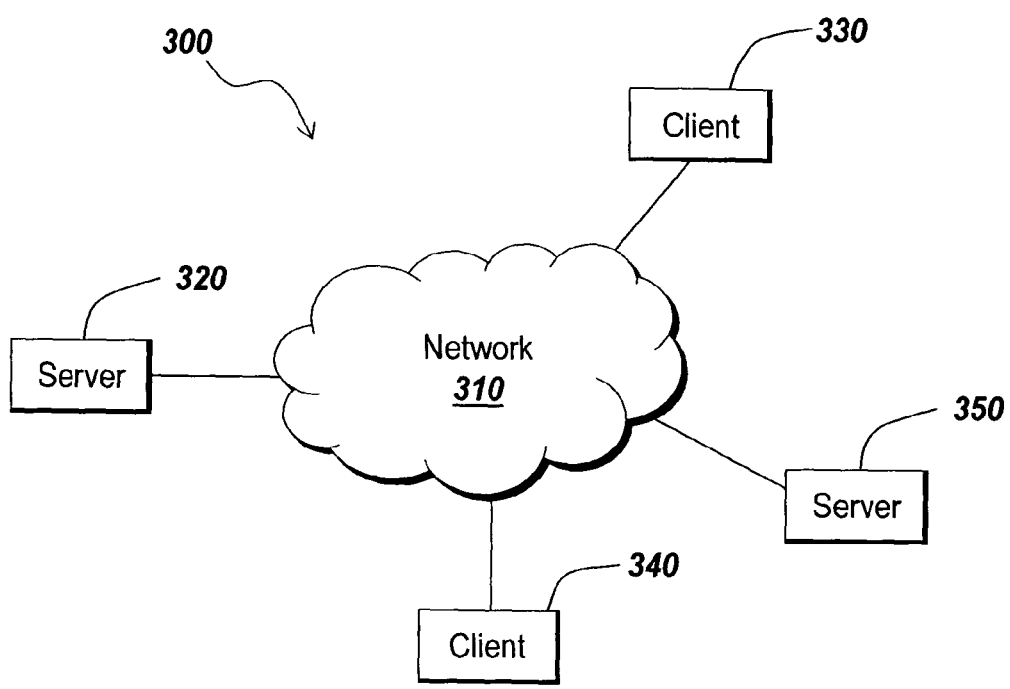
FIG. 3 depicts an exemplary distributed system suitable for a distributed implementation of exemplary embodiments.

FIG. 3 is an exemplary network environment 300 (hereinafter environment 300) suitable for processing distributed implementations of the exemplary embodiments. Environment 300 may include one or more servers 320/350 coupled to clients 330/340 via a communication network 310. In one implementation, servers 320/350 and/or clients 330/340 can be implemented via the computing device 200. The network interface 230 and the modem 225 of the computing device 200 enable the servers 320/350 to communicate with the clients 330/340 through the communication network 310.

The communication network 310 may include Internet, intranet, Local Area Network (LAN), Wide Area Network (WAN), Metropolitan Area Network (MAN), wireless network (e.g., using IEEE 802.11, Bluetooth, etc.), etc. The communication network 310 may use middleware, such as Common Object Request Broker Architecture (CORBA) or Distributed Component Object Model (DCOM) to allow a computer (e.g., client 320) on the communication network 310 to communicate directly with another computer or device (e.g., client 330) that is connected to the communication network 310. In addition, the communication network 310 may use RMI (Remote Method Invocation) or Remote Procedure Call (RPC) technology. RMI and RPI are exemplary technologies that allow functions, methods, procedures, etc., to be called over the environment 300. For example, the client 330 may invoke a method that resides remotely on the client 340.

In environment 300, the servers 320/350 may provide the clients 330/340 with software components or products under a particular condition, such as a license agreement. The software components or products may include those for providing the interface 110, textual interface 130, the execution engine 140, the code generating tool 150, the report generating tool 160, one or more programmable APIs 170, etc. For example, the client 340 may perform the modeling of a dynamic system using a software component provided by the server 320 and send the server 320 the model for execution. The server 320 may return the execution results to the client 340 and the client 340 may subsequently display the data to the user with the information on the data.

Figure 4A:
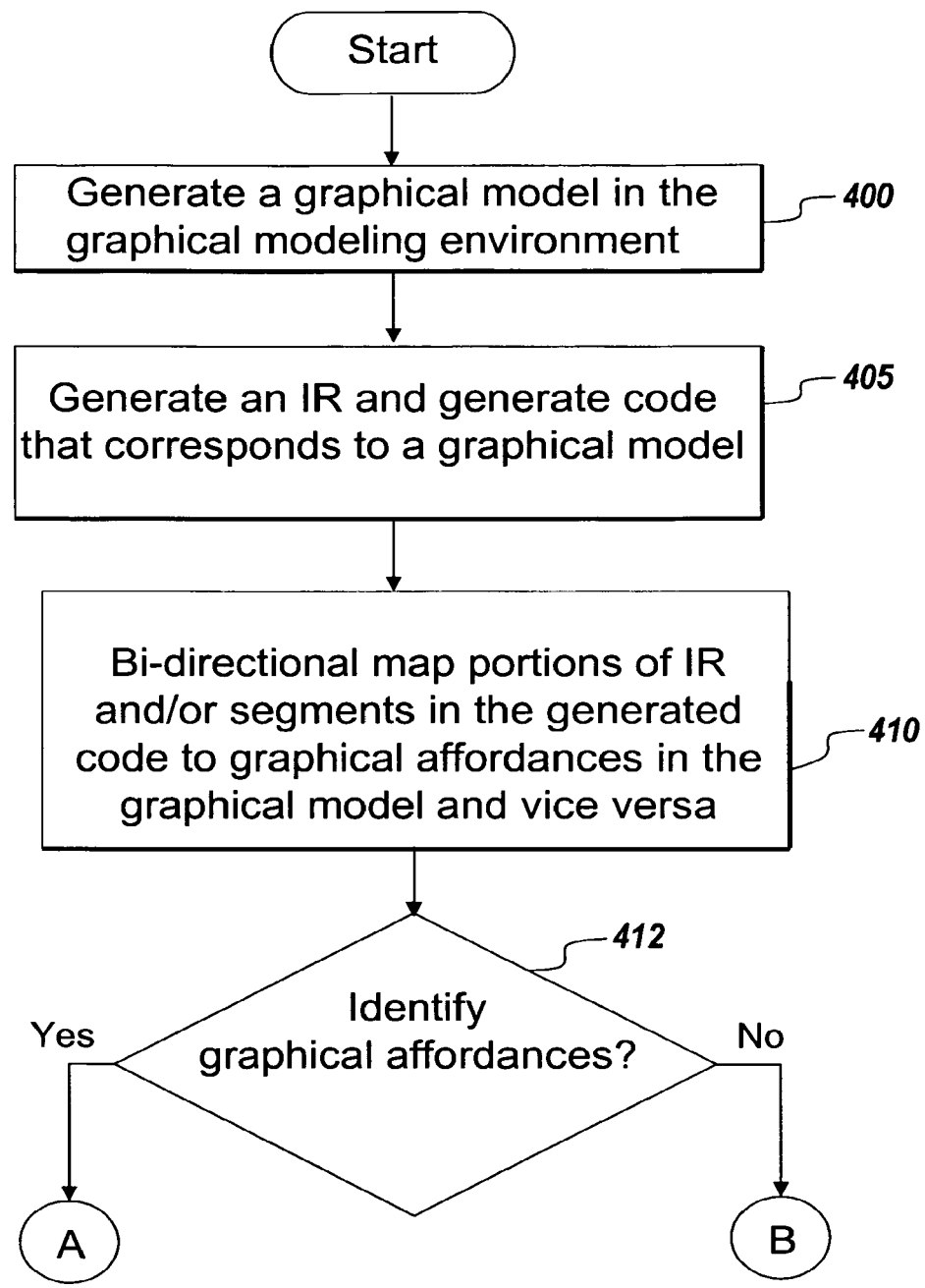
FIGS. 4A-4C depict a flow diagram that illustrates exemplary steps for providing traceability between a graphical model and generated code.
Figure 4B:
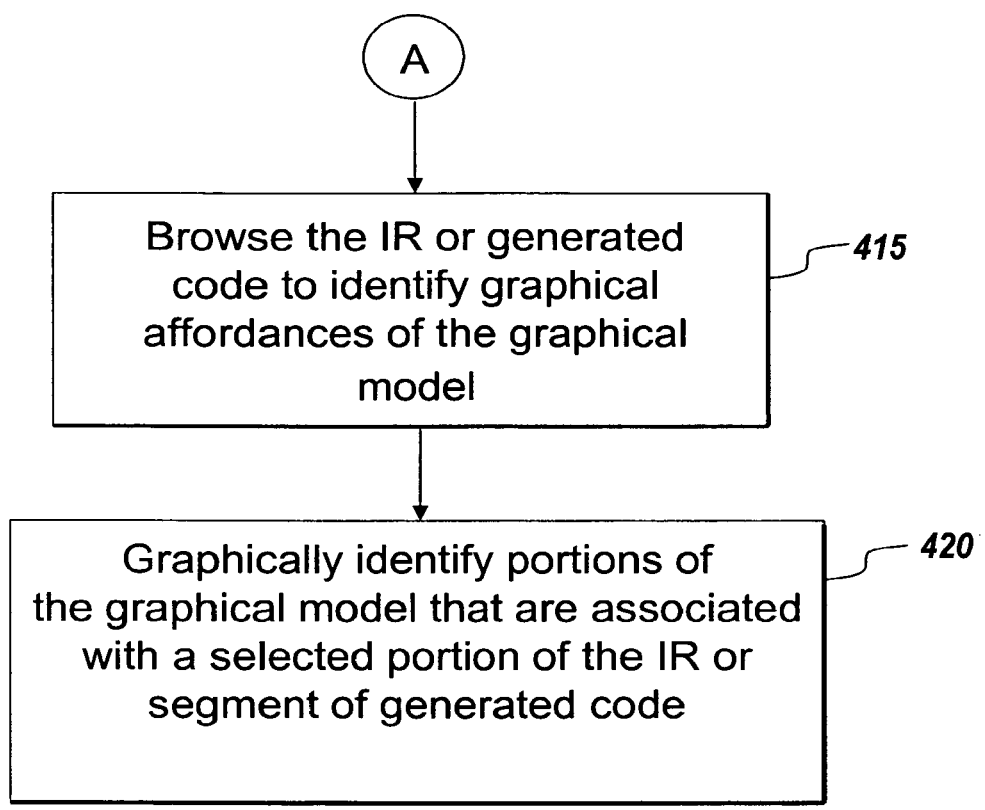
Figure 4C:
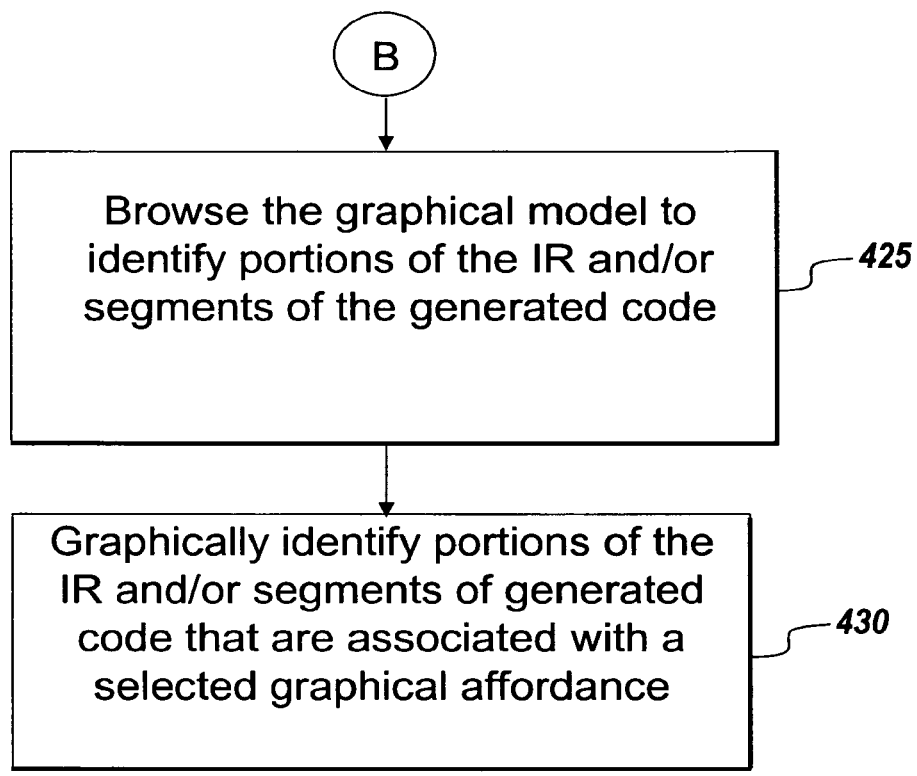

FIGS. 4A-C depict a flow diagram that illustrates exemplary processing techniques that can be used to perform traceability operations between the graphical model 112, generated code, and/or an IR generated from the graphical model 112. A user can generate the graphical model 112 in the environment 100 (step 400). The graphical model 112 that is generated may be executable in the environment 100 and may represent a graphical model of a system, such as a dynamic system. In one implementation, the graphical model 112 can be represented by a source model language, such as, for example, Simulink® software.

In some instances, the user may not specify all of the parameters of the graphical model 112. For example, the user may not specify values for some parameters in the graphical model 112, such as a sample time or data type. These parameter values can be inferred by the environment 100. For example, the parameter values of a graphical affordance (e.g., element 118) may be inferred from other graphical affordances (e.g., elements 114 and 116) in the graphical model 112. Inferences, such as these, may occur when the parameter values of the other graphical affordances are specified or the other graphical affordances have access to a graphical affordance that has the specified parameter values. In this manner, a graphical affordance that has an unspecified parameter may inherit one or more parameters from another graphical affordance that is associated with the graphical affordance. Such inferences may occur using a technique referred to as "propagation" or by solving a constraint satisfaction problem using, for example, optimization techniques. Inferences may further occur using other techniques.

The code generating tool 150 can generate one or more IRs from the graphical model 112 and can generate code that corresponds to the graphical model 112 (step 405). The code generating tool 150 converts the source model language that represents the graphical model 112 into a target language (i.e., generated code). For example, the code generating tool 150 may generate code in a programming language, such as C, C++, JAVA®, Javascript, an assembly language, etc., or the code generating tool 150 may generate code in a hardware description language, such as Verilog, VHDL, etc. The generated code may be stored in multiple files, such as in a header file, a source file, etc. The IRs and generated code may be generated using transformation rules that may exist in a file, database, repository, etc. The transformation rules may be implemented using graph grammar, triple graph grammar or any other order of graph grammar.

The generated code may be compiled and executed external to the environment 100. For example, in one implementation generated code may be compiled and executed on a target processor to implement the functionality of the graphical model 112.

The segments in generated code and/or portions of the IRs can be bi-directionally mapped to graphical affordances in the graphical model 112 to associate the segments in generated code and/or portions of the IRs with aspects of the graphical model 112 and vice versa (step 410). Graphical affordances in the graphical model 112 that are translated into the IRs and/or generated code can be referenced within the IRs and/or generated code with a tag, association, etc. For example, a tag, association, etc., may be a hyperlink or another type of selectable connection for navigating between mapped entities (e.g., the graphical model 112, an IR, generated code, a generated report, a requirements document, etc.).

A common form of selectable connection is hyperlinked text or graphics that can be selected by the user (with a pointing device, data entry device or in some other fashion), resulting in the immediate delivery and/or view of another file. For example, hyperlinked text in generated code (e.g., a code segment in generated code) can be selected and a corresponding graphical affordance in the graphical model 112 can be displayed. Alternatively, a hyperlinked graphic in the graphical model (e.g., a graphical affordance, such as an element 114 or a signal) can be selected and a corresponding segment in generated code can be displayed. In the case where a hyperlink is used, a selection may be made, for example, by left-clicking with a pointing device or the hyperlink may simply be activated when the pointing device is positioned over the hyperlink.

In addition, where transformation rules are used to generate the IR and/or generated code, the mapping may include a map to and between the graphical model 112 and the IR; the IR and generated code; the graphical model 112 and generated code; etc. In this case, generation of the IR and/or the code may be predicated on the existence of the transformation rules. The mapping may allow a user to identify the transformation rules that are used when generating the IR and/or generated code.

The report generating tool 160 can generate a report that may incorporate generated code and/or mappings between generated code and the graphical model 112. The generated report may further include, for example, sections corresponding to information on different elements 114, 116 and/or 118 of the graphical model 112, a coverage report, a code generation report, a profiling report, etc. The same tags associated with generated code can be used for mapping sections of the generated report to aspects of the graphical model 112, generated code, and/or the IR. The same tags that are embedded in generated code or the generated report can be stored as part of the data structures represented by the elements 114, 116, and/or 118 in the graphical model 112.

If the user wishes to identify a graphical affordance that corresponds to a portion of the IR and/or a segment of generated code (step 412), the user can browse the IR or generated code to identify portions (e.g., a graphical affordance, such as element 114) of the graphical model 112 (step 415) (FIG. 4B). Upon selecting a portion of the IR or a segment in generated code, graphical affordances (e.g., element 114) of the graphical model 112 that are associated with the selected portion of the IR or segment in generated code can be graphically identified (step 420). Where transformation rules were used and there is a mapping to the transformation rules, the transformation rules that are associated with the selected portion or segment may also be graphically identified.

Alternatively, if the user does not wish to identify graphical affordance (step 412), but rather wishes to identify portions of the IR or segments of generated code that correspond to graphical affordances, the user can select graphical affordances (e.g., elements 114, 116 and/or 118) of the graphical model 112 to identify corresponding portions of the IR or segments of generated code (step 425) (FIG. 4C). Upon selecting a graphical affordance in the graphical model 112, portions of the IR or segments of generated code that are associated with the selected graphical affordance can be graphically identified (step 430). For example, the segments of generated code can be highlighted. Again, where transformation rules were used and the transformation rules were mapped, the transformation rules that are associated with the selected graphical affordance may be graphically identified.

In another embodiment, the user may execute the graphical model 112 to generate data. The generated data may be mapped to the portion of the graphical model 112 that was used to generate data. The mapping can provide tags or associations that relate the data to the graphical model 112 and can allow a user to identify the portion of the graphical model 112 that corresponds to the generated data. For example, a user can execute the graphical model 112 and the element 114 can generate a signal that is retained as generated data. The generated data can be displayed to a user with a centralized data viewer. The user may select the data and the element 114 in the graphical model 112 may be graphical identified.

Graphical identifiers, as discussed herein, provide a user with a way to discern those parts the entities (e.g., segments of generated code, graphical affordances of the graphical model 112, sections of a generated report or requirements document, portions of an IR, etc.) that correspond to each other. For example, to graphically identify a segment in generated code, a section in the generated report or graphical affordance in the graphical model 112, the segment, section or graphical affordance may be highlighted, change color, flash, etc.; or may become underlined, italicized, bolded, etc. A segment, section or graphical affordance may further be encompassed by a shape such as a rectangle, square, circle, oval, etc., and the border of the shape may be any color to aid in graphical identification. The interior of the shape may be shaded in a color or pattern according to exemplary embodiments. The graphical identifier may also be represented by an arrow or any other type of marker that can graphically identify the segment, section or graphical affordance to a user.

In another embodiment, a graphical identifier may be a window that displays the segments of generated code, the sections of the generated report or requirements document, or portions of the IR that correspond to the graphical model 112. For example, the user can select the element 114 in the graphical model 112 and the environment 100 can copy segments of generated code into a separate window that allows the user to view the segments of generated code that correspond to the element 114.

FIGS. 5A-D illustrate an implementation used to show a graphical model 500, generated code 550 and/or a generated report 580. In one implementation, the generated report 580 may be optionally generated; and in another implementation, the generated report 580 may be required for some activities or all activities. The graphical model 500 can be a model of a system and can include an element 502. Generated code 550 can be generated using a generate code option 510 (hereinafter option 510) and can include a segment 551 and a segment 555. The generated report 580 can incorporate a listing 592 of generated code 550. Generated code 550 or generated report 580 can be displayed to allow the user to inspect generated code 550 or generated report 580.

The generated report 580 may include a title 582, a summary section 584, an options section 586, a generated files section 588, a model settings section 590 and a listing section 592 of generated code 550. The title 582 provides a heading for the generated report 580. The summary section 584 may provide information as to particular versions of software applications that were used for the generated report 580, generated code 550 and/or the graphical model 500 as well as information pertaining to when the generated report 580 and/or generated code 550 were generated. The options section 586 provides information pertaining to various aspects that have been specified for code generation, such as in which language generated code 550 is generated. The generated files section 588 provides information pertaining to code files that were generated as a result of the code generation process. The model settings section 590 provides information pertaining to model settings, such as, for example, execution parameters. The listing section 592 provides listings of the generated code 550 that is generated from the graphical model 500 and may include a section 581 and a section 585.

Information included in a generated report 580 may vary. The generated report 580 may include more or less information than what is depicted in the generated report 580. For example, the generated report 580 may include a section that lists optimizations performed while generating generated code 550, such as expression folding, loop unrolling, function inlining, function outlining, constant propagation, etc. In addition, the generated report 580 can include information pertaining to execution warning, memory usage, compile time (that may be represented per file and/or as a total compile time), etc. In one implementation, formats of the generated report 580 may vary. For example, the generated report 580 may be a word processing document, a mark-up language document, a spreadsheet document, etc.

By selecting an element in the graphical model 500, segments of generated code 550 and/or sections of the generated report 580 can be graphically identified. For example, referring to FIG. 5B, the user can select the element 502 to identify segments 551 and 555 in generated code 550 and sections 581 and 585 in the generated report 580 using graphical identifiers 557 and 587, respectively. In some instances, the graphical identifier 557 and the graphical identifier 587 can be identical. When the graphical identifiers 557 and 587 are identical, it may provide an indication to the user that the sections 581 and 585 correspond to the segments 551 and 555 as well as to the element 502. The user may select an element 502 in the graphical model 500 by moving a pointing device 505 over the element 502 in the graphical model 500. In one implementation, the user can position the pointing device 505 on the element 502 in the graphical model 500 and the associated segments 551 and 555 of generated code 550 and/or the associated sections 581 and 585 of the generated report 580 are graphically identified. In another implementation, the user may select the element 502 in the graphical model 500 to identify segments 551 and 555 of generated code 550 and/or sections 581 and 585 of the generated report 580 by clicking on the selected element 502 in the graphical model 500.

Figure 5A:
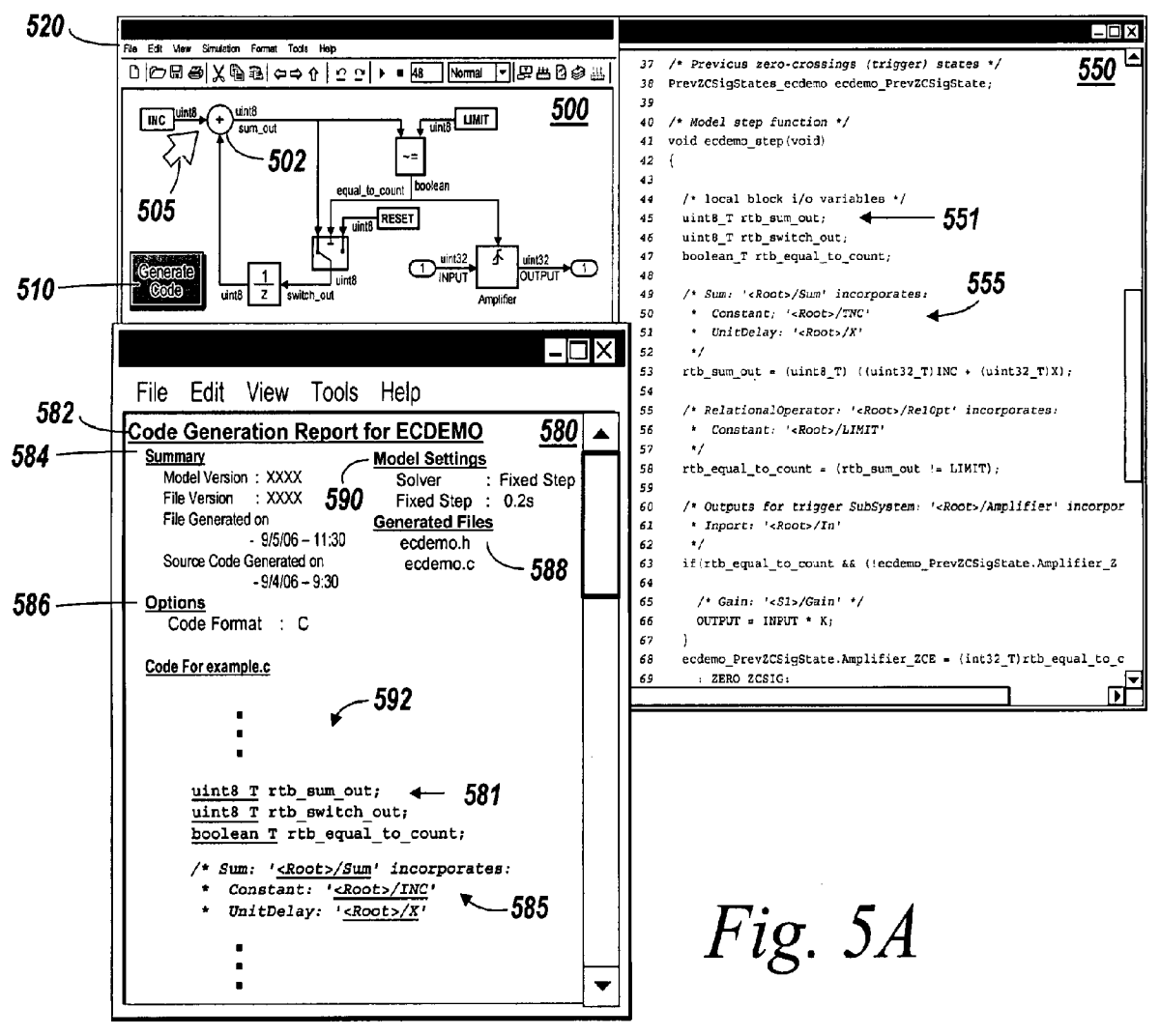
Figure 5B:
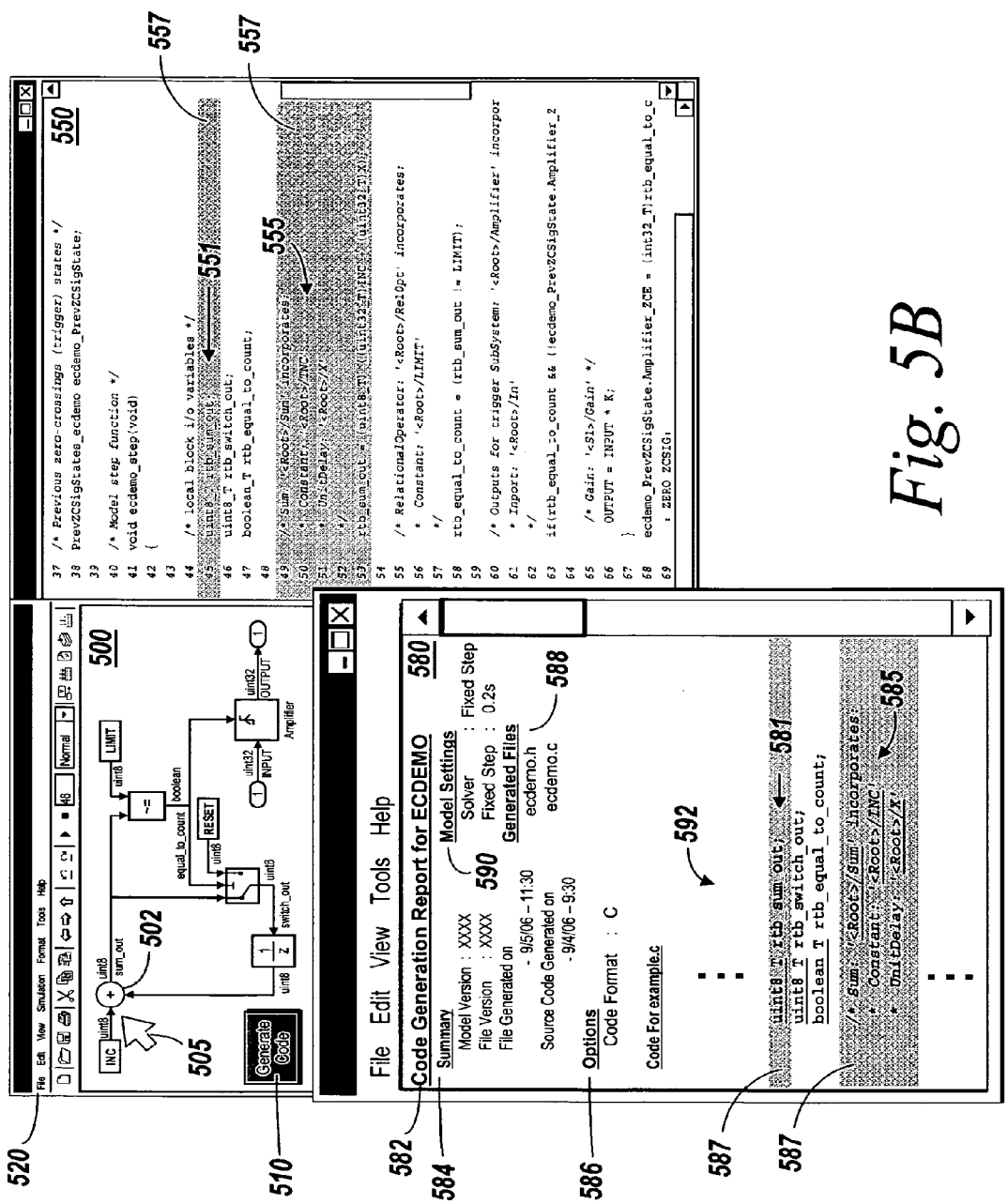
FIG. 5B depicts an exemplary graphical identifier for identifying segments of the exemplary generated code and sections of the exemplary generated report of FIG. 5A.
Figure 5C:
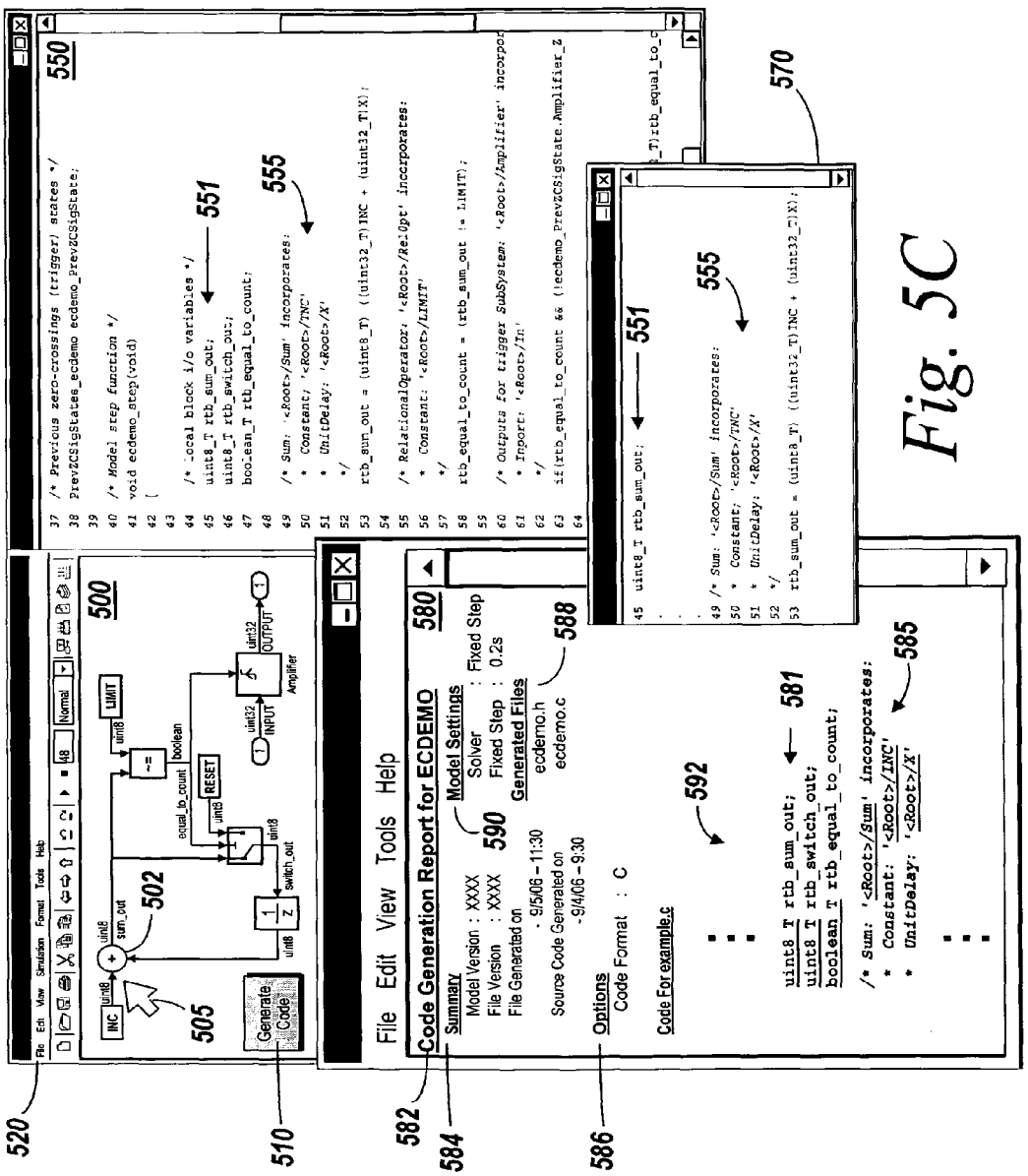
FIG. 5C depicts another exemplary graphical identifier for identifying segments of the exemplary generated code and sections of the exemplary generated report of FIG. 5A.

In another embodiment, the segments 551 and 555 of generated code 550 and/or the sections 581 and 585 of the generated report 580 may depicted in a window 570, as shown in FIG. 5C. The user may have the graphical model 500, generated code 550 and generated report 580 and may wish to identify the segments 551 and 555 that correspond to the element 502. The user may select the element 502 and the separate window 570 can be opened to display only the segments 551 and 555. To display only the segments 551 and 555, the environment 100 may copy the segments 551 and 555 into the window 570. The window 570 can be used to display other parts of other entities (e.g., sections 581 and 585 of the generated report 580, sections of a requirements document, portions of an IR, etc.) using the same mechanism.

Figure 6A:
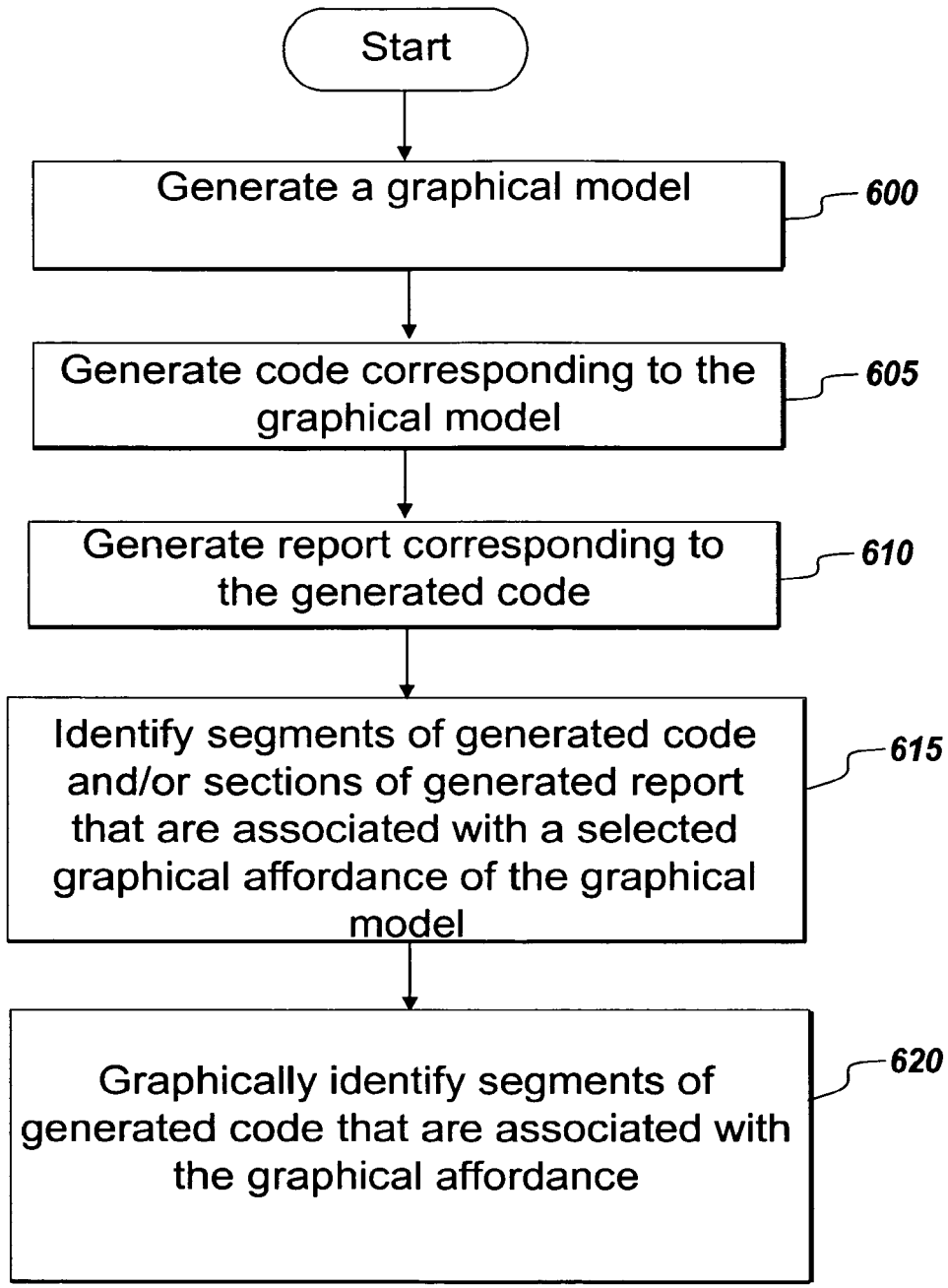
FIG. 6A is a flow diagram that depicts exemplary steps for graphically identifying segments of generated code or sections of a generated report based on selected graphical affordances.

FIG. 6A is discussed with references to FIGS. 5A-C and is a flow diagram illustrating steps for graphically identifying the segments 551 and 555 of generated code 550 or the sections 581 and 585 of the generated report 580 based on selecting the element 502. To begin, a user can generate the graphical model 500 that includes the element 502 (step 600). The user can generate code 550 corresponding to the graphical model 500 by selecting the option 510 (step 605). Optionally, the user can generate the generated report 580 that incorporates the listing 592 of generated code 550 and the associated mapping (step 610). The user can identify the segments 551 and 555 of generated code 550 or the sections 581 and 585 of the generated report 580 that are associated with the element 502 by selecting the element 502 (step 615). When the user selects element 502, the segments 551 and 555 of generated code 550 or the sections 581 and 585 of the generated report 580 that are associated with the element 502 are graphically identified by graphical identifiers 557 and 587, respectively (step 620).

In some instances, a graphical affordance may be mapped to multiple segments of generated code 550 or sections of the generated report 580 based on the various aspects of the graphical affordance. For example, referring to FIG. 5D, when the user selects the element 502 segments 551 and 555 and/or sections 581 and 585 can be uniquely identified. Segment 551 can be identified by a graphical identifier 591 and segment 555 can be identified by a graphical identifier 595. In addition, section 581 can be identified by the graphical identifier 591, thereby, identifying to the user that the section 581 corresponds to the segment 551 as well as the element 502. Likewise, section 585 can be identified by the graphical identifier 595, thereby, identifying to the user that the section 585 corresponds to the segment 555 as well as the element 502.

Figure 5D:
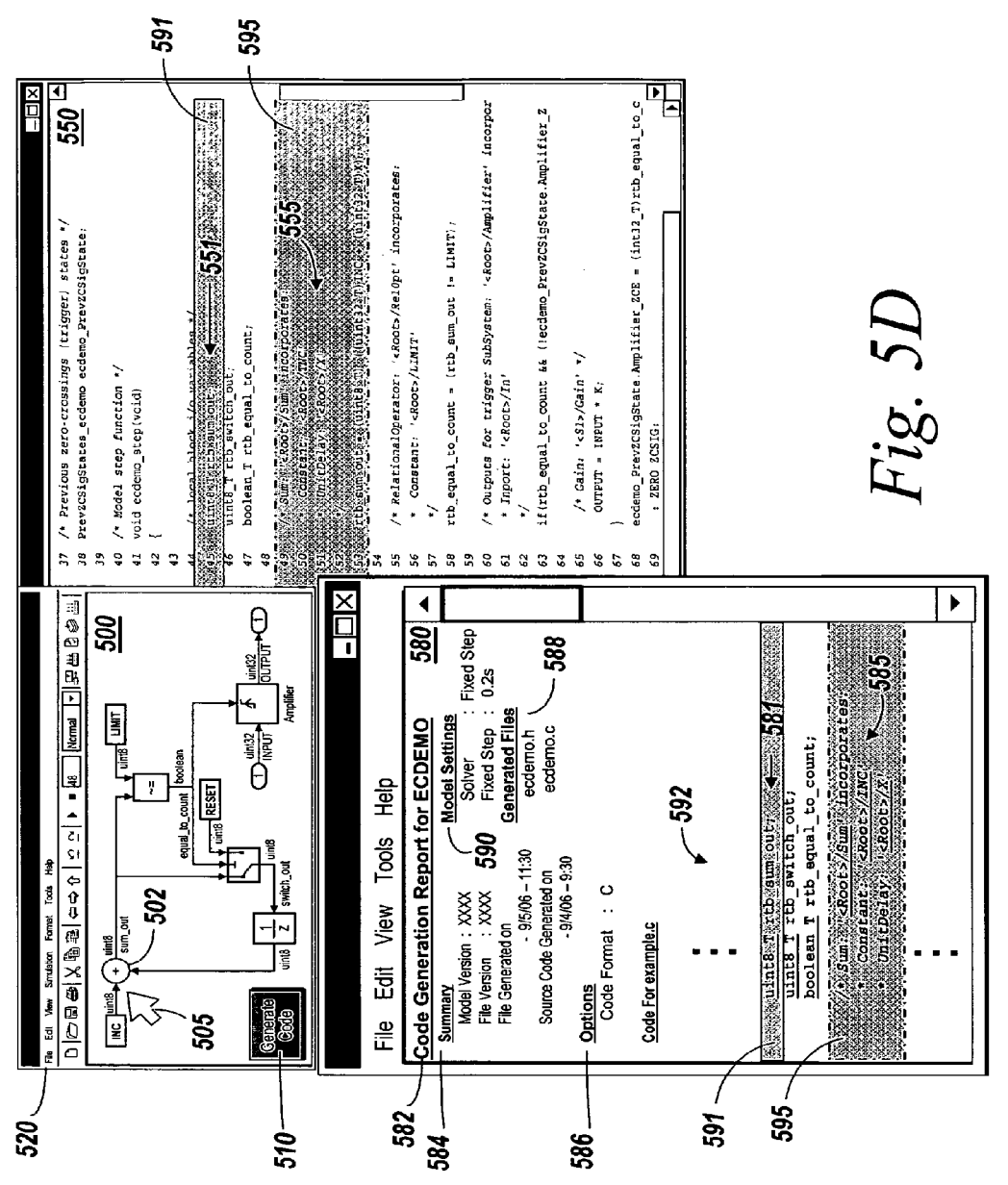
Figure 6B:
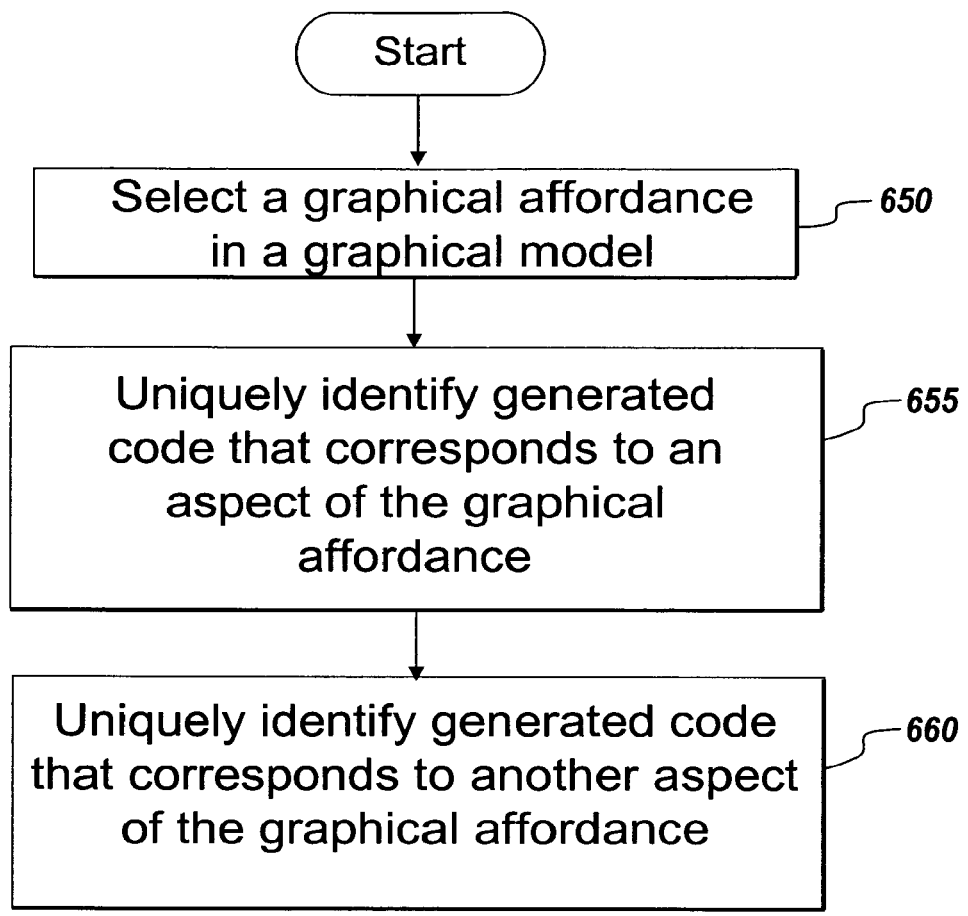
FIG. 6B is a flow diagram that depicts exemplary steps for uniquely identifying segments of the generated code or sections of a generated report based on corresponding aspects of a graphical affordance.

FIG. 6B is discussed in relation to FIGS. 5A and 5D and is a flow diagram that illustrates exemplary steps for uniquely identifying segments 551 and 555 of generated code 550 or sections 581 and 585 of the generated report 580 based on corresponding aspects of the element 502. In one implementation, the various aspects of the graphical affordance can be uniquely identified in generated code 550. The user can select the element 502 (step 650) and segment 551 of generated code that corresponds to one of the various aspects 501, such as an output variable of the element 502 can be uniquely identified by graphical identifier 591 (step 655), while segment 555 (FIG. 5C) of generated code 550 that corresponds to an output of the element 502 can also be uniquely identified by graphical identifier 595 (step 660).

In some embodiments, the user may want to limit segments of generated code 550 or sections of the generated report 580 that are graphically identified. For example, the user may only want to identify the segment 551 of generated code 550 or section 581 of the generated report 580 that relates to one of the various aspects 501, such as an output variable of the element 502 in the graphical model 500.

Figure 7:
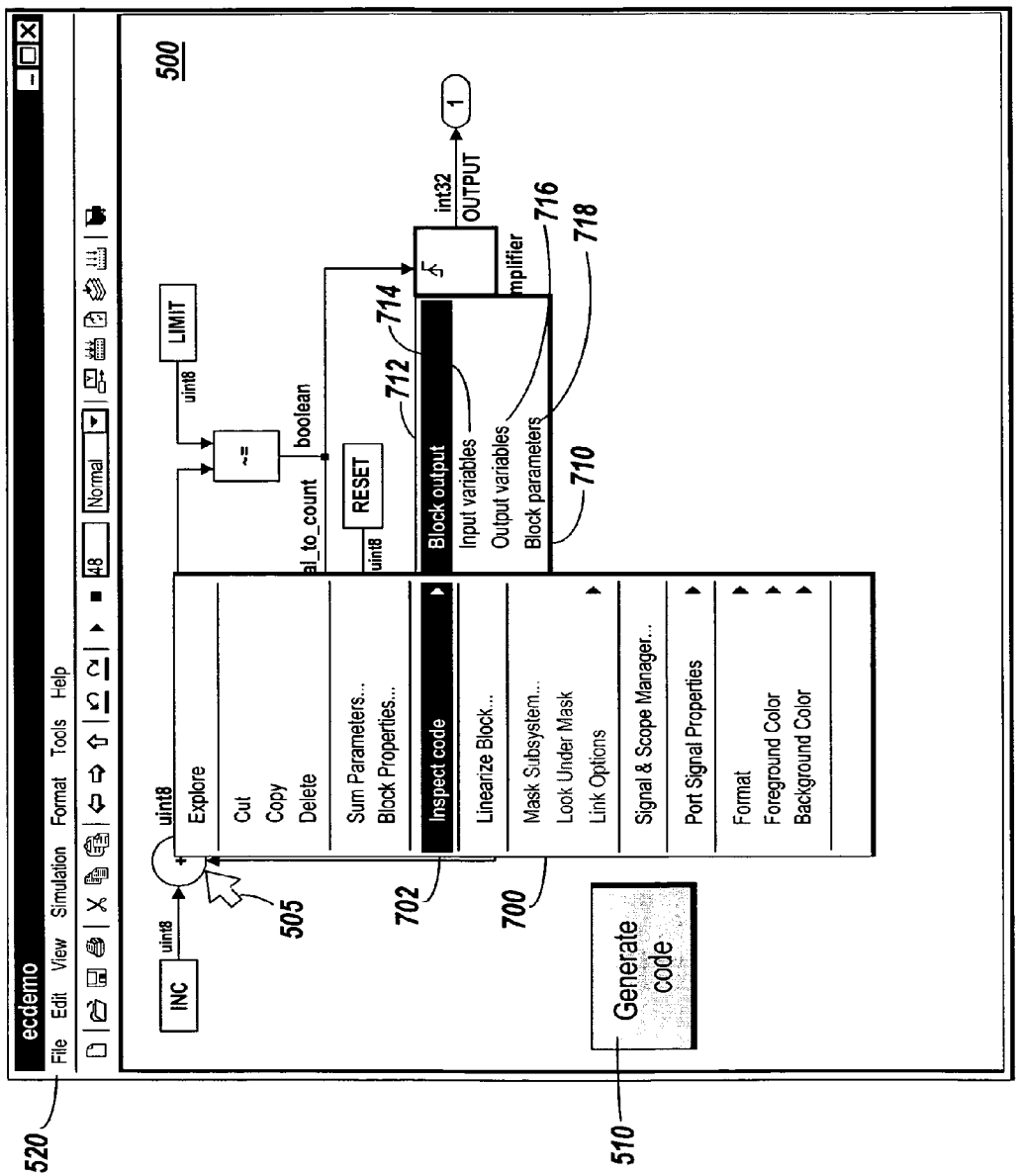
FIG. 7 depicts an exemplary menu that allows the user to specify what segments of the generated code or sections of a generated report the user wants to identify.

FIG. 7 is an example of a menu 700 that allows the user to specify segments of generated code 550 or sections of the generated report 580 that the user wishes to identify and/or with which the user wishes to interact. A user may right click on the graphical model 500 to open menu 700. In an alternative implementation, a user may select the "Tools" button from the menu bar 520. The menu 700 provides an "Inspect code" option 702 that allows a user to specify which segments of generated code 550 that are graphically identified when an element in the graphical model 500 is selected. For example, when the user selects the "Inspect code" option 702, a submenu 710 may be displayed that allows the user to select which segments of generated code 550 that are graphically identified.

The submenu 710 can include, for example, a "Block output" option 712, an "Input variables" option 714, an "Output variables" option 716 and a "Block parameters" option 718. When the user selects the option 712, segments of the generated code 550 or sections of the generated report 580 that correspond to the output of a selected element are graphically identified. When the user selects option 714, segments of generated code 550 or sections of the generated report 580 that correspond to input variables of a selected element are graphically identified. When the user selects option 716, segments of generated code 550 or sections of the generated report 580 that correspond to output variables of a selected element are graphically identified. When the user selects option 714, segments of generated code 550 or sections of the generated report 580 that correspond to element parameters of a selected element are graphically identified.

Figure 8:
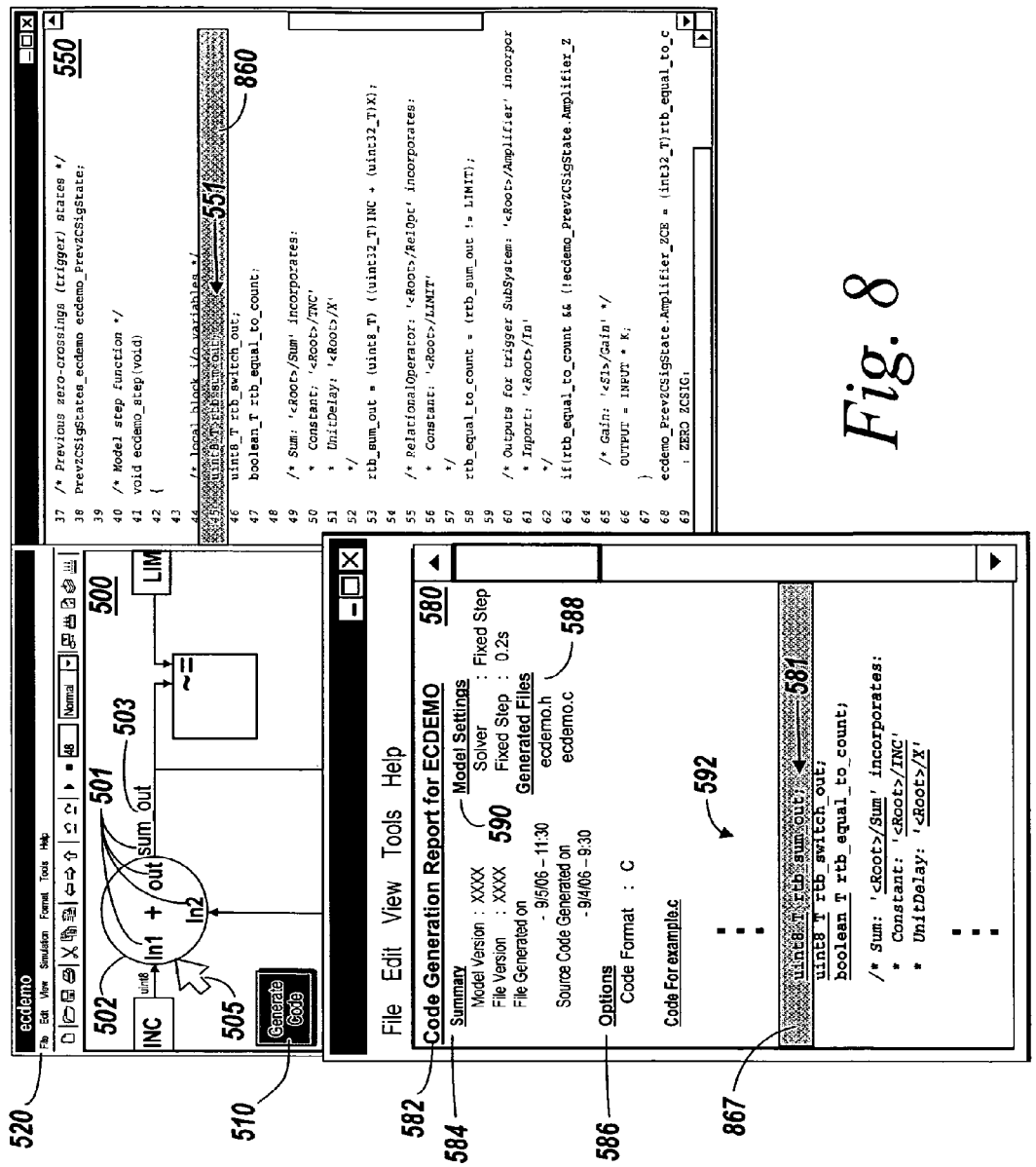
FIG. 8 depicts an exemplary graphical identification of a segment of generated code based on a selection of a graphical affordance in a graphical model.

FIG. 8 depicts the graphical model 500, generated code 550 and the generated report 580 discussed with reference to FIG. 5A. As discussed with reference to FIG. 5A, the graphical model 500 can be a model of a system and can include an element 502. Generated code 550 can be generated using the option 510 and include segments 551 and 555. The generated report 580 can incorporate a listing 592 of generated code 550 and can include sections 581 and 585. Generated code 550 or generated report 580 can be displayed to allow the user to inspect generated code 550 or generated report 580.

Referring to FIG. 8, the element 502 in the graphical model 500 can have various aspects 501, such as an output variable 503 that is associated with the element 502. Some examples of other various aspects may be signal names, outputs, input variables, element parameters, output variables, etc. Generated code 550 can have the segment of code 551 and/or generated report 580 can have the section 581 that corresponds to one of the various aspects 501, such as an output variable 503. Referring to FIG. 8, when the user selects the element 502 the segment 551 and section 581 can be graphically identified by a graphical identifier 860 and an identifier 867, respectively. In some instances, the graphical identifier 860 and the graphical identifier 867 can be identical to indicate to the user that the section 581 corresponds to the segment 551 as well as to the output variable 503 of the element 502.

Figure 9:
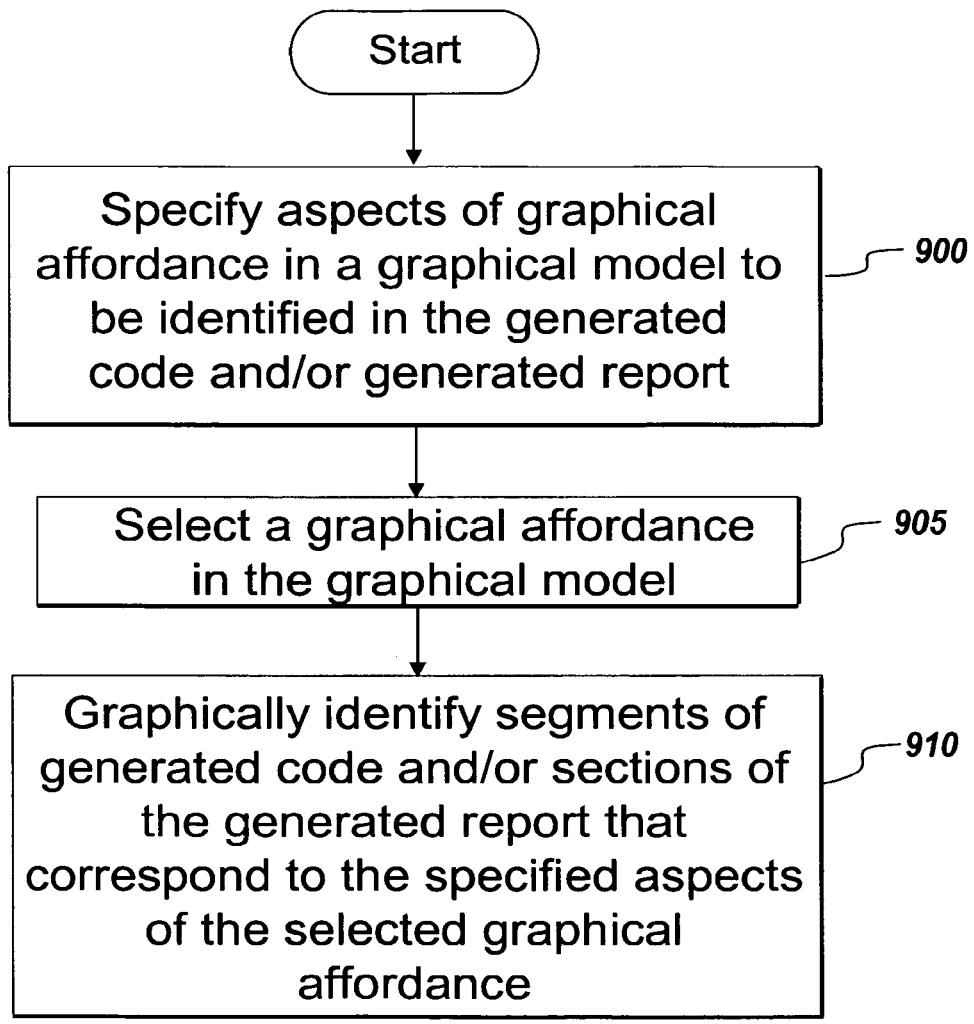
FIG. 9 is a flow diagram that depicts exemplary steps for graphically identifying a segment of generated code or a section of a generated report associated with an aspect of a graphical affordance in a graphical model based on a scope.

FIG. 9 is a flow diagram that illustrates exemplary steps for graphically identifying the segment 551 of generated code 550 or the section 581 of the generated report 580 associated with one of the various aspects 501, such as the output variable 503, of the element 502 in the graphical model 500. The flow diagram of FIG. 9 is discussed with reference to FIGS. 7 and 8. Referring to FIG. 7, the user may indicate that only output variables should be identified in generated code 550 or generated report 580 by selecting option 716 (step 900). Referring to FIG. 8, the user can select the element 502 in the graphical model 500 (step 905). Only segment 551 and section 581 that correspond to output variable 503 are graphically identified by graphical identifiers 860 and 867, respectively (step 910). In this manner, a user can specify a scope of graphical affordances that can be selected. For example, a user can select to identify segments of generated code 550 or sections of the generated report 580 that correspond to various aspects (e.g., various aspects 501 of an element (e.g., element 502) a single element, multiple elements, a signal, parameters or any other graphical affordance of the graphical model 500.

Figure 10:
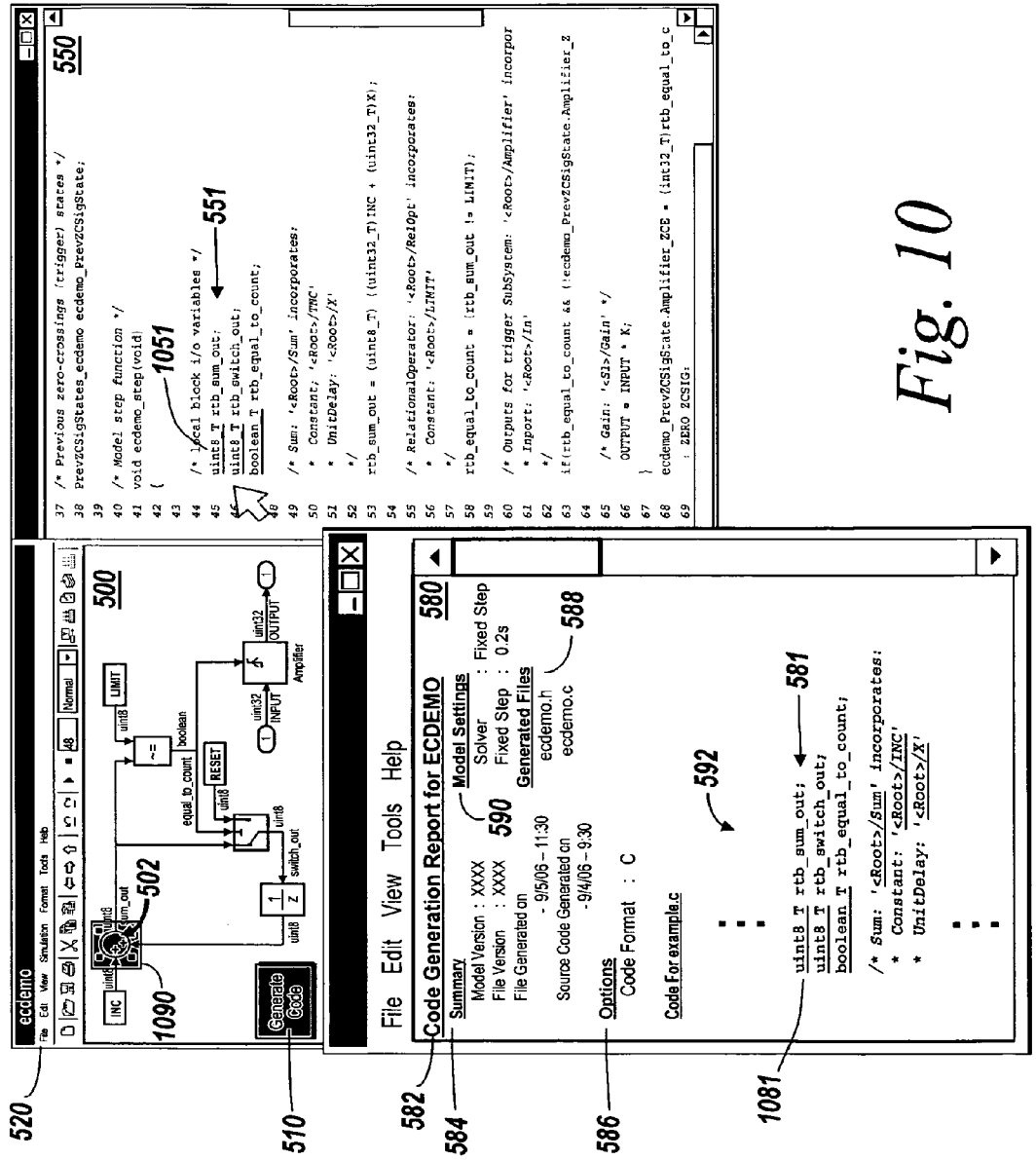
FIG. 10 depicts a graphical identification of a graphical affordance in a graphical model using an exemplary technique.

FIG. 10 is an example of a graphical representation for depicting the graphical identification of a graphical affordance in the graphical model 500. As discussed with reference to FIG. 5A, the user can generate the graphical model 500 and can generated code 550 that corresponds to the graphical model 500. Optionally, the generated report 580 can be generated. The generated report 580 can incorporate a listing 592 of generated code 550. Generated code 550 or generated report 580 can be displayed to allow the user to inspect generated code 550 or generated report 580.

The user can select the segment 551 of generated code 550 or the section 581 of the generated report 580. Upon selection of the segment 551 or the section 581, the element 502 that corresponds to the segment 551 or section 581 is graphically identified by a graphical identifier 1090. In certain instances, the segment 551 or section 581 may be a hyperlinked. For example, the segment 551 may have a hyperlink 1051 and section 581 may have a hyperlink 1081. The user may select hyperlink 1051 or 1081 to graphically identify the element 502 that corresponds to the segment 551 or the section 581 using a graphical identifier 1090.

Figure 11A:
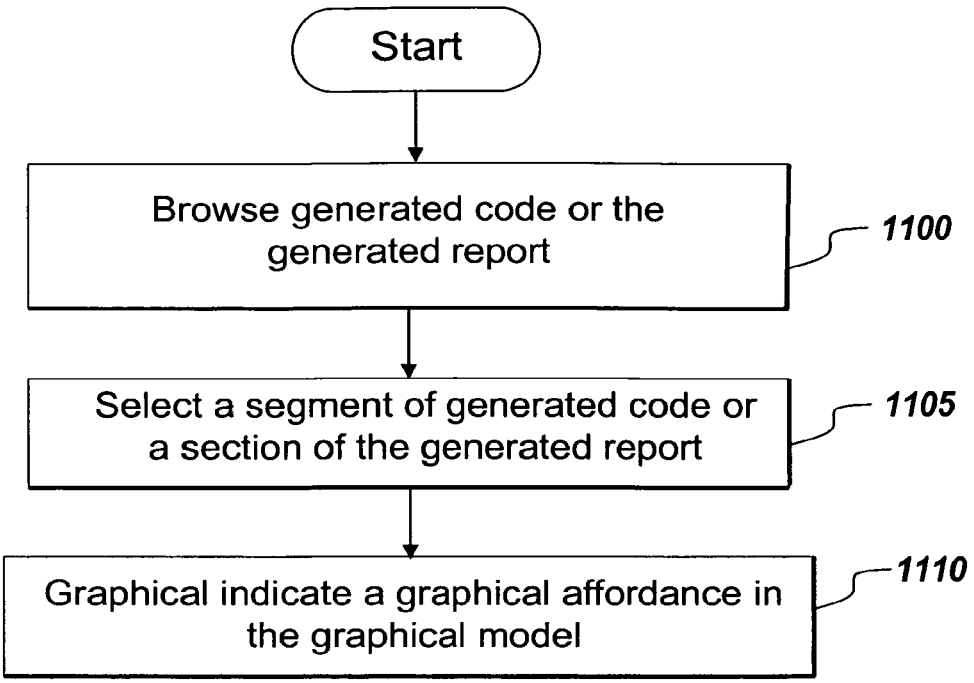
FIG. 11A is a flow diagram that depicts exemplary steps for graphically identifying graphical affordances in a graphical model that correspond to selected segments of generated code or selected sections of a generated report.

FIG. 11A is a flow diagram illustrating steps for graphically identifying graphical affordances in a graphical model 500 that correspond to selected segments of generated code 550 or sections of the generated report 580. The user can select the segment 551 in generated code 550 or the section 581 in the generated report 580 (step 1100). Upon the selection, graphical affordances (e.g., element 502) of the graphical model 500 that are associated with the segment 551 of generated code 550 or the section 581 of the generated report 580 are graphically identified. The user can select the segment 551 of generated code 550 or the section 581 of the generated report 580 using the text cursor such that when the text cursor is on the segment 551 in generated code 550 or the section 581 in the generated report 580, the associated graphical affordance (e.g., element 502) in the graphical model 500 is graphically identified. Alternatively, generated code 550 and generated report 580 may contain navigable connections, such as hyperlinks 1051 and 1081, that allow the user to select the segment 551 in generated code or the section 581 in the generated report 580 by clicking on the segment 551 or section 581 with a pointing device 505 or by simply positioning the pointing device 505 over the segment 551 or the section 581. For example, when the user selects a segment 551 of generated code 550 (step 1105), the element 502 is graphically identified by graphical identifier 1090 (step 1110).

In the case where hyperlinks (e.g., hyperlinks 1051 and 1081) are provided in generated code 550 or the generated report 580, the hyperlinks (e.g., hyperlinks 1051 and 1081) may be provided for only certain segments of generated code such as variables, operators, comments, etc. Alternatively, hyperlinks can be provided for all segments in generated code.

Figure 11B:
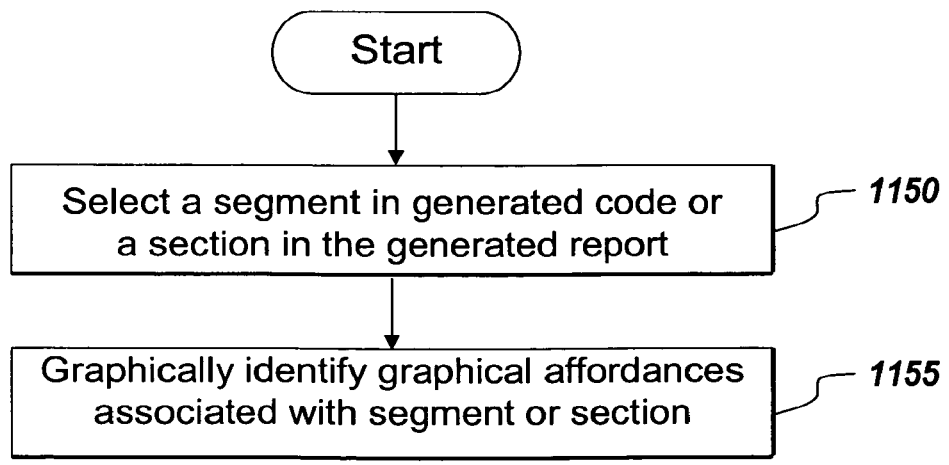
FIG. 11B is an exemplary flow diagram for uniquely identifying aspects of a graphical model based on a corresponding segment in the generated code.

In some instances, a segment in generated code 550 may be mapped to multiple graphical affordances in the graphical model 500. FIG. 11B is a flow diagram that illustrates identifying multiple graphical affordances based on a corresponding segment using a unique identifier for each graphical affordance that is identified. The user can select a segment in generated code 550 (step 1150) and multiple graphical affordances can be graphically identified such that each graphical affordance may have a unique graphical identifier (step 1155).

In some embodiments, the user may want to limit the graphical affordances that are graphically identified. For example, the user may only want to identify a graphical affordance that relates to an output signal of an element in the graphical model 500. To achieve this, the user may be provided with menus that are substantially similar to the menus 700 and 710. For example, the menus may provide options that allow a user to specify a scope of graphical affordances in the graphical model 500 that are graphically identified when a segment in generated code 550 is selected.

Figure 11C:
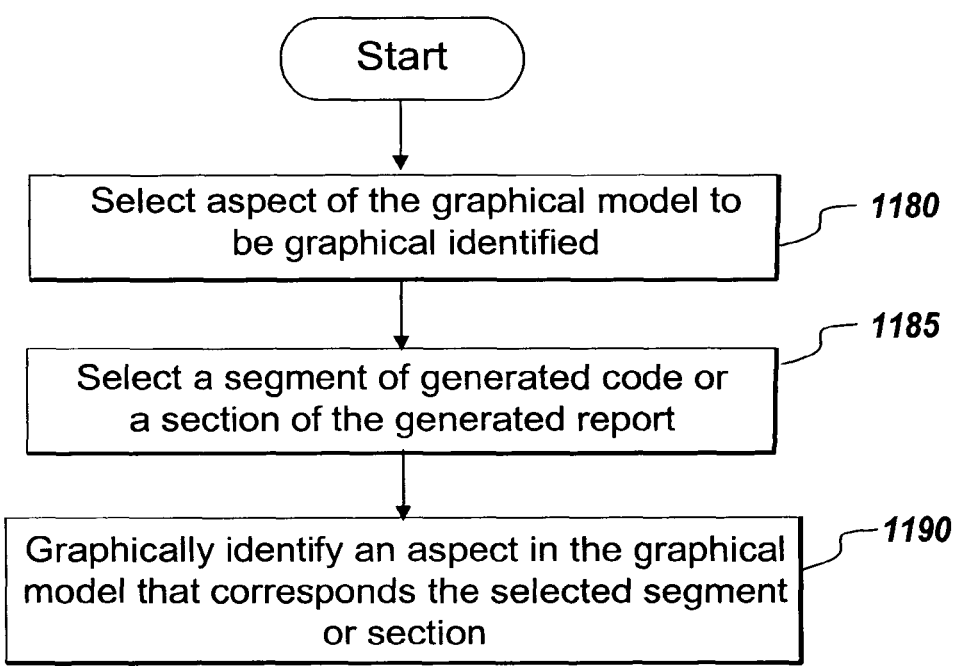
FIG. 11C is an exemplary flow diagram for graphically identifying aspects in a graphical model associated with a segment in the generated code based on a scope associated with the model.

FIG. 11C is a flow diagram that illustrates the steps for graphically identifying a portion of a graphical model 500 that is associated with a segment in generated code 550. The user can indicate that output signals of the graphical model 500 should be graphically identified (step 1180). The user can select a segment of generated code 550 or a section of the generated report 580 (step 1185) and output signals in the graphical model 500 that are associated with the segment are graphically identified in generated code 550 or generated report 580 (step 1190).

Figure 12:
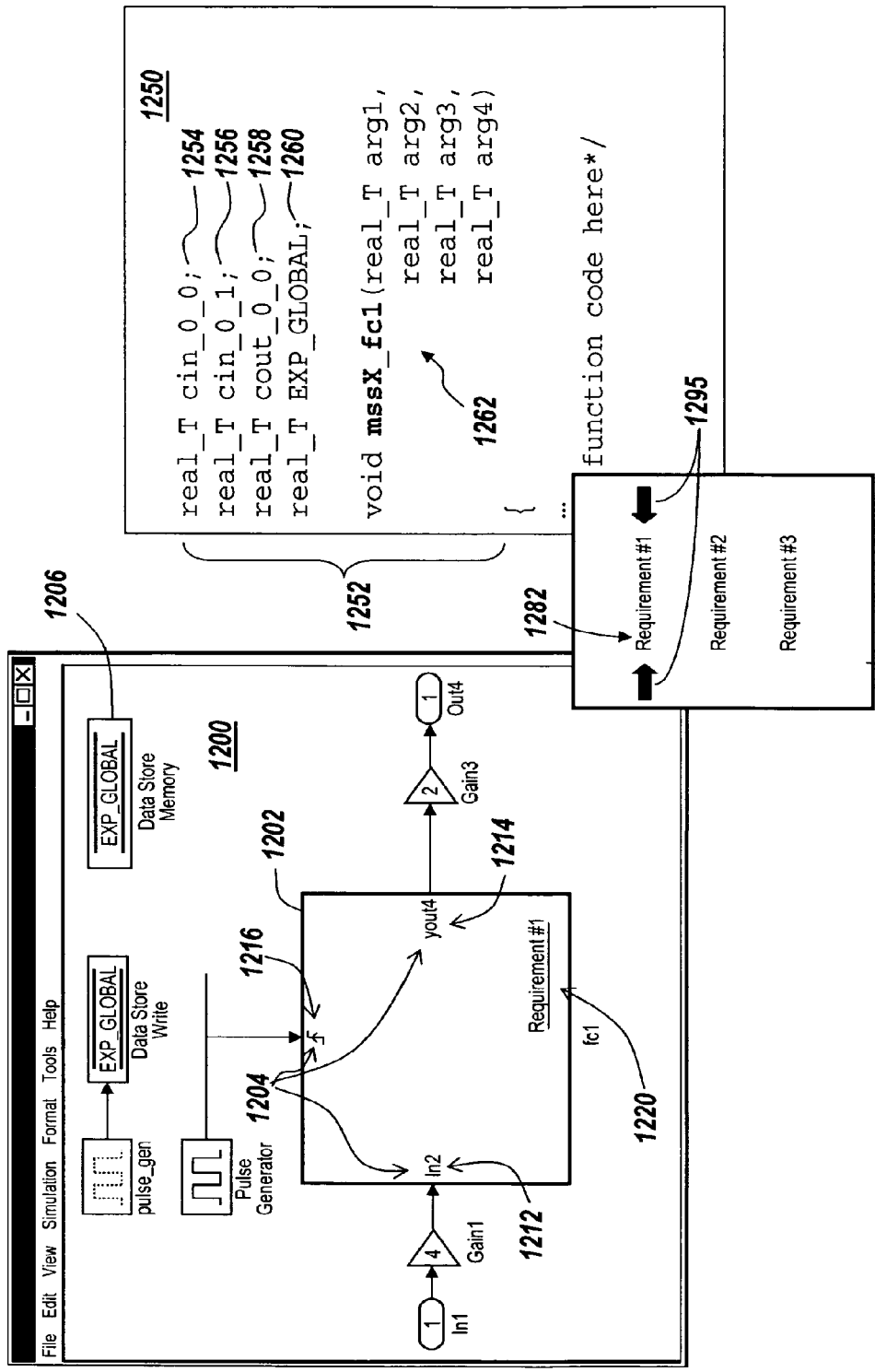
FIG. 12 is an exemplary graphical model that includes a user specified element and/or generated code from the graphical model.

FIG. 12 depicts an exemplary graphical model 1200, generated code 1250 that corresponds to the graphical model 1200, and a requirements document 1280. The graphical model 1200 includes a user-specified element 1202 (hereinafter element 1202). The element 1202 can represent code and can be developed using the textual interface 130, an external code browser, or any application that allows a user to develop textual code. The element 1202 can represent, for example, an S-Function that describes behavioral aspects of the user specified element; an Embedded MATLAB block that can be developed using the technical language MATLAB®; custom code that can be developed in a programming language, such as C, C++, JAVA®, Javascript, an assembly language, etc; etc.

The element 1202 can have an interface 1204 that allows other elements in the graphical model 1200 to connect to the element 1202. The interface 1204 can include an input 1212, an output 1214 and a trigger 1216. The interface 1204 may also accept global data to allow the element 1202 to read, write and/or process data that is available throughout the graphical model 1200. The global data, for example, can be stored in a global data store element 1206 (hereinafter element 1206). The input 1212 allows the element 1202 to receive signals from another element in the graphical model 1200. The output allows the element 1202 to output signals. The output signals can be determined by the execution of the code associated with the element 1202. For example, the element 1202 may call a function that performs a specified operation when the element 1202 executes. The trigger 1216 allows the element to be selectively executed. For example, the element 1202 may not execute unless it receives a trigger signal. The trigger signal may be received by the element 1202 from another element in the graphical model 1200 or from a location external to the graphical model 1200. The trigger signal, therefore, may enable the execution of the element and may provide for conditional execution of the element 1202.

The user may develop the element 1202 based on a requirement 1282 in the requirements document 1280. The requirements document 1280 may be stored on the computing device 100 (FIG. 1) or remotely in the network environment 200 (FIG. 2). The requirements (e.g., requirement 1280) may be hierarchical such that a requirement may have sub-requirements, which in turn also may have sub-requirements. The requirements and/or sub-requirements can be graphically identified. In one example, the element 1202 that was developed based on the requirement 1282 can be mapped to the requirement 1282 to allow for the graphical identification of the requirement 1282 upon the selection of the element 1202 or to allow graphical identification of the element 1202 based on the selection of requirement 1282. In one implementation, the element 1202 may include a hyperlink 1220 that corresponds to the location in the requirements document 1280 that contains requirement 1282. When the user selects the hyperlink 1220, the requirement 1282 is graphically identified by graphical identifier 1295.

Generated code 1250 can be generated from the graphical model 1200 and can include segments that correspond to the element 1202 and the interface 1204 of the element 1202. The generated code may also correspond to the requirements document 1280. In one example, the element 1202 can represent a function such that the interface 1204 of the element 1202 can be transformed into a generated function interface in generated code 1250. In this example, the interface 1204 can be mapped to a function interface 1252 in generated code 1250. The function interface 1252 can include a segment 1254, a segment 1256, a segment 1258 and a segment 1260. The segment 1254 of generated code 1250 can map to the trigger 1216. The segment 1256 of generated code 1250 can map to the input 1212. The segment 1258 of generated code 1250 can map to the output 1214. The segment 1260 of generated code 1250 can map to element 1206. A segment 1262 of generated code 1250 defines formal arguments to be used by the function in generated code 1250. The segments 1254, 1256, 1258 and 1260 of generated code 1250 can each correspond to an argument in the segment 1262.

Segments (e.g., segments 1254, 1256, 1258, 1260, 1262, etc.) of generated code 1250 or graphical affordances (e.g., element 1202, element 1206, interface 1204, input 1212, output 1214, a trigger 1216, etc.) of the graphical model 1200 can be graphically identified in accordance with embodiments discussed herein. For example, a user can select the element 1202 and segments (e.g., segments 1254, 1256, 1258, 1260, 1262, etc.) in generated code 1250 can be graphically identified. Likewise, the user can select a segment in generated code 1250 to graphically identify a graphical affordance (e.g., element 1202) in the graphical model 1200. In addition, a user can specify a scope that limits the graphical identification to certain aspects of generated code 1250 or the graphical model 1200. For example, the user can specify that only generated code 1250 relating to the output 1214 is to be graphically identified. In this example, when the user selects the element 1202, the segments 1258 and 1262 can be graphically identified.

The mapping of the interface 1202 to the function interface 1252 allows a user to graphically identify segments (e.g., 1254, 1256, 1258, 1260) of generated code 1250 that correspond to an element interface (e.g., interface 1204) in the graphical model 1200. This provides the user with the ability to a identify the segments 1254, 1256, 1258, 1260, 1262, etc., of generated code 1250 that correspond to the interface 1204 of the element 1202, where the interface 1204 of the element 1202 corresponds to the function interface 1252 in generated code 1250 that is represented by a unique list of memory locations accessed in the function, but which are defined by (or exist in the scope of) the parent (call-site) of the function.

In some instances, code that is specified in a user specified element (e.g., element 1202) may represent code developed in the same language as the target language (e.g., generated code 1250). For example, a user may develop code for a user specified element (e.g., element 1202) in the programming language of C and the user may wish to generate code (e.g., generated code 1250) in the programming language of C. In this example, generated code (e.g., generated code 1250) can incorporate the code of the user specified element (e.g., element 1202) without modification. The code of the user specified element (e.g., element 1202) may also be incorporated into generated code (e.g., generated code 1250) with modification. For example, the code of the specified element (e.g., element 1202) can be optimized using optimizations such as, inlining, outlining, loop unrolling, etc. In another instance, a user specified element (e.g., element 1202) can be developed using a behavioral description. In this instance, generated code (e.g., generated code 1250) from the graphical model (e.g., graphical model 1200) does not correspond directly to the behavioral description of the user specified element (e.g., element 1202). When the code of a user specified element (e.g., element 1202) is not developed in the same language as the intended target language, code of the user specified element (e.g., element 1202) can be converted into the target language (e.g., generated code 1250).

The environment 100 allows the user to graphical identify segments of generated code (e.g., generated code 1250) that corresponds to a user specified element (e.g., element 1202). The environment 100 may implement one of the programmable APIs 170 to perform the graphical identifying between the user specified element (e.g., element 1202) and the segments (e.g., segments 1254, 1256, etc.) of the generated code (e.g., generated code 1250).

The mapping and graphical identification of user specified elements (e.g., element 1202) and corresponding segments (e.g., segments 1254, 156, etc.) of generated code (e.g., generated code 1250) can be performed in the same manner as discussed with reference FIG. 4-11C and the mapping can be utilize tracing information, which is discussed in more detail below. The user may select segments (e.g., segments 1254, 1256, etc.) of generated code (e.g., generated code 1250) or a user specified element (e.g., element 1202) in the same manner as discussed with regard to FIGS. 4-12 to graphical identify segments (e.g., segments 1254, 1256, etc.) relating to a user specified element (e.g., element 1202) or to graphically identify a user specified element (e.g., element 1202) that is related to segments (e.g., segments 1254, 1256, etc.) of generated code (e.g., generated code 1250). Alternatively, one of the programmable APIs 170 can allow the user to specify a mapping between the user specified element (e.g., element 1202) and generated code (e.g., generated code 1250).

A user may specify design requirements (e.g., requirement 1282) for each element (e.g., element 1202) or signal of a system to be represented by a graphical model (e.g., graphical model 1200). The design requirements (e.g., requirement 1282) can be used to develop a graphical model (e.g., graphical model 1200) according to specifications that identify, for example, performance parameters of the system to be modeled by the graphical model (e.g., graphical model 1200). In one implementation, the design requirements (e.g., requirement 1282) can be provided in a requirements document (e.g., requirements document 1280). The requirements document (e.g., requirements document 1280) may take any form, such as, for example, a word processing document, a spreadsheet, a mark-up language document, such as an eXtensible Markup Language (XML) file, hardcopy document, verbal conveyed specifications, recorded specifications, etc.

Figure 13A:
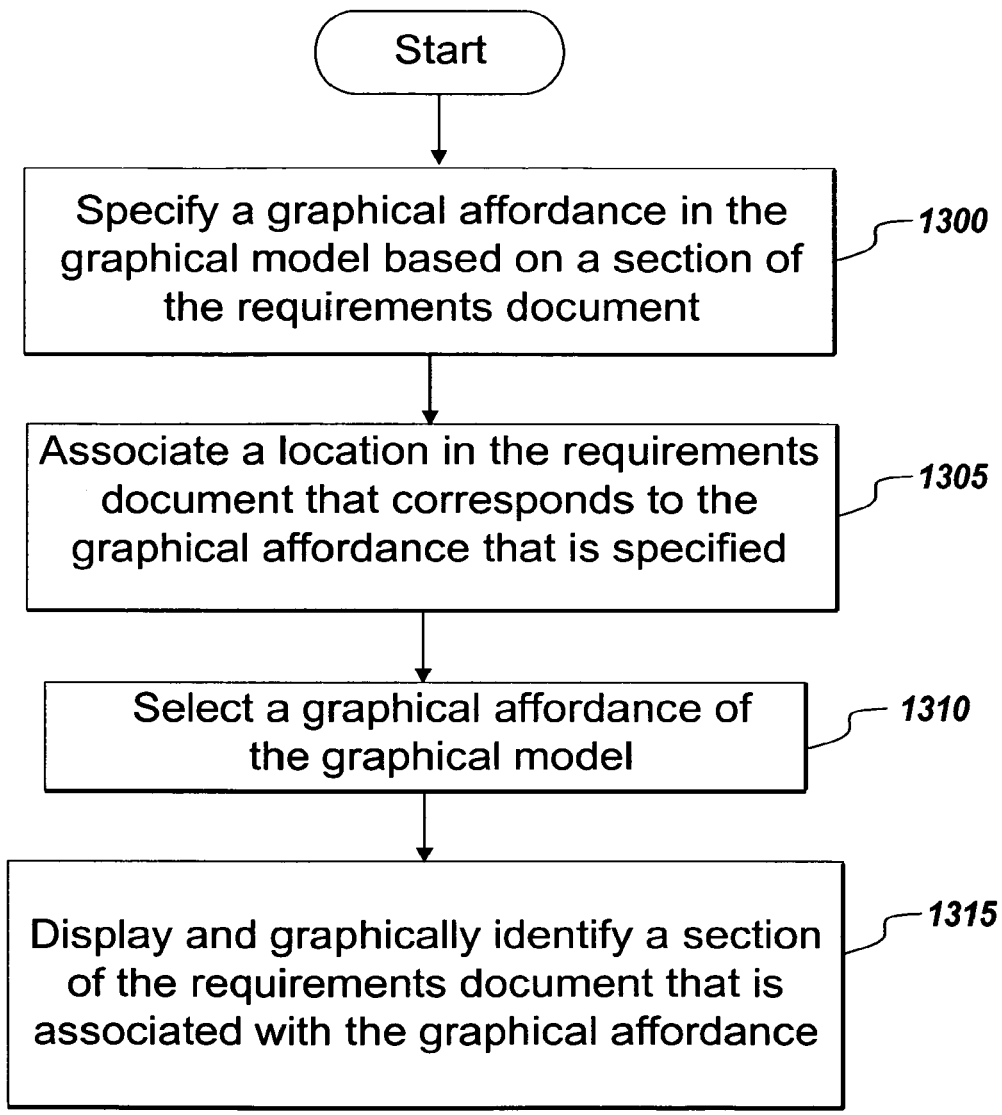
FIG. 13A is a flow diagram that depicts exemplary processing that can be used for illustrating the mapping between a requirements document and a graphical model.

FIG. 13A is a flow diagram that illustrates a mapping between the requirements document 1280 and the graphical model 1200. When the user develops a graphical model 1200 based on requirements in the requirements document 1280, the requirement 1282 can be mapped to the element 1202 in the graphical model 1200. For example, a user may specify the element 1202 based on a section (i.e., requirement 1282) of the requirements document 1280 (step 1300). The user can include, in the element 1202, a location in the requirements document 1280 that corresponds to the element 1202 (step 1305). For example, when the requirements document 1280 is a document that supports hyperlinks, the user can insert a hyperlink 1220 into the element 1202 of the graphical model 1200. The hyperlink 1220 may associate the element 1202 with the corresponding section (i.e., requirement 1282) in the requirements document 1280. When the user selects the element 1202 (step 1310), the section (e.g., requirement 1282) of the requirements document 1280 that is associated with the element 1202 can be displayed and graphically identified by graphical identifier 1295 (step 1315).

Figure 13B:
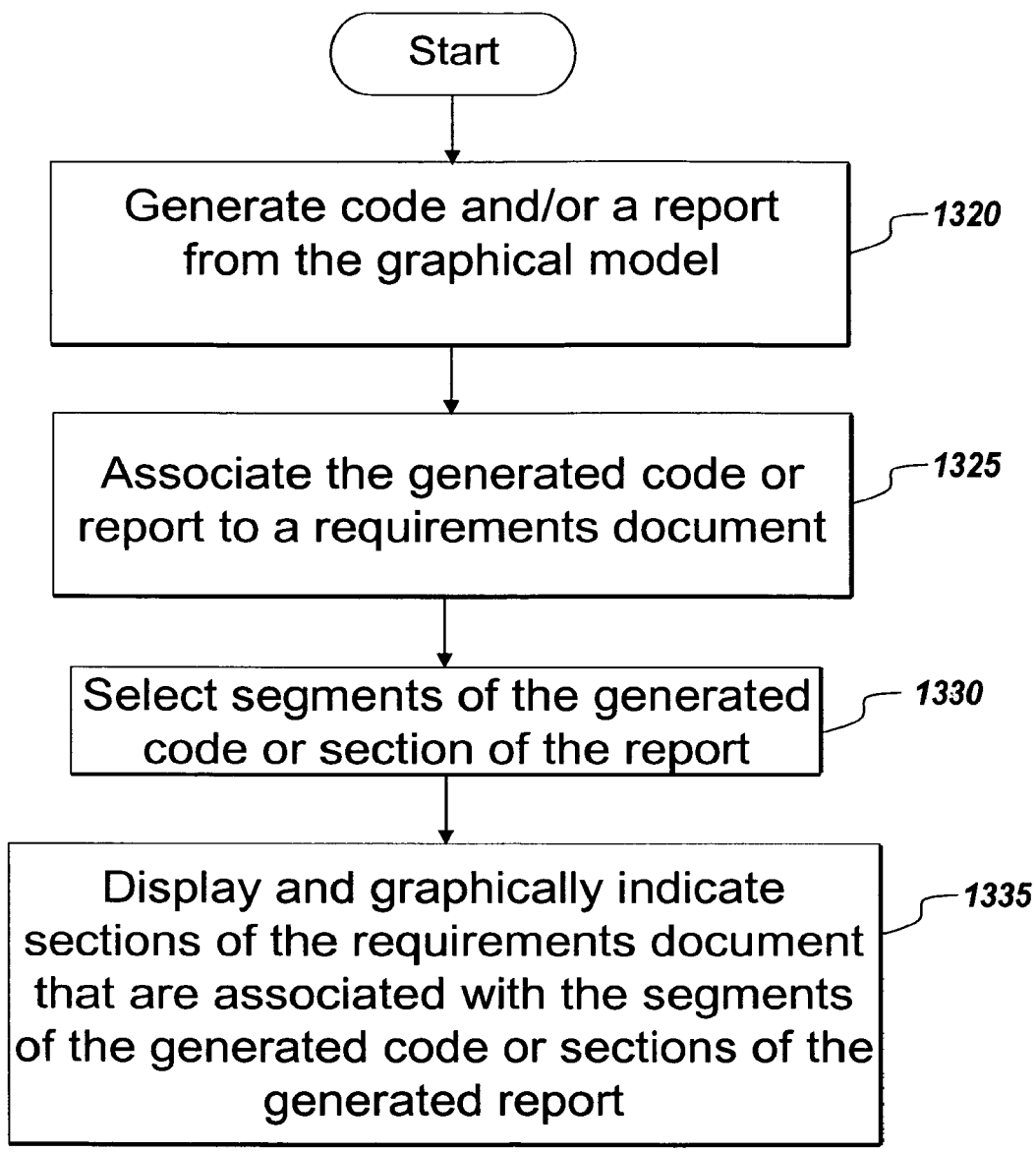
FIG. 13B is a flow diagram that depicts exemplary processing that can be used for illustrating the mapping among a requirements document, generated code and/or a generated report.

FIG. 13B is a flow diagram that illustrates the mapping between a requirements document 1280 and generated code 1250 (or a generated report) from the graphical model 1200. The user can generate code 1250 from the graphical model 1200 (step 1320) and the generated code 1250 can include associations (or links) to the requirements document 1280 (step 1325). In this manner, a user may identify design requirements (e.g., requirement 1282) in the requirements document 1280 that correspond to selected segments of generated code 1250. For example, after generating code 1250, the user can select segments of generated code 1250 (step 1330) and sections (e.g., requirement 1282) of the requirements document 1280 associated with the segments (e.g., segments 1254, 1256, etc.) of generated code 1250 can be displayed and graphically identified (step 1335).

When a user selects a graphical affordance (e.g., element 1202) in the graphical model 1200 or a segment (e.g., segment 1254) of generated code 1250 that is associated with a section (e.g., requirement 1282) of the requirements document 1280), the sections (e.g., requirement 1282) of the requirements document 1280 can be displayed and may also be identified graphically. Further, if the user selects a segment (e.g., segment 1254) of generated code 1250 both the corresponding graphical affordance (e.g., element 1202) in the graphical model 1200 and the corresponding section (e.g., requirement 1282) of the requirements document 1280 can be graphically identified. Conversely, when the user selects a graphical affordance (e.g., element 1202) of the graphical model 1200 both the corresponding segments (e.g., segments 1254, 1256, etc.) of generated code 1250 and the corresponding section (e.g., requirement 1282) of the requirements document 1280 can be graphically identified.

In some instances, additional information concerning the original design and any intermediate artifacts, such as, but not limited to, output data types, input data types, saturation mode, sample time, execution order, etc., can be mapped between a graphical model and/or generated code and can be included in the tracing information. Additional information can be specified by the user or may be inferred by the environment 100. In one implementation, the additional information may not be readily visible in the model (i.e., undisplayed). Such additional information may relate to parameters of the graphical model, such as execution parameters or graphical affordance parameters. While additional information may be important for implementation of a graphical model, the additional information may not be necessary for a user to determine the basic structure and function of the graphical model. To avoid cluttering the graphical model this additional information may not be displayed (i.e., undisplayed) in the graphical model.

The additional information may also be hidden elements (i.e., undisplayed elements) that are inserted into the graphical model. For example, the environment 100 can automatically insert rate-transition elements, which are not displayed, into a graphical model for execution. A rate-transition element may be automatically inserted by the environment when a first element has a sample rate and an element connected to that element has another sample rate. The rate transition element allows the two elements to interface with each other by converting the sample rate of the first element to match the sample rate of the element connected to the first element. The rate transition element allows two elements that are connected to each other to have different sample rates. Undisplayed information that consists of hidden elements is incorporated into generated code. When a user is viewing the code, the user may not know where the hidden elements are in the graphical model. By providing a mapping between the code and the hidden elements, the hidden elements that correspond to segments of generated code can be graphically identified.

Figure 14A:
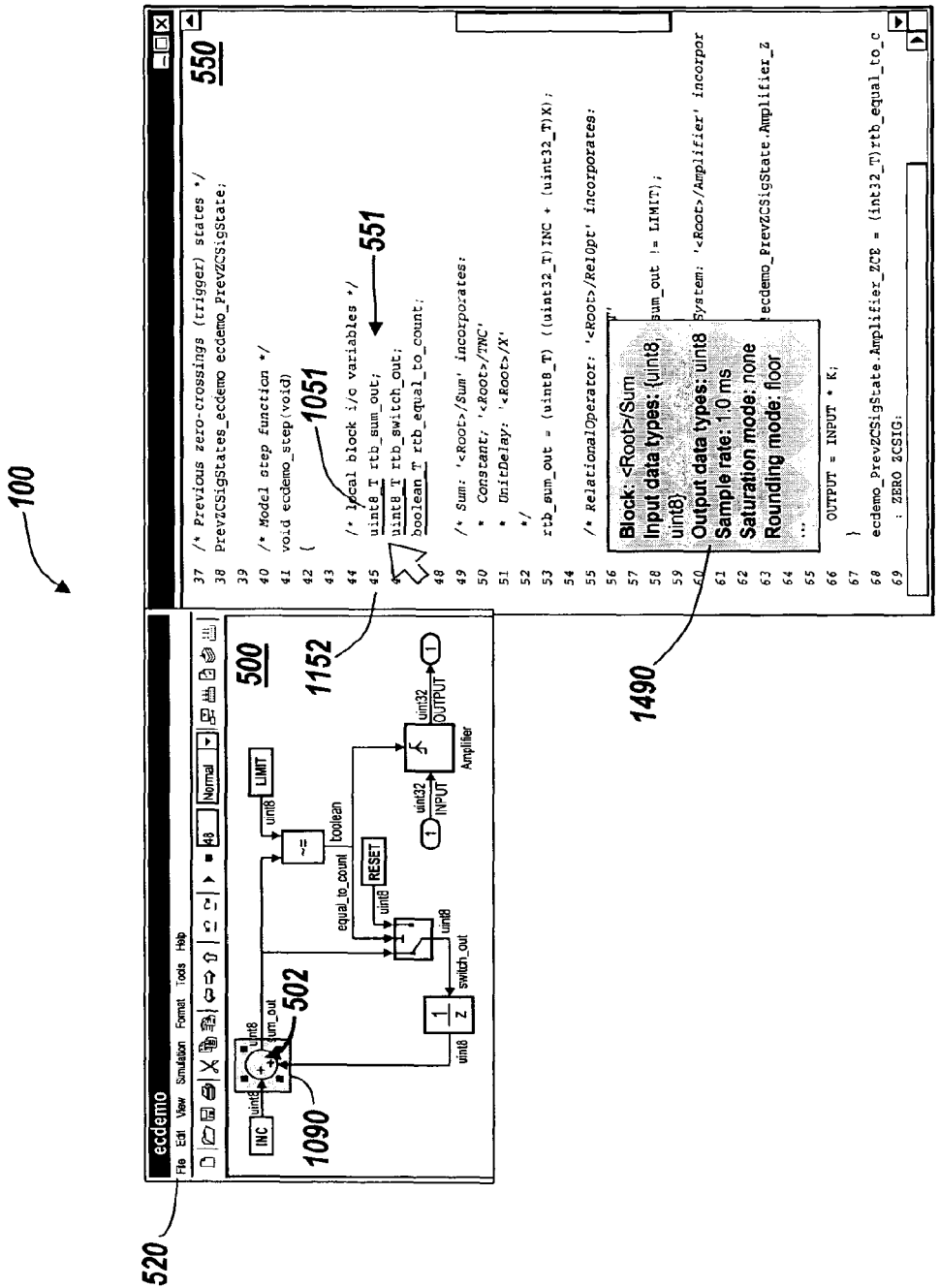
FIG. 14A depicts the exemplary graphical model and generated code of FIG. 5 along with an example of additional information that can be displayed to a user.

FIG. 14A is a diagram showing an exemplary technique for overlaying additional information 1490 associated with the graphical model 500 and generated code 550. The graphical model 500 and generated code 550 a display using the environment 100, which in this case is an integrated environment that utilizes a MDI application to enable simultaneous viewing of the graphical model 500 and generated code 550. The additional information 1490 is incorporated in the graphical model 500, but is undisplayed in the graphical model 500. The additional information 1490 may represent, for example, data type, sample time, delay, a hidden element, etc. In one example, a user may specify an input to an element in the graphical model 500, but may not specify the data type of an output. The environment 100 may use propagation to determine what data type to use for the output. The user may want to view the additional information 1490 (e.g., the inferred output data in this example) of the graphical model 500 that corresponds to a selected segment (e.g., segment 551) of generated code 550. The user can select a segment (e.g., segment 551) of generated code 550 corresponding to the additional information 1490 and the additional information 1490 can be displayed by overlaying the additional information 1490 on the graphical model 500 or generated code 550.

Figure 14B:
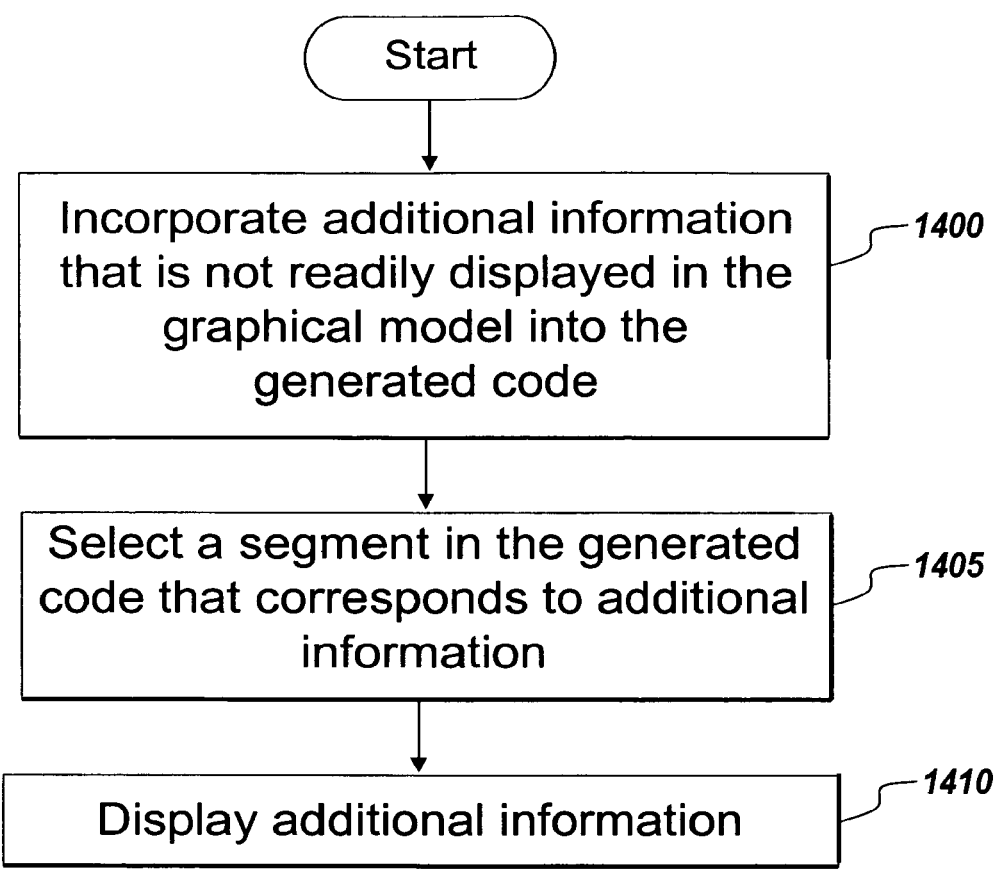
FIG. 14B is a flow diagram that depicts exemplary processing that can be used for graphically identifying undisplayed information.

FIG. 14B is a flow diagram that illustrates exemplary steps for graphically identifying additional information by overlaying the information on the graphical model 500 or generated code 550. The undisplayed additional information 1490 in the graphical model 500 is included in generated code 550 (step 1400). The user selects a segment (e.g., segment 551) of generated code 550 corresponding to the additional information 1490 to display the additional information 1490 (step 1405). The additional information 1490 is displayed to the user (step 1410).

In some embodiments the tracing information between a graphical model (e.g., graphical model 500 or 1200) and generated code (e.g., generated code 1200 or 1250) can be output to an independent representation, such as an independent file in a plain-text or binary format. The term "independent representation" as discussed herein refers to a representation can be used independent of the environment 100. In one example, the independent representation can be stored in a repository, database, other storage medium, etc., and may be represented as an XML file.

Figure 15A:
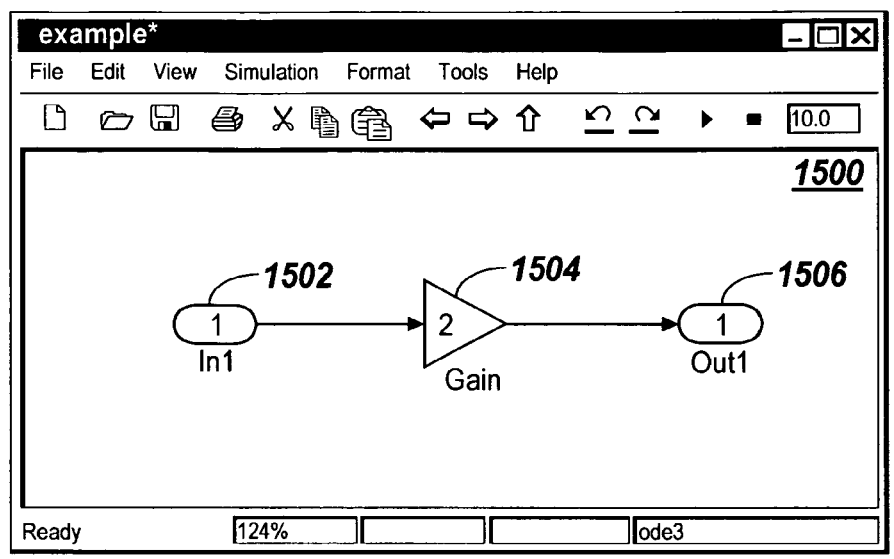
FIG. 15A depicts an exemplary graphical model that may be developed in accordance with exemplary embodiments.

FIG. 15A depicts an example of a graphical model 1500 that includes an input element 1502, a gain element 1504 and an output element 1506. Generated code that represents the graphical model 1500 can be generated by the environment 100. FIG. 15B depicts exemplary generated code files that contain generated code from the graphical model 1500. Header file 1520 may be a data structure, such as a file, that includes generated code according to one or more exemplary embodiments. Header file 1520 can be used to define model data structures and/or a public interface to model entry points and/or data structures. Source file 1540 may be a data structure, such as a file, that include generated code according to one or more exemplary embodiments. Source code 1540 may contain declarations for the parameters data structure and the constant block I/O data structure, and any zero representations for structure data types that are used in the graphical model 1500.

Tracing information between the graphical model 1500, generated code (e.g., the contents of header file 1520 and source file 1540), optionally generated report and optionally provided requirements document can be stored in an independent representation. Exemplary contents of an independent representation for providing tracing information between the graphical model 1500 and generated code in the code files 1520 and 1540 may include the following:

```xml
<?xml version="1.0" encoding="ASCII" standalone="yes">
<project>
    <system_version>
        <application name="MATLAB" version="7.3"/>
        <application name="Simulink" version="6.5"/>
        ...
    </system_version>
<model name="example.mdl" version="1.0">
    <model:settings>
        <model:parameter>
            <model:parameter_name>Solver</model:parameter_name>
            <model:parameter_value>ode3</model:parameter_value>
        </model:parameter>
        ...
    <model:settings>
    <model:root>
        <model:block>
            <model:block_type>Inport</model:block_type>
            <model:block_name>In1</model:block_name>
            <model:objectId>B_1</model:objectId>
        </model:block>
        <model:block>
            <model:block_type>Gain</model:block_type>
            <model:block_name>Gain</model:block_name>
            <model:objectId>B_2</model:objectId>
        </model:block>
        <model:block>
            <model:block_type>Outport</model:block_type>
            <model:block_name>Out1</model:block_name>
            <model:objectId>B_3</model:objectId>
        </model:block>
    </model_block>
</model>
<code target="c">
    <code:header file_name="example.h">
        ...
        <code:segment type="type definition">
            <code:fragment start_line="24">
                <code:content>typedef struct {</code:content>
            </code:fragment>
            <code:fragment start_line="25">
                <code:content>real_T Out1;</code:content>
                <code:source>B_3</code_source>
            </code:fragment>
            <code:fragment start_line="26">
                <code:content>}</code:content>
            </code:fragment>
        </code:segment>
    </code:header>
    <code:source file_name="example.c">
        ...
        <code:function>
            ...
            <code:segment type="statement">
                <code:fragment start_line="10" start_col="2">
                    <code:content>example_Y.Out1 = </code:content>
                    <code:source>B_3</code_source>
                </code:fragment>
                <code:fragment start_line="10" start_col="19">
                    <code:content>example_U.In1</code:content>
                    <code:source>B_1</code_source>
                </code:fragment>
                <code:fragment start_line="10" start_col="33">
                    <code:content>* example_P.Gain_Gain;</code:content>
                    <code:source>B_2</code_source>
                </code:fragment>
            </code:segment>
            ...
        </code:function>
        ...
    </code:source>
    ...
</code>
...
</project>
```

In the implementation illustrated above, the independent representation is provided in an XML format. Other implementations can use other formats to provide the tracing information, and that the use of the XML format is merely one example of one format that can be employed to implement the independent representation.

The environment 100 may allow a user to overwrite a mapping between a graphical model and generated code. For example, the user may access the tracing information and may edit the tracing information to provide a different mapping. The user may determine that a more detailed or less detailed mapping is necessary and the user may modify the mapping to correspond to a desired level of detail in the mapping.

In some embodiments, a deployable representation of a graphical model (e.g., graphical model 1500), generated code (e.g., the contents of header file 1520 and source file 1540) and tracing information can be developed. A deployable representation is a representation that allows a user to access and view the graphical model (e.g., graphical model 1500) and/or generated code (e.g., the contents of header file 1520 and source file 1540) external from the environment 100. The deployable representation, therefore, allows a user to perform generated code (e.g., the contents of header file 1520 and source file 1540) and graphical model (e.g., graphical model 1500) inspection independent of the environment 100. The deployable representation may be deployable in a web-based environment; a word processing environment, such a Microsoft Word® document from Microsoft, Inc. of Redmond Wash.; an environment on a handheld device; etc. In on implementation, the deployable representation may be a web deployable representation that can be deployed in a web browser. An example of a web deployable representation can be, for example, a hypertext mark-up file. The deployable representation may use a scalable vector graphics (SVG) format to allow contents of the representation to scale to the size of a display area without distortion.

Figure 16A:
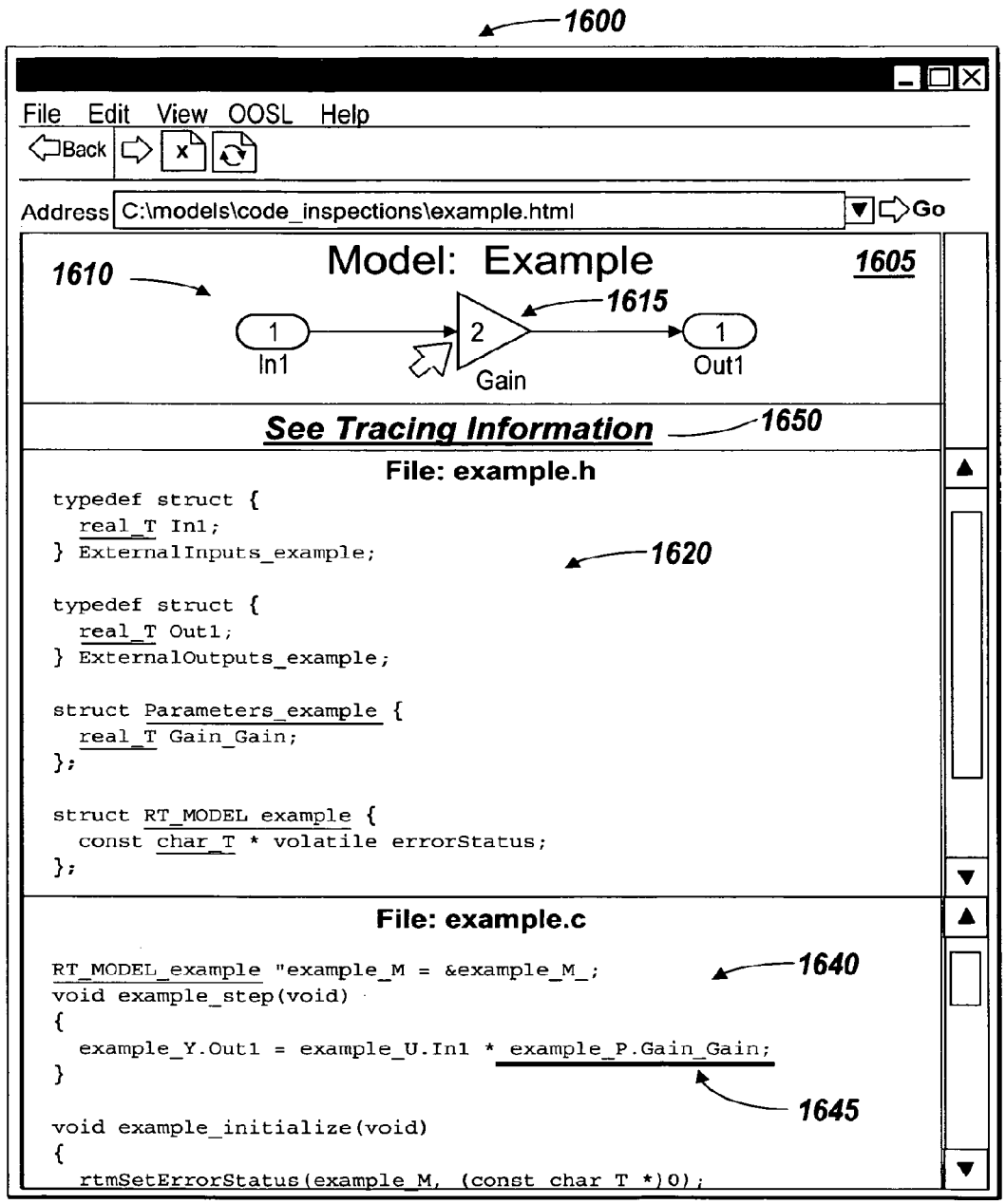
FIG. 16A is an exemplary deployable representation in accordance with exemplary embodiments.

FIG. 16A is an exemplary web browser 1600 that displays a web deployable representation 1605 that allows a user to trace elements of the graphical model to elements in generated code and vice versa. The web deployable representation 1605 may include a hyperlink representation 1610 of the graphical model 1500, a hyperlinked representation 1620 of the code file 1520, a hyperlinked representation 1640 of the code file 1540 and a hyperlink 1650 to the tracing information 1652 depicted in FIG. 16B.

The hyperlink representation 1610 includes hyperlinked elements. For example, gain element 1615 is a hyperlink that can be selected to allow the user to graphical identify and view the section of the code files that correspond to the gain element or portions of the gain element.

The hyperlinked representation 1620 may also include hyperlinks for graphically identifying and/or viewing portions of the hyperlinked representation 1610 and/or the hyperlinked representation 1640. Likewise, the hyperlinked representation 1640 may include hyperlinks for graphically identifying and viewing portions of the hyperlinked representation 1610 and/or 1620. For example the hyperlinked representation 1640 may include a hyperlink 1645 that corresponds to the gain element 1615. When the user selects the hyperlink 1645, the gain element is graphically identified.

Figure 16B:
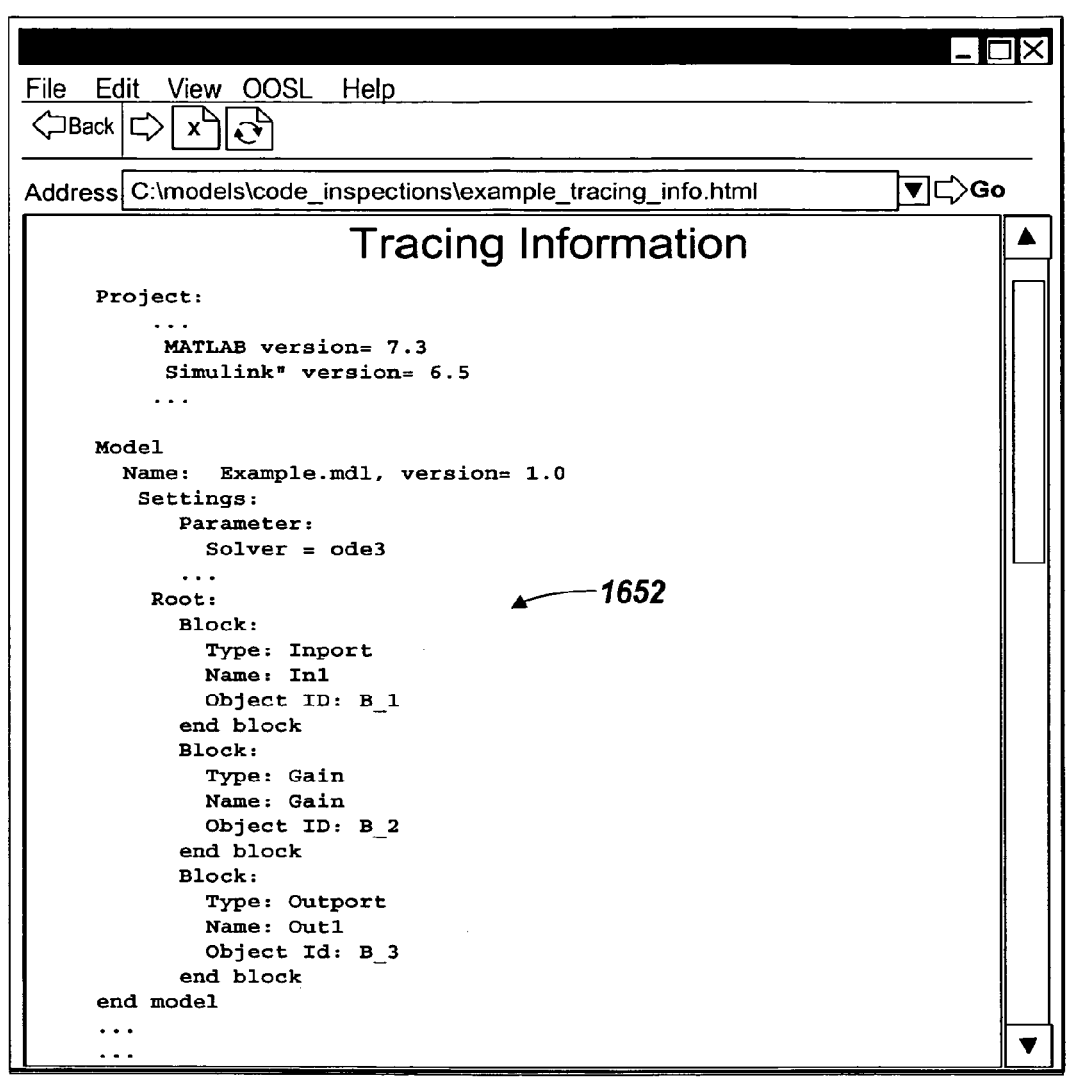
FIG. 16B is an exemplary deployable representation of tracing information.

The hyperlink 1650 to the tracing information 1652 allows a user to navigate to the tracing information 1652 to view the mapping between the hyperlinked representations 1610, 1620 and 1640. FIG. 16B depicts a web browser 1655 that displays a portion of the tracing information 1652. The user may select the hyperlink 1650 (FIG. 16A) and the web browser 1655 may be provided to display the tracing information 1652.

The implementation described above, with regard to FIGS. 16A-B, is representative of one implementation, numerous other implementations of deployable representations are possible. Further, it will be recognized that the deployable representation may include a generated report, a requirements document or other types of information that can be associated with the graphical model 1500 or generated code. Separate windows may be provided for viewing the graphical model, generated code, generated report, requirements document, tracing information, etc.

In one alternative embodiment the graphical model and generated code may be displayed using a heterogeneous dependency viewer. A heterogeneous dependency viewer allows a user to view a graphical model and generated code together using a dependency graph. A dependency graph shows dependency relationships of one or more entities (e.g., a graphical model, generated code, generated report, etc.). An example of a heterogeneous dependency viewer is discussed in pending U.S. patent application Ser. No. 11/488,426 and is incorporated herein by reference.

In some instances, a user can generate a model coverage report from a graphical model or a code coverage report from generated code that corresponds to the graphical model. The model coverage report can provide a certain level of testing that was performed on the graphical model to assure that the graphical model meets certain specifications. This is achieved by implementing test cases using the graphical model. The code coverage report generally performs a similar operation for generated code, and therefore, assures that generated code meets certain specifications. In some instances, model coverage is conducted before design implementation (i.e. before generating code). Generally after generated code is available, the user desires to know the code coverage to ensure that determined portions of the model/code are exercised (e.g., when test cases are run against the model/code).

In some embodiments, the user can combine the model coverage report generated by applying test cases in the graphical model and the code coverage report generated by applying test cases in generated code. For example, a user can convert the model coverage report into code coverage report, or vice versa. The conversion from the model coverage report to the code coverage report, or vice versa, can use the mapping between the graphical model and generated code. By converting model coverage to code coverage, the user can reduce the number of additional tests needed to achieve code coverage.

Figure 17:
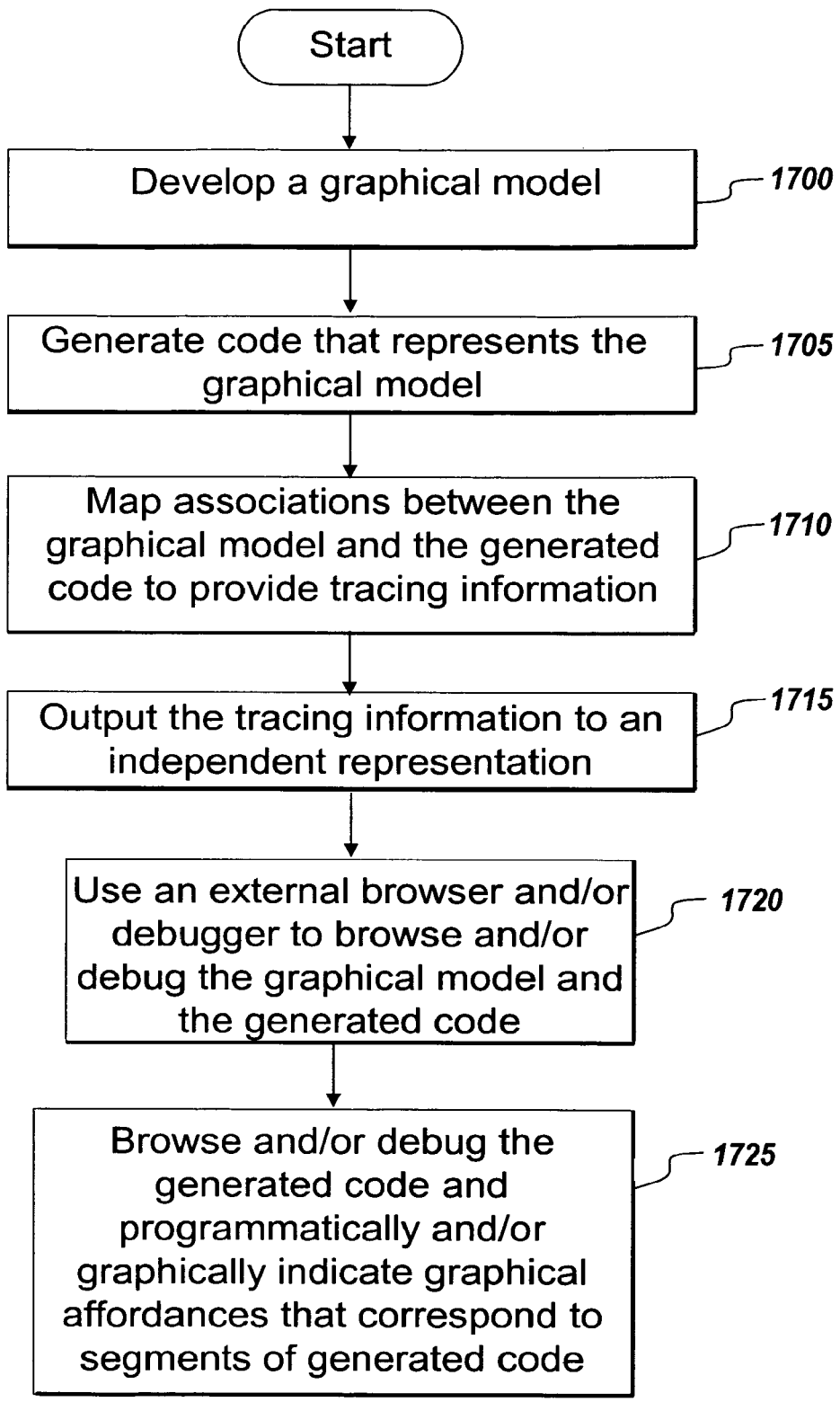
FIG. 17 is a flow diagram that depicts exemplary processing that can be used for implementing an external debugger on the generated code.

FIG. 17 is a flow diagram that illustrates exemplary steps for implementing an external code browser and/or debugger with generated code. A code browser may be an application that allows a user to browse generated code and can be a code editor, a word processing application or another application that allows a user to view and/or browse code. An example of a code browser can be, for example, Microsoft Visual Studio from Microsoft, Inc. of Redmond Wash. Examples of external debuggers may include, but are not limited to, Microsoft Visual Studio, or open source software, such as the GNU's Not Unix (GNU) Debugger commonly referred to as GNU Debugger (GDB), etc.

Referring to FIG. 17, A user can develop a graphical model (e.g., graphical model 500, 1200, etc.) (step 1700) and generate code (e.g., generated code 550, 1250, etc.) that represents the graphical model (step 1705). Associations between the graphical model and generated code are mapped to provide tracing information (step 1710). The tracing information is output to an independent representation (step 1715).

An external code browser and/or debugger can use the tracing information and the one of the programmable APIs 170 to browse and/or debug the graphical model and generated code (step 1720). The external code browser and/or debugger can be used to, for example, browse or debug generated code, while programmatically identifying the graphical affordances in the graphical model that correspond to the segments of generated code that are being browsed and/or debugged (step 1725). One of the programmable APIs 170 may optionally provide graphical identifiers in generated code or on the graphical model to aid a user.

Alternatively, the external code browser and/or debugger can be synchronized with a graphical model editor and/or debugger that is provided by the environment 100. Synchronizing the external browser and/or debugger allows a user can simultaneously browse and/or debug the graphical model and generated code using, in part, an external application. For example, as the user browses generated code with the external browser, corresponding graphical affordances in a graphical model are graphically identified.

Figure 18A:
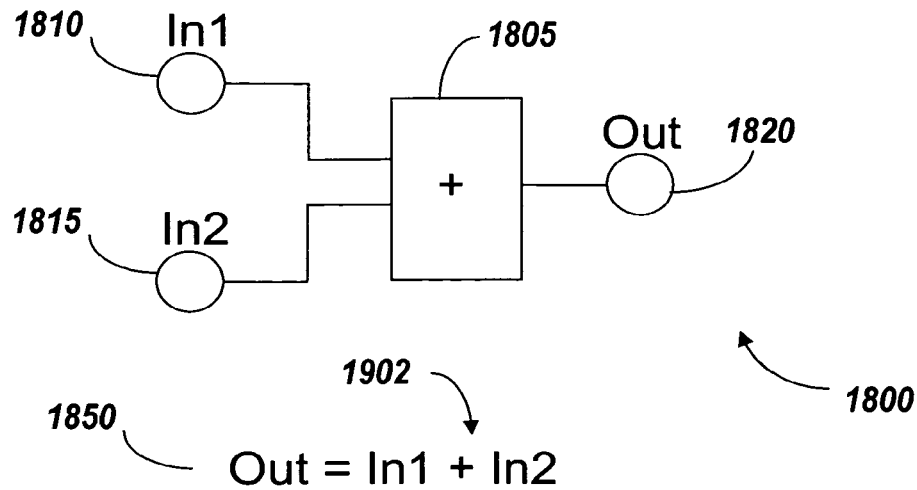
FIG. 18A depicts an exemplary graphical model and code generated from the graphical model.
Figure 18B:
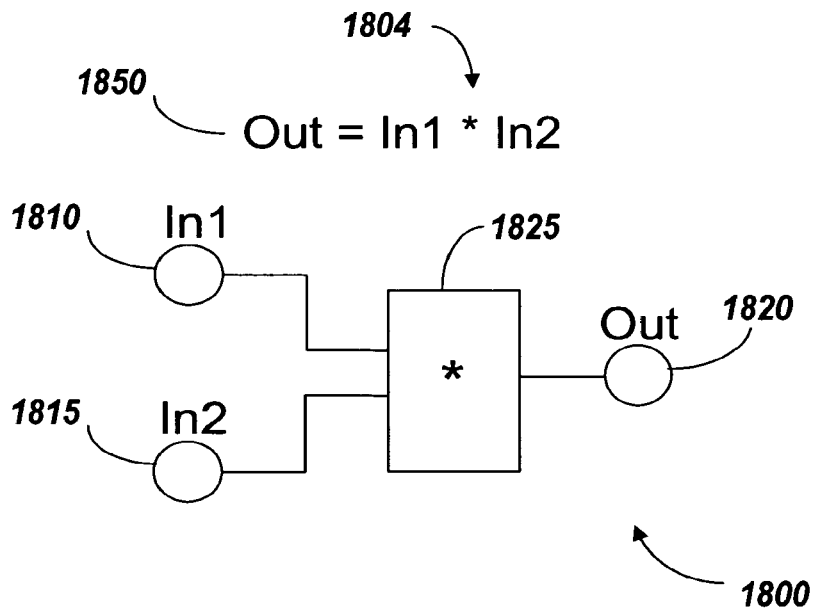
FIG. 18B depicts changing an operator in the generated code of FIG. 18A.

Exemplary embodiments enable round-trip editing. Round-trip editing allows a user to edit generated code to modify a graphical model and vice versa. FIGS. 18A-B depict part of a graphical model 1800 and a segment of generated code 1850 that can be generated from the graphical model 1800 and used to illustrate round-editing. The part of the graphical model 1800 includes a sum element 1805, an input 1810, an input 1815 and an output 1820. The user can modify the addition operator 1802 in generated code 1850 and the graphical model 1800 can be programmatically updated. For example, the user can change the operator 1802 in generated code 1950 to be a multiplication operator 1804, as shown in FIG. 18B and the graphical model 1800 can be programmatically updated such that the sum-element 1805 is replaced by a multiplication element 1825.

Figure 18C:
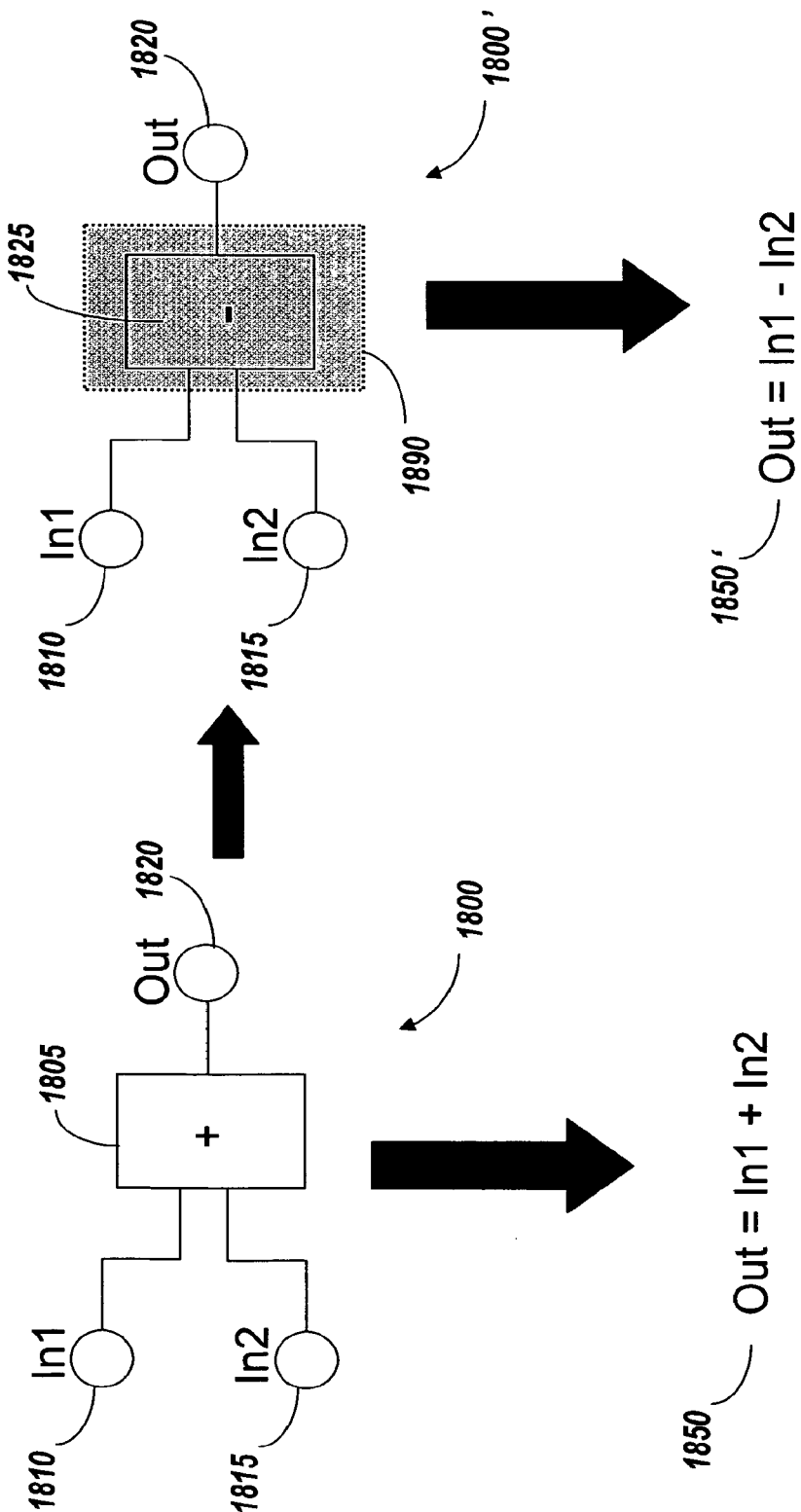
FIG. 18C depicts generating code for a graphical model and/or generating code for a modified version of the graphical model.

FIG. 18C depicts a graphical section of the graphical model 1800, where the segment of generated code 1850 that is generated from the graphical model 1800 is a graphical model 1800' that represents a modification of the graphical model 1800 and/or generated code 1850' from the modified graphical model 1800'. The environment 100 allows a user to generate code 1850 from a graphical model 1800, modify the graphical model 1800 to form graphical model 1800' and repeat the code generation process to generate code 1850' such that generated code 1850 and generated code 1850' exist simultaneously. The environment 100 can compare generated code 1850 with generated code 1850' to determine differences between generated code 1850 and generated code 1850'. The environment 100 can graphically identify a portion of the graphical model 1800' that relates to one or more differences between segments in generated code 1850 and generated code 1850' using graphical identifier 1890 when the user selects the corresponding segment in generated code 1850 or 1850'.

Figure 18D:
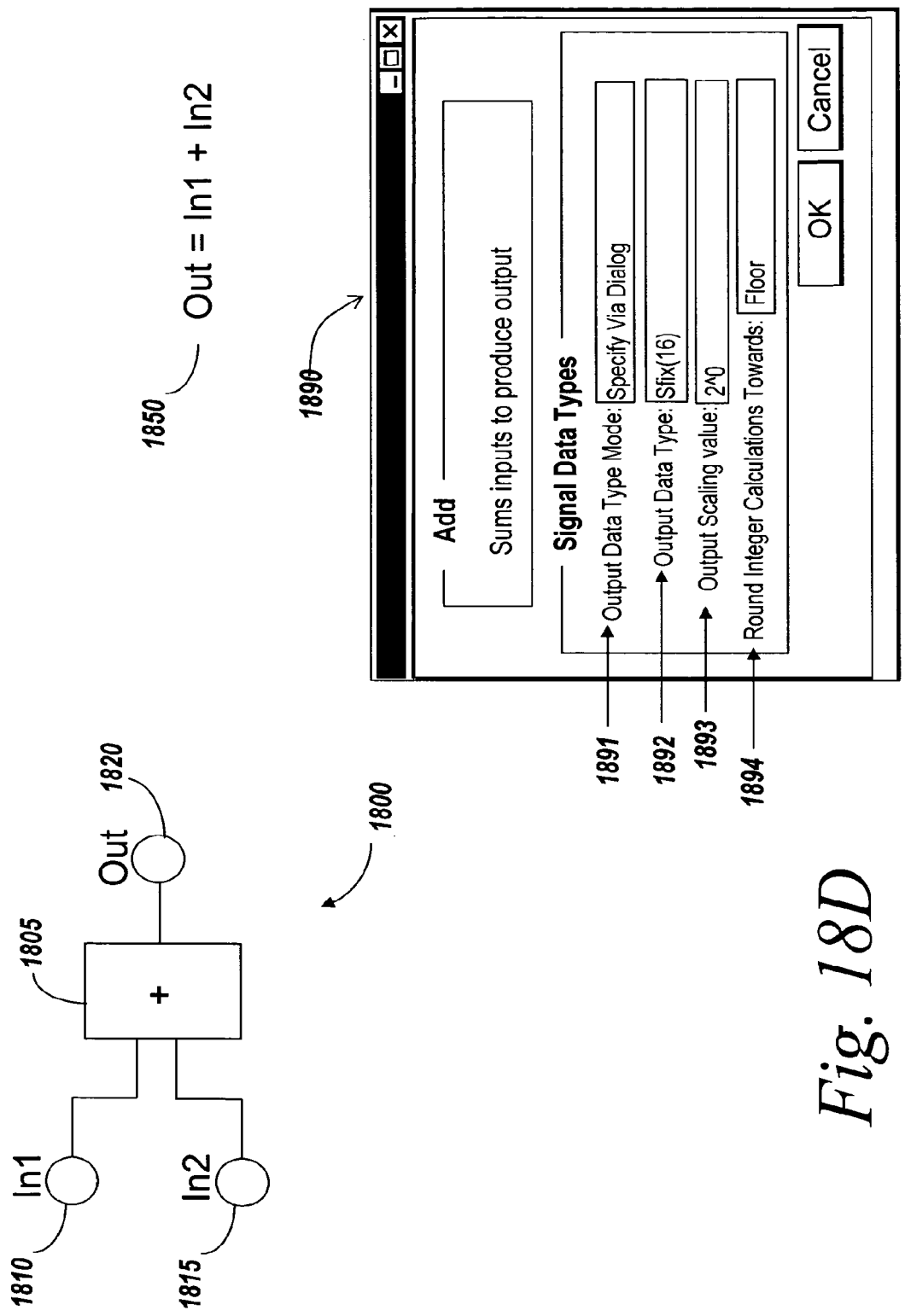
FIG. 18D depicts an exemplary graphical model, generated code and user interface for implementing round trip editing according to exemplary embodiments.

In some embodiments, a user may be able to modify a portion of the graphical model 1800 by right clicking on the segment of generated code 1850 that maps to the portion of the element 1805 using a pointing device. FIG. 18D depicts the graphical model 1800, generated code 1850 and a user interface 1890. When the user right clicks on the segment of generated code 1850, the user interface 1890 can be displayed that allows a user to specify aspects of the element 1805. The user interface 1890 may be the same as a user interface that is provided to a user when a user is developing the graphical model 1800. The user interface 1890 may include parameters 1891-1894. The parameters 1891-1894 may relate to aspects that are displayed in the graphical model or may relate to undisplayed aspects. The parameters may or may not affect the execution and functionality of the graphical model. The user interface 1890 may allow a user to change the parameters of the element 1805. When the user changes the parameters 1891-1894 in the user interface 1890, the graphical model 1800 may be updated. In addition the segment of generated code that is associated with the parameters 1891-1894 may also be updated. In another embodiment double clicking on a segment of generated code may open up the user interface 1890.

Figure 19:
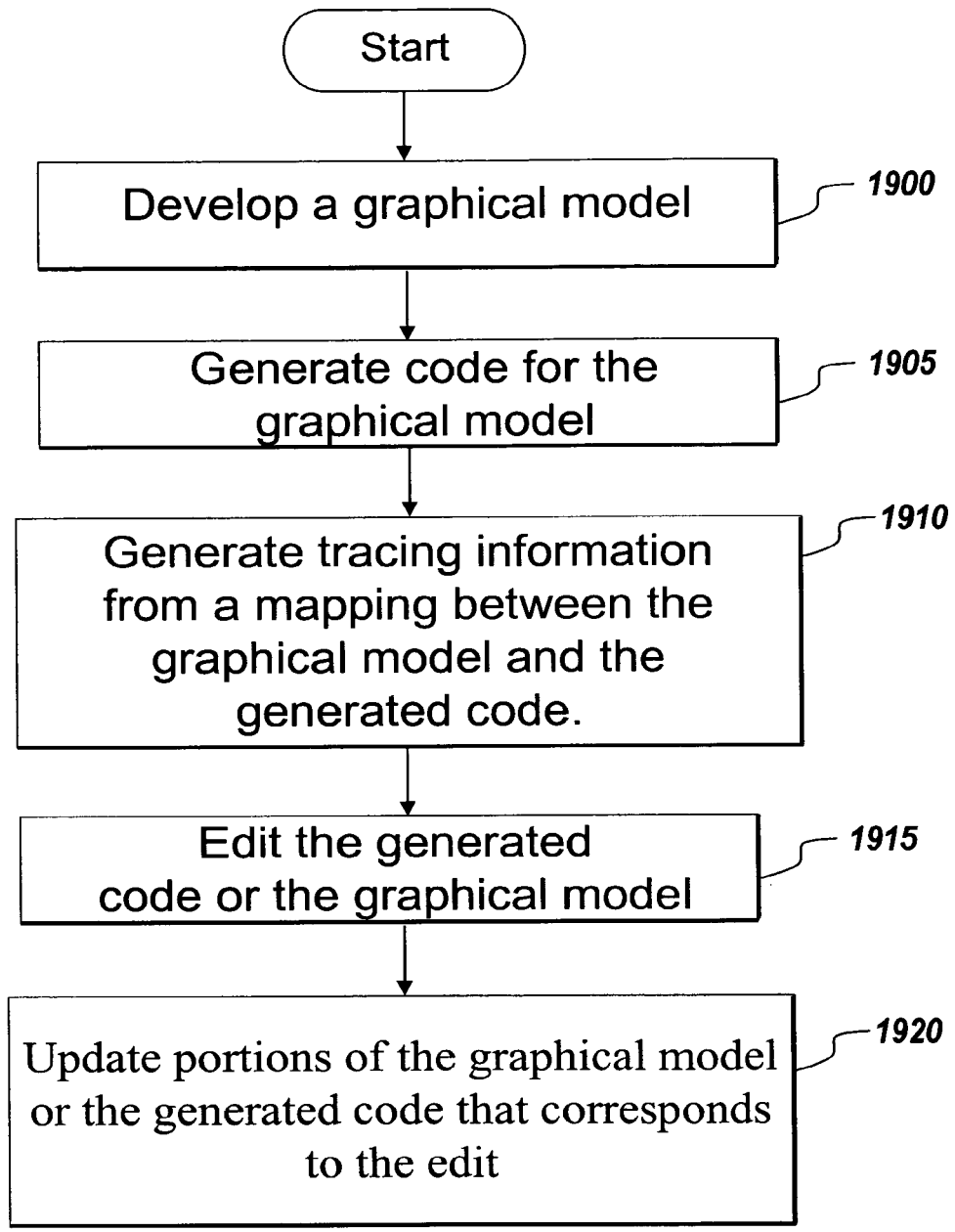
FIG. 19 is a flow diagram that depicts exemplary processing that can be used for round-trip editing.

FIG. 19 is a flow diagram that illustrates the steps for round-trip editing. A user can develop a graphical model 1800 (step 1900) and may generate code 1850 for the graphical model 1800 (step 1905). Tracing information is generated from a mapping between the graphical model 1800 and generated code 1850 (step 1910). The user can edit generated code 1850 or the graphical model 1800 (step 1915). Portions of the graphical model 1800 or segments of generated code 1850 that correspond to the edits are updated (step 1920). This allows a user to edit generated code 1850 and the graphical model 1800 with a minimal disturbance to the graphical model 1800 or generated code 1850.

Figure 20A:
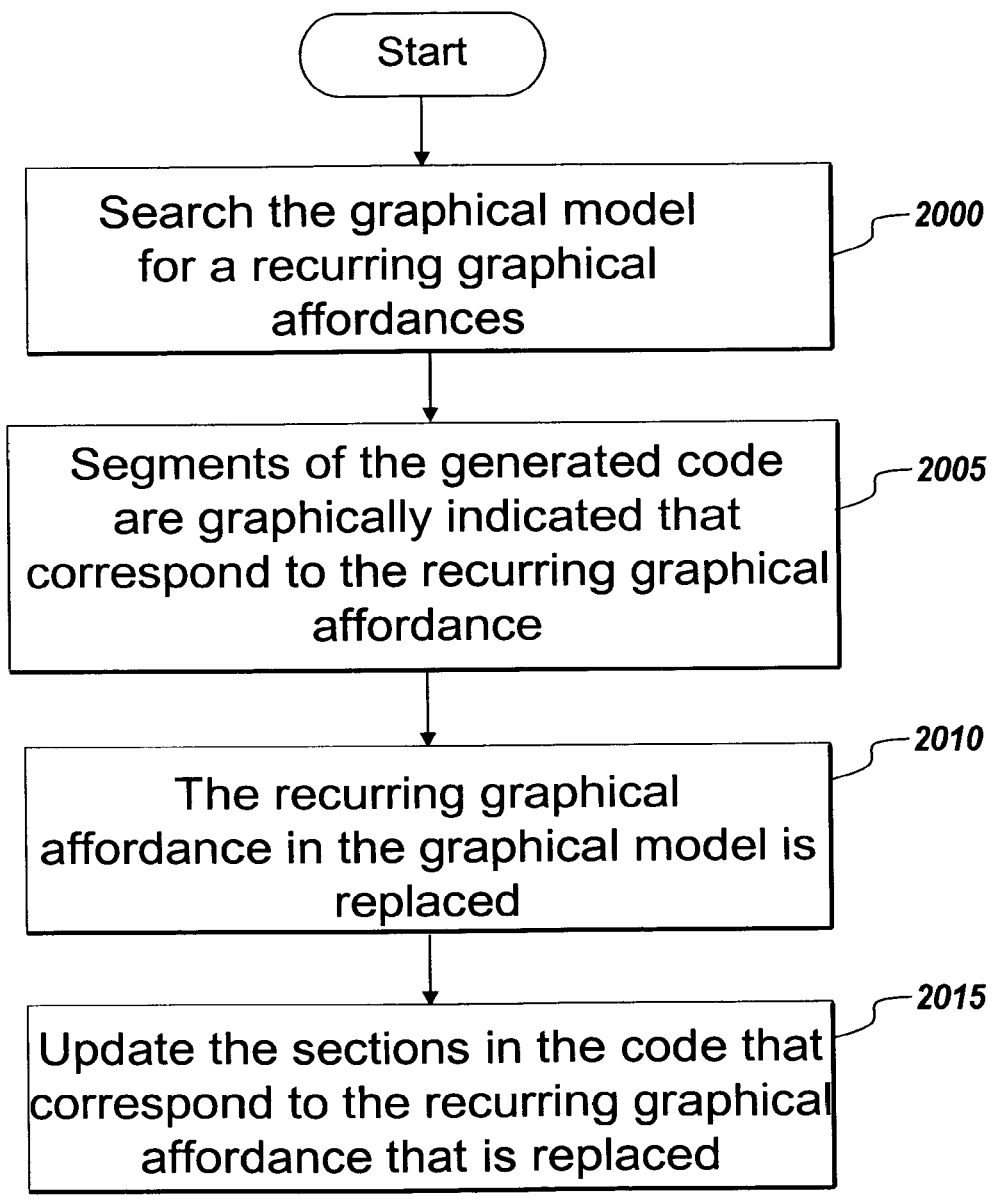
FIG. 20A is a flow diagram that depicts exemplary processing that can be used for using a search and replace operation for a graphical model.

In addition, a user can use a search and replace operation for the graphical model (e.g., graphical models 500, 1200, etc.) and/or generated code (e.g., generated code 550, 1250, etc.) to search for recurring graphical affordances or segments to replace. FIG. 20A is a flow diagram that illustrates the steps for using the search and replace operation where the graphical model (e.g., graphical models 500, 1200, etc.) is searched. Once generated code (e.g., generated code 550, 1250, etc.) is generated from a graphical model (e.g., graphical models 500, 1200, etc.), a user can search the graphical model (e.g., graphical models 500, 1200, etc.) for a recurring graphical affordance, such as, for example, an element, a signal, etc. (step 2000). After the search is performed, segments of generated code (e.g., generated code 550, 1250, etc.) can be graphically identified that correspond to the recurring graphical affordance detected by the search (step 2005). The recurring graphical affordance in the graphical model (e.g., graphical models 500, 1200, etc.) can be replaced (step 2010) and the segments of generated code e.g., generated code 550, 1250, etc.) that correspond to the recurring graphical affordance can be updated to reflect the replacement of the recurring graphical affordance (step 2015).

Figure 20B:
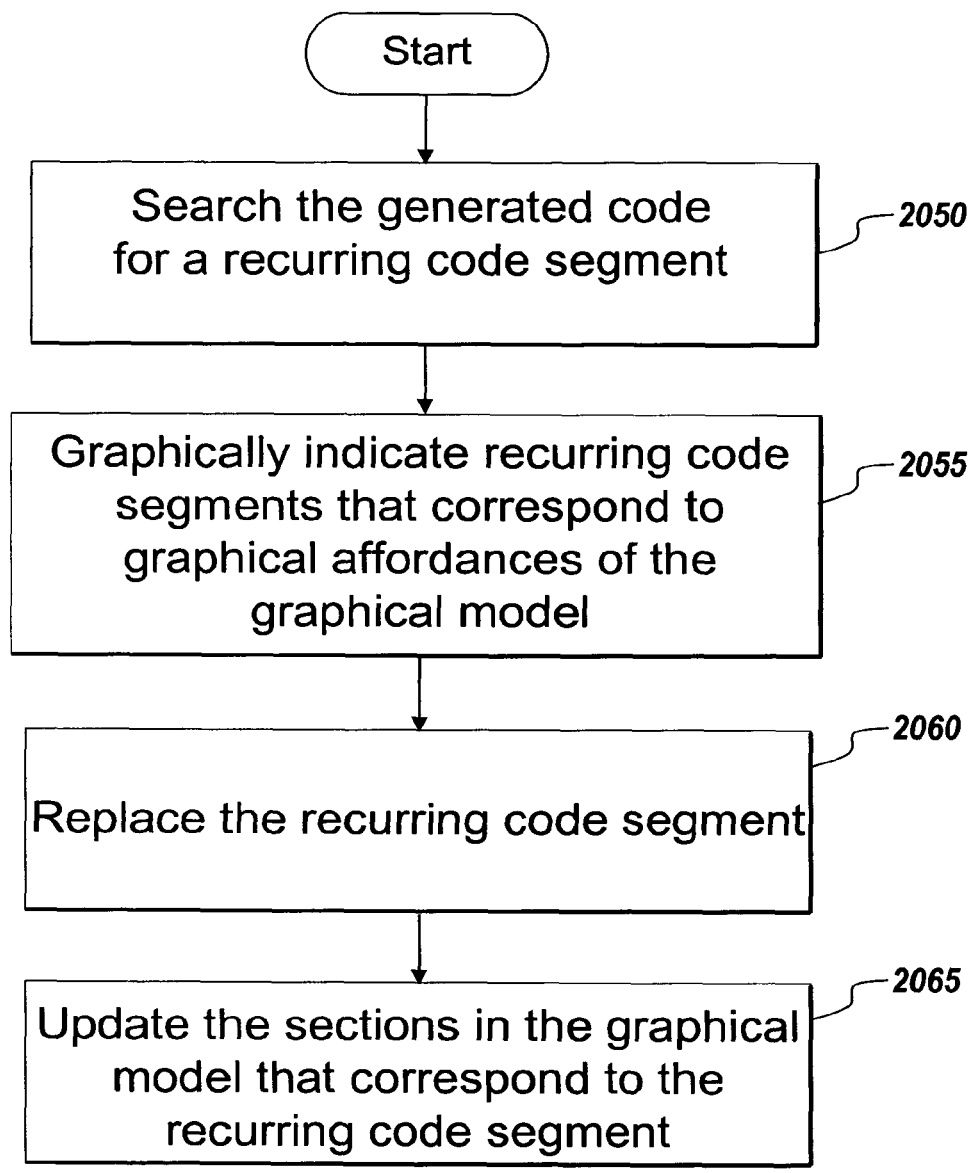
FIG. 20B is a flow diagram that depicts exemplary processing that can be used for using a search and replace operation for generated code.

FIG. 20B is a flow diagram that illustrates exemplary steps for using the search and replace operation where generated code (e.g., generated code 550, 1250, etc.) is searched. Once generated code (e.g., generated code 550, 1250, etc.) is generated from a graphical model (e.g., graphical models 500, 1200, etc.), a user can search generated code (e.g., generated code 550, 1250, etc.) for a recurring segment (step 2050). After the search is performed, portions of the graphical model (e.g., graphical models 500, 1200, etc.) that correspond to the recurring segment of generated code (e.g., generated code 550, 1250, etc.) that is detected by the search can be graphically identified (step 2055). The recurring segments in generated code (e.g., generated code 550, 1250, etc.) can be replaced (step 2060) and the sections of the graphical model (e.g., graphical models 500, 1200, etc.) that correspond to the recurring segments can be updated to reflect the replacement of the recurring segments (step 2065).

Figure 21:
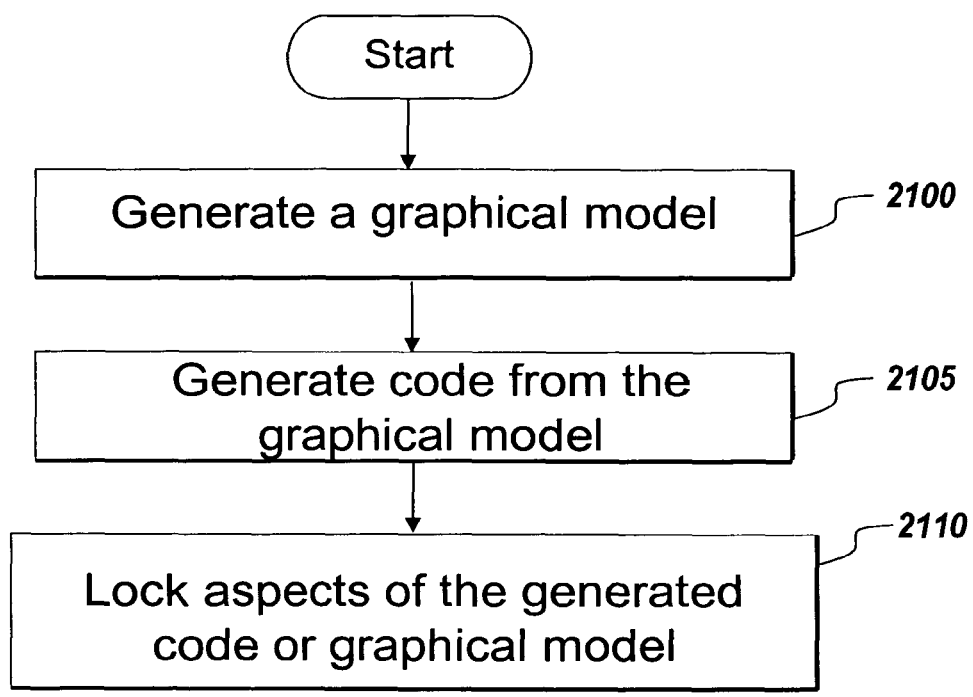
FIG. 21 is a flow diagram that depicts exemplary processing that can be used for locking aspects of a graphical model and generated code.

FIG. 21 is a flow diagram illustrating exemplary steps for locking aspects of a graphical model (e.g., graphical models 500, 1200, etc.) and generated code (e.g., generated code 550, 1250, etc.) from the graphical model (e.g., graphical models 500, 1200, etc.) to prevent modifying of the locked aspects. A user can generate a graphical model (e.g., graphical models 500, 1200, etc.) (step 2100) and can generate code (e.g., generated code 550, 1250, etc.) from the graphical model (e.g., graphical models 500, 1200, etc.) (step 2105). The graphical model (e.g., graphical models 500, 1200, etc.) can include unspecified parameters that can be inferred by the environment 100 using, for example, propagation.

The user can lock aspects of generated code (e.g., generated code 550, 1250, etc.) or graphical model (e.g., graphical models 500, 1200, etc.) such that the aspects do not change over repeated code generation processes or to prevent the editing of the locked aspects (step 2110). In one example, the user can lock variable names, including auto-generated variable names, and the locked names are honored during the code generation processed, and therefore, are maintained. In another example, the unspecified parameters are inferred by the environment 100, and therefore specified by the environment 100. If the user does not lock these inferred parameters, the parameters may change when portions of the graphical model (e.g., graphical models 500, 1200, etc.) are changed. If, however, the user locks an inferred parameter, the locked parameters remain the same. This allows a user to develop generated code based on unspecified parameters that are inferred a by the environment 100 and to retain inferred parameters for subsequent code generation, as if the inferred parameters were specified by the user.

Figure 22:
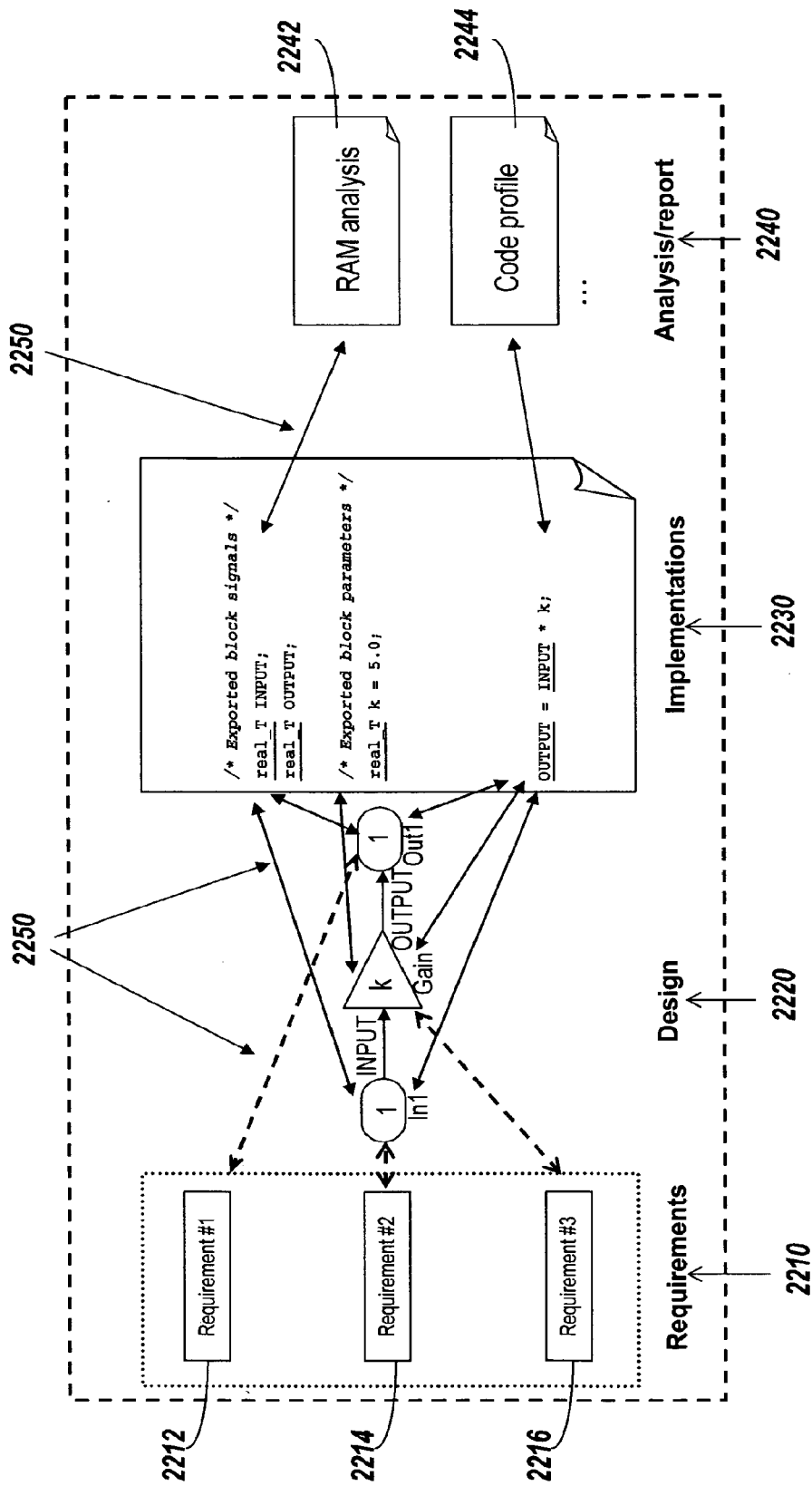
FIG. 22 is an exemplary diagram of entities that can be mapped using tracing techniques.

It is observed from the examples discussed herein that the embodiments of the present invention establish traceability between a graphical model and generated code based on tracing information. It is also observed that once the tracing information is obtained, the tracing techniques can be extended to entities (e.g., a report, a requirements document, etc.) beyond the graphical model and generated code. FIG. 22 is an exemplary diagram of entities that can be mapped using the tracing techniques. The exemplary diagram includes requirements documentation 2210, a design 2220 (i.e., a graphical model), implementations 2230 (i.e., generated code) and a code analysis/reports 2240. The requirements documentation 2210 can include requirements 2212, 2214 and 2216 to be met or followed when developing the design 2220. The design 2220 is developed based on the requirements 2212, 2214 and 2216 from the requirements documentation 2210. The implementations 2230 are generated from the design 2220. The analysis/reports 2240 can be generated from the implementations 2230 and can include a RAM analysis 2242, code profile 2244, etc.

Using tracing techniques, the requirements documentation 2210, design 2220, implementation 2230 and code analysis/reports 2240 can have traceability such that aspects of one entity can be traced to another entity. Mapping 2250 can use tracing information to facilitate graphically identification of aspects of the entities. Arrows used to depict mapping 2250 are illustrative of how each aspect in an entity corresponds to an aspect in another entity. As a result of the mapping and tracing information discussed herein, traceability can be employed among various entities corresponding to the design (e.g., a graphical model).

The present invention may be provided as one or more computer-readable programs embodied on or in one or more mediums. The mediums may be, but are not limited to a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or even the genome in a cell nucleus. In general, the computer-readable programs may be implemented in any programming language. Some examples of languages that can be used include Python, C, C++, C#, JAVA®, Javascript etc. Further, the computer readable programs can be implemented in a hardware description language or any other language that allows prescribing computation such as, for example, Deoxyribonucleic acid (DNA). The software programs may be stored on or in one or more mediums as object code.

Certain embodiments of the present invention are described above. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method comprising:
   accessing generated code corresponding to at least a portion of a graphical model,
      the accessing being performed by a processor;
   graphically identifying a first graphical affordance in the graphical model,
      the first graphical affordance corresponding to a first segment of the generated code, and
      the graphically identifying being performed by the processor;
   graphically identifying, based on graphically identifying the first graphical affordance in the graphical model, one or more portions of the graphical model,
      when graphically identifying the one or more portions of the graphical model, the method includes:
         receiving information associated with browsing an intermediate representation of the graphical model or the generated code; and
         graphically identifying the one or more portions of the graphical model based on the received information associated with browsing the at least one of the intermediate representation of the graphical model or the generated code,
      the graphically identifying the one or more portions of the graphical model being performed by the processor;
   searching the graphical model for a recurring graphical affordance,
      the searching being performed by the processor;
   graphically identifying segments in the generated code that correspond to the recurring graphical affordance,
      the graphically identifying the segments being performed by the processor;
   replacing the recurring graphical affordance in the graphical model with another graphical affordance,
      the replacing being performed by the processor; and updating sections of the generated code based on the replacing,
the updating being performed by the processor.

2. The method of claim 1, where the method further comprises:
generating tracing information for associating the first graphical affordance with the first segment of the generated code.

3. The method of claim 2, where the method further comprises:
generating an independent representation that comprises the tracing information.

4. The method of claim 1, where the method further comprises:
mapping a document to the generated code using tracing information; and
graphically identifying a requirement in the document that corresponds to the first segment.

5. The method of claim 1, where the method further comprises:
updating an inferred property in the first graphical affordance; and
implementing the inferred property as a specified property.

6. The method of claim 1, where the first segment corresponds to a plurality of graphical affordances, and the method further comprises:
identifying members of the plurality of graphical affordances in the graphical model using unique graphical identifiers.

7. The method of claim 1, where the method further comprises:
searching the generated code for the first segment;
graphically identifying the first graphical affordance in the graphical model corresponding to the first segment;
replacing the first segment with another segment; and
updating the graphical model to reflect the replacing.

8. The method of claim 1, where the method further comprises:
associating undisplayed aspects of the graphical model with the first segment; and
displaying the undisplayed aspects when the first segment is specified.

9. A non-transitory computer-readable medium storing instructions, the instructions comprising:
one or more instructions, which when executed by a processor, cause the processor to:
interact with code generated based on a graphical model, the generated code comprising at least a first segment;
graphically identify a first graphical affordance in the graphical model that corresponds to the first segment; and
graphically identify, based on graphically identifying the first graphical affordance in the graphical model, one or more portions of the graphical model,
the one or more instructions to graphically identify the one or more portions of the graphical model including:
one or more instructions to receive information associated with browsing an intermediate representation of the graphical model or the generated code; and
one or more instructions to graphically identify the one or more portions of the graphical model based on the received information associated with browsing the at least one of the intermediate representation of the graphical model or the generated code;
search the graphical model for a recurring graphical affordance;
graphically identify segments in the generated code that correspond to the recurring graphical affordance;
replace the recurring graphical affordance in the graphical model with another graphical affordance; and
update sections of the generated code based on the replacing.

10. The medium of claim 9, where the instructions further include:
one or more instructions to generate tracing information for associating the first graphical affordance with the first segment.

11. A computer-implemented method comprising:
accessing generated code corresponding to at least a portion of a graphical model,
the accessing being performed by a processor;
graphically identifying a first segment in the generated code,
the first segment corresponding to a first graphical affordance in the graphical model, and
the graphically identifying being performed by the processor; and
graphically identifying, based on graphically identifying the first segment in the generated code, one or more portions of the graphical model,
when graphically identifying the one or more portions of the graphical model, the method includes:
receiving information associated with browsing an intermediate representation of the graphical model or the generated code; and
graphically identifying the one or more portions of the graphical model based on the received information associated with browsing the at least one of the intermediate representation of the graphical model or the generated code,
the graphically identifying the one or more portions of the graphical model being performed by the processor;
searching the graphical model for a recurring graphical affordance,
the searching being performed by the processor;
graphically identifying segments in the generated code that correspond to the recurring graphical affordance,
the graphically identifying the segments being performed by the processor;
replacing the recurring graphical affordance in the graphical model with another graphical affordance,
the replacing being performed by the processor; and
updating sections of the generated code based on the replacing,
the updating being performed by the processor.

12. The method of claim 11, where
the first graphical affordance corresponds to a plurality of segments in the generated code, and
the method further comprises:
identifying members of the plurality of segments using a unique graphical identifier.

13. The method of claim 12, where the members of the plurality of segments are stored in two or more files.

14. The method of claim 11, where the method further comprises:
generating tracing information that associates the first graphical affordance with the first segment in the generated code.

15. The method of claim 11, where the method further comprises:
   mapping a document to the generated code; and
   graphically identifying a requirement in the document that corresponds to the first graphical affordance.

16. The method of claim 11, where the method further comprises:
   specifying a scope related to aspects of the first graphical affordance for identifying the segment as at least one segment that is within the scope.

17. A device comprising:
   a memory to store instructions; and
   a processor to execute the instructions to:
      access generated code corresponding to at least part of a graphical model; and
      graphically identify a first segment in the generated code corresponding to a first graphical affordance; and
      graphically identify, based on graphically identifying the first segment in the generated code, one or more portions of the graphical model,
         the processor, when graphically identifying the one or more portions of the graphical model, being to:
            receive information associated with browsing an intermediate representation of the graphical model or the generated code; and
            graphically identify the one or more portions of the graphical model based on the received information associated with browsing the at least one of the intermediate representation of the graphical model or the generated code;
      search the graphical model for a recurring graphical affordance;
      identify segments in the generated code that correspond to the recurring graphical affordance;
      replace the recurring graphical affordance in the graphical model with another graphical affordance; and
      update sections of the generated code based on the replacing.

18. The device of claim 17, where
   the first graphical affordance corresponds to a plurality of segments in the generated code, and the processor is further to:
   identify each of the plurality of segments in the generated code with a unique graphical identifier.

19. The device of claim 17, where the processor is further to:
   generate tracing information that associates the first graphical affordance with the first segment in the generated code.

20. The device of claim 19, where of the processor is further to:
   map a document to the generated code using the tracing information; and
   graphically identify a requirement in the document that corresponds to the first graphical affordance.

* * * * *